(12) United States Patent
Matsuki et al.

(10) Patent No.: US 7,408,703 B2
(45) Date of Patent: Aug. 5, 2008

(54) WIDE-ANGLE IMAGING OPTICAL SYSTEM AND WIDE-ANGLE IMAGING APPARATUS SURVEILLANCE IMAGING APPARATUS VEHICLE-MOUNTED IMAGING APPARATUS AND PROJECTION APPARATUS USING THE WIDE-ANGLE IMAGING OPTICAL SYSTEM

(75) Inventors: Daizaburo Matsuki, Neyagawa (JP); Motonobu Yoshikawa, Osaka (JP); Yoshiharu Yamamoto, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 45 days.

(21) Appl. No.: 10/495,188

(22) PCT Filed: Nov. 13, 2002

(86) PCT No.: PCT/JP02/11817

§ 371 (c)(1), (2), (4) Date: May 11, 2004

(87) PCT Pub. No.: WO03/042743

PCT Pub. Date: May 22, 2003

(65) Prior Publication Data
US 2004/0264013 A1    Dec. 30, 2004

(30) Foreign Application Priority Data
Nov. 13, 2001 (JP) ............................ 2001-347568
Jun. 25, 2002 (JP) ............................ 2002-185199

(51) Int. Cl.
*G02F 1/15* (2006.01)
(52) U.S. Cl. .................... 359/365; 359/364; 359/366
(58) Field of Classification Search ......... 359/364–366
See application file for complete search history.

(56) References Cited

U.S. PATENT DOCUMENTS

| 3,897,133 A * | 7/1975 | Warner et al. ............... 359/365 |
| 4,812,030 A * | 3/1989 | Pinson ....................... 359/859 |
| 5,710,661 A   | 1/1998 | Cook |
| 6,130,783 A * | 10/2000 | Yagi et al. .................. 359/627 |
| 6,636,360 B1 * | 10/2003 | Tanaka et al. ............... 359/678 |
| 6,700,711 B2 * | 3/2004 | Nalwa ........................ 359/725 |
| 2002/0085271 A1 * | 7/2002 | Shafer et al. ................ 359/359 |

FOREIGN PATENT DOCUMENTS

| JP | 61-221718 | 10/1986 |
| JP | 2-151828 | 6/1990 |
| JP | 10-54939 | 2/1998 |
| JP | 2000-4383 | 1/2000 |
| JP | 2001-94839 | 4/2001 |
| WO | WO 00/41024 | 7/2000 |

* cited by examiner

Primary Examiner—Joshua L Pritchett
(74) Attorney, Agent, or Firm—Hamre, Schumann, Mueller & Larson, P.C.

(57) ABSTRACT

A wide-angle imaging optical system includes a refractive optical system (3), a reflective optical system, and an image-forming optical system (5). The reflective optical system includes a first reflection surface (1) that directly reflects rays of light from an object, and a second reflection surface (2) that reflects rays of light from the first reflection surface (1). An open portion is provided between the first reflection surface (1) and the second reflection surface (2), and rays of light from the object enter the open portion. A light-transmitting portion (2a) is provided in the second reflection surface (2) and transmits rays of light that have entered the refractive optical system (3). An aperture (1a) is provided in the first reflection surface (1) and allows rays of light from the second reflection surface (2) and the refractive optical system (3) to enter the image-forming optical system (5).

43 Claims, 44 Drawing Sheets

WIDE-ANGLE IMAGING OPTICAL SYSTEM AND WIDE-ANGLE IMAGING APPARATUS SURVEILLANCE IMAGING APPARATUS VEHICLE-MOUNTED IMAGING APPARATUS AND PROJECTION APPARATUS USING THE WIDE-ANGLE IMAGING OPTICAL SYSTEM

TECHNICAL FIELD

The present invention relates to a wide-angle imaging apparatus that can produce a panoramic image covering an ultra-wide range by using the combination of reflection surfaces and the combination of lenses.

BACKGROUND ART

Various research and development have been conducted on a wide-angle imaging apparatus to efficiently produce an image of an object in a large area. One example is the development of a wide-angle camera with a fish-eye lens.

JP 10(1998)-54939 A (REFLECTION TYPE VIEWING ANGLE CONVERTING OPTICAL DEVICE AND OPTICAL SYSTEM USING THE DEVICE) proposes a system that produces an image of a wide visual field by variously changing the shapes of three mirror surfaces arranged opposite to each other. JP 2000-4383 A (MULTIDIRECTIONAL IMAGE TAKING-IN DEVICE) proposes an optical system that produces a counter image inside a normal image by using a shaft of a panoramic image block as a lens.

JP 2001-94839 A (WIDE VISUAL FIELD IMAGE PICKUP DEVICE AND WIDE VISUAL FIELD IMAGE PICKUP DISPLAY DEVICE) proposes a device that includes a convex main mirror having a hole in the center, a convex sub-mirror having a hole in the center, and a lens arranged in the hole of the sub-mirror. Rays of light are reflected by the main mirror, further reflected by the sub-mirror, and then are imaged. This image and an image formed by the lens are displayed on the device. WO00/41024 (PANORAMIC IMAGING APPARATUS) proposes a system that provides a substantially flat and stigmatic image plane by using two reflectors such as a convex hyperboloidal mirror and a concave ellipsoidal or spherical mirror, a relay system, and an image sensor.

In recent years, an electrical light receiving element, e.g., a solid-state imaging device has been used often. In this case, optical members such as an optical low-pass filter and a near-infrared cutoff filter are arranged between an imaging lens and the imaging device, and thus a relatively long back focal length is necessary. The optical low-pass filter removes moiré by attenuating a high frequency component not less than a spacial frequency component required for taking pictures. The near-infrared cutoff filter corrects a spectral response of an electrical photoreceptor.

However, a wide-angle imaging optical system using, e.g., a fish-eye lens generally requires many lenses. Therefore, the weight of the optical system is increased, and the apparatus becomes large and expensive. Moreover, the generation of chromatic aberration or the like is a problem, and actually this wide-angle imaging optical system is only used for taking pictures with special techniques.

JP 10(1998)-54939 A discloses the formation of an image in the vicinity of the axial direction, while a means for correcting various aberrations is limited. For a multidirectional image capture device of JP 2000-4383 A, incident light from the object side passes through a peripheral light-transmitting plane and a rotating body before reaching a peripheral light-proof plane. Therefore, a transparent material used for the rotating body is thick, and when the transparent material is resin, it is susceptible to temperature changes and takes longer to be molded. When the transparent material is glass, particularly aspherical glass, considerable cost is involved in polishing the glass.

An image pickup device of JP 2001-94839 A can produce two images simultaneously: an image formed in such a manner that rays of light are reflected by the main mirror, further reflected by the sub-mirror, and then are imaged; and an image formed by the lens that is arranged in the sub-mirror. The optical system includes the convex main mirror, the convex sub-mirror, and the concave lens. Moreover, a master lens should be placed between an imaging device and the sub-mirror. In this case, the F number of the master lens is high, and rays of light entering the master lens are divergent light due to the configuration of the optical system. Consequently, the master lens becomes large and complicated.

A panoramic imaging apparatus of WO00/41024 requires a relay optical system to form an intermediate image in the optical system, and thus the entire length of the optical system is increased, resulting in a larger apparatus.

As described above, when an electrical light receiving element is used, it is necessary not only to ensure a relatively long back focal length so that optical members such as an optical low-pass filter and a near-infrared cutoff filter are provided, but also to correct aberration sufficiently. To achieve this, however, relatively many lenses are required, and an optical design to reduce the number of lenses should be addressed.

DISCLOSURE OF INVENTION

To solve the above conventional problems, it is an object of the present invention to provide a wide-angle imaging optical system that can produce a panoramic image covering a maximum horizontal angle of view of 360 degrees as well as an image in the vicinity of the axial direction with a simple structure and has a relatively long back focal length, improved aberration correction, and brightness.

A wide-angle imaging optical system of the present invention includes a refractive optical system, a reflective optical system, and an image-forming optical system. The reflective optical system and the image-forming optical system are arranged in the indicated order as seen from a longer conjugate distance side and constitute a first optical system. The refractive optical system and the image-forming optical system are arranged in the indicated order as seen from the longer conjugate distance side and constitute a second optical system. The reflective optical system includes a first reflection surface that directly reflects rays of light from an object, and a second reflection surface that reflects rays of light from the first reflection surface. An open portion is provided between the first reflection surface and the second reflection surface, and rays of light from the object enter the open portion. A light-transmitting portion is provided in the second reflection surface and transmits rays of light that have entered the refractive optical system. An aperture is provided in the first reflection surface and allows rays of light from the second reflection surface and the refractive optical system to enter the image-forming optical system.

A wide-angle imaging apparatus of the present invention includes the wide-angle imaging optical system of the present invention and an imaging device for picking up an image formed by the image-forming optical system.

A surveillance imaging apparatus of the present invention includes the wide-angle imaging optical system of the present invention.

A vehicle-mounted imaging apparatus of the present invention includes the wide-angle imaging optical system of the present invention.

A projection apparatus of the present invention includes the wide-angle imaging optical system of the present invention.

BEST MODE FOR CARRYING OUT THE INVENTION

Figure 1:
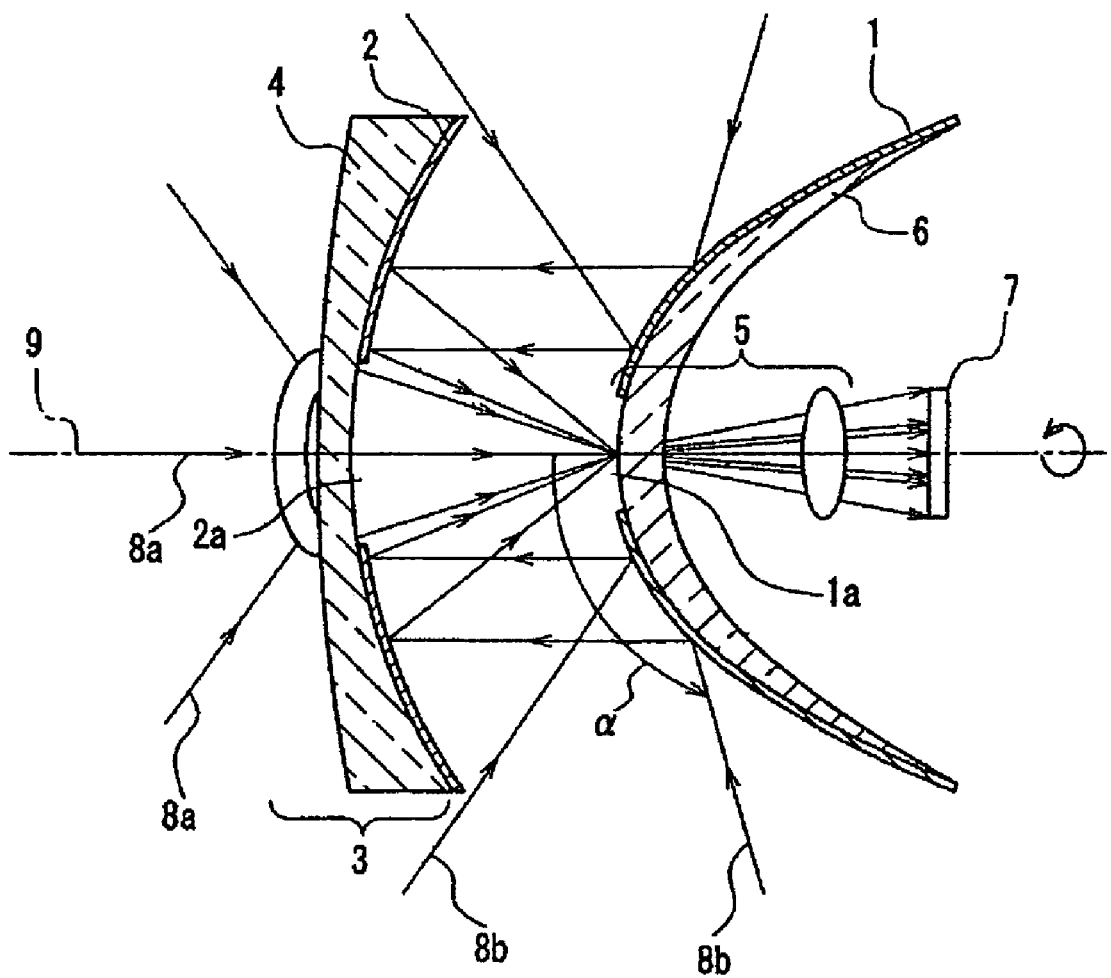
FIG. 1 is a schematic cross-sectional view of a wide-angle imaging apparatus according to Embodiment 1 of the present invention.

The present invention includes the reflective optical system with the first reflection surface and the second reflection surface, the open portion provided between the first reflection surface and the second reflection surface, the light-transmitting portion provided in the second reflection surface, and the aperture provided in the first reflection surface, thereby producing a panoramic image that covers a wide range, i.e., a maximum horizontal angle of view of 360 degrees and a vertical angle of view of about 180 degrees. Moreover, the main optical system can be composed of reflection surfaces that cause no chromatic aberration. This reduces not only man-hours for design but also constraints on fabrication, so that a small, lightweight, low-cost, and bright wide-angle imaging optical system can be achieved.

In the present invention, it is preferable that the first optical system and the second optical system share the image-forming optical system. This configuration can reduce the size of the apparatus.

It is preferable that no intermediate image is formed inside the wide-angle imaging optical system. With this configuration, the wide-angle imaging optical system is not a relay optical system, and the entire length of the optical system is reduced, so that a smaller apparatus can be achieved.

The wide-angle imaging optical system preferably satisfies the relationship expressed by $fa>0$ $fb>0$ where fa is a combined focal length of the first optical system, and fb is a combined focal length of the second optical system. With this configuration, the wide-angle imaging optical system is not a relay optical system, and the entire length of the optical system is reduced, so that a smaller apparatus can be achieved. When fa is not more than the lower limit, an intermediate image is formed inside the first optical system, and thus the image of an object formed by the first optical system is an erect image. Moreover, the first optical system becomes a relay optical system, which increases the entire length of the optical system.

When fb is not more than the lower limit, an intermediate image is formed inside the second optical system, and thus the image of an object formed by the second optical system is an erect image. Moreover, the second optical system becomes a relay optical system, which increases the entire length of the optical system. In this case, when the image formed by the first optical system is inverted, the resultant image is not continuous.

The wide-angle imaging optical system preferably satisfies the relationship expressed by $f2 \geq d$ where f2 is a focal length of the second reflection surface, and d is a distance on the axis between the first reflection surface and the second reflection surface. This configuration easily can correct aberration in the image-forming optical system. When $f2 \geq d$ is not satisfied, an intermediate image is formed inside the reflective optical system, and the angle of deviation of rays of light passing through the image-forming optical system becomes larger, thus making it difficult to correct aberration in the image-forming optical system. Moreover, the image formed by the first optical system is an erect image. Therefore, when the image formed by the second optical system is inverted, the resultant image is not continuous.

The wide-angle imaging optical system preferably satisfies the relationship expressed by $|f12/fa|>5$ where fa is a combined focal length of the first optical system, and f12 is a combined focal length of the first reflection surface and the second reflection surface. This configuration can reduce the entire length of the optical system. $|f12/fa|$ represents the degree of a focal system of the reflection surfaces. When the value is not more than the lower limit, the combined focal length of the first and second reflection surfaces is reduced. Therefore, a relay optical system rather than an a focal system is provided while an intermediate image is formed inside the wide-angle imaging optical system, so that the entire length of the optical system becomes longer.

The wide-angle imaging optical system preferably satisfies the relationship expressed by $r2>0$ $0.3<r1/r2<0.7$ where r1 is a radius of curvature of the first reflection surface, and r2 is a radius of curvature of the second reflection surface. This configuration can achieve a small bright optical system. When r2 is not more than the lower limit, the second reflection surface has a convex surface as seen from incident light from an object, and rays of light entering the image-forming optical system are divergent light. Therefore, the image-forming optical system itself becomes larger, which in turn increases the size of the apparatus.

When the value is not less than the upper limit of $0.3<r1/r2<0.7$, rays of light from the second reflection surface enter the aperture at a larger angle, thus making it difficult to correct aberration in the image-forming optical system. Moreover, the aperture efficiency also is reduced, so that brightness cannot be ensured at the periphery. When the value is not more than the lower limit, the area used by the first optical system on the second reflection surface extends to near the central axis, and thus the area of the light-transmitting portion becomes narrower. Consequently, rays of light from the second image-forming optical system do not pass through the light-transmitting portion, and an image cannot be formed.

The wide-angle imaging optical system preferably satisfies the relationship expressed by $$|fb-fa|/|fa|<0.5$$

where fa is a combined focal length of the first optical system, and fb is a combined focal length of the second optical system. This configuration can prevent missing or overlapping of images. When the value is not less than the upper limit of $|fb-fa|/|fa|<0.5$, a difference in back focal length between the first optical system and the second optical system is increased. Moreover, since the magnification for image formation of the first optical system differs from that of the second optical system, an annular image formed by the first optical system and a circular image formed by the second optical system are not continuous, resulting in missing or overlapping of images.

The wide-angle imaging optical system preferably satisfies the relationship expressed by $$1.2<bf/fi<1.8$$

where bf is a back focal length of the image-forming optical system measured in terms of air when rays of light from an object at infinity enter the image-forming optical system in parallel, and fi is a combined focal length of the image-forming optical system. This configuration can reduce the entire length of the optical system. When the value is not less than the upper limit of $1.2<bf/fi<1.8$, the back focal length is increased to make the entire length of the optical system longer, which in turn increases the size of the apparatus. When the value is not more than the lower limit, the back focal length is reduced, and the optical system cannot be provided.

It is preferable that the refractive optical system includes a first lens group with negative power and a second lens group with positive power that are arranged in the indicated order as seen from the object side. With this configuration, the wide-angle imaging optical system does not form any intermediate image at a halfway point, and a bright optical system can be achieved.

It is preferable that at least one of the first reflection surface and the second reflection surface is a rotationally symmetrical aspheric surface in shape. This configuration optimally can correct curvature of field or astigmatism generated in the reflective optical system itself by using an aspherical coefficient.

It is preferable that a magnification for image formation of the first optical system and a magnification for image formation of the second optical system have the same sign. With this configuration, when the image formed by the first optical system is an erect image, the image formed by the second optical system also is an erect image. Moreover, when the image formed by the first optical system is an inverted image, the image formed by the second optical system also is an inverted image. Therefore, a continuous image can be obtained.

It is preferable that a magnification for image formation of the first optical system and a magnification for image formation of the second optical system are both negative. With this configuration, the wide-angle imaging optical system is not a relay optical system, and the entire length of the optical system is reduced, so that a smaller apparatus can be achieved.

It is preferable that at least one focal point of the first reflection surface coincides with at least one focal point of the second reflection surface. A rotationally symmetrical aspheric surface has one or two focal points. This configuration allows a chief ray to converge on the position of the focal point by combining the first reflection surface with the second reflection surface.

It is preferable that a lens stop is located inside the image-forming optical system or between the image-forming optical system and the second reflection surface. With this configuration, one of the focal points of the second reflection surface coincides with the center of the lens stop. Therefore, rays of light can be imaged by the image-forming optical system while a chief ray converges on the position of the lens stop.

It is preferable that a focal point of the second reflection surface coincides with the center of the lens stop.

It is preferable that a shielding member is formed near the periphery of the aperture. This configuration can eliminate ghost light that is reflected four or more times by the reflection surfaces, enters the aperture, and is picked up after passing through the image-forming optical system.

It is preferable that the shielding member supports the image-forming optical system. This configuration can use the shielding member efficiently without relying on a special member for supporting the image-forming optical system.

It is preferable that the image-forming optical system includes a hood that limits rays of light entering the image-forming optical system. This configuration can prevent a circular image of a second imaging area (where rays of light enter the refractive optical system) from overlapping with an annular image of a first imaging area (where rays of light enter the reflective optical system) that is formed outside the circular image when they are picked up by the imaging device.

It is preferable that the lenses of the image-forming optical system are arranged in the following order as seen from the object side: a negative lens, a positive lens, and a positive lens. This configuration allows the image-forming optical system to have a relatively long back focal length, improved aberration performance, and brightness even with a small number of lenses.

It is preferable that the lenses of the image-forming optical system are arranged in the following order as seen from the object side: a negative lens, a positive lens, a positive lens, and a positive lens. This configuration allows the image-forming optical system to have a relatively long back focal length, improved aberration performance, and brightness even with a small number of lenses.

It is preferable that the refractive optical system includes a hood that limits rays of light entering the refractive optical system. This configuration can prevent a circular image of a second imaging area (where rays of light enter the refractive optical system) from overlapping with an annular image of a first imaging area (where rays of light enter the reflective optical system) that is formed outside the circular image when they are picked up by the imaging device.

It is preferable that the first reflection surface is formed integrally with a lens of the image-forming optical system. This configuration can improve the manufacturing cost and efficiency and reduce the number of optical components required for the wide-angle imaging optical system. Moreover, the deviation between the optical axes of optical elements in the reflective optical system and the image-forming optical system is reduced, thereby making the optical system resistant to vibration. Thus, the optical system can maintain high performance, particularly when used as a vehicle-mounted optical system.

It is preferable that the shape of the first reflection surface is substantially the same as the shape of a portion of the lens of the image-forming optical system that corresponds to the aperture.

It is preferable that the shape of the first reflection surface differs from the shape of a portion of the lens of the image-forming optical system that corresponds to the aperture. With this configuration, the lens at the aperture can have the same effect as a convex or concave lens, so that various aberrations generated in the wide-angle imaging optical system can be corrected optimally, thus producing a high-quality image that covers a wide range.

It is preferable that the second reflection surface is formed integrally with a lens of the refractive optical system. This configuration can improve the manufacturing cost and efficiency and reduce the number of optical components required for the wide-angle imaging optical system. Moreover, the deviation between the optical axes of optical elements in the reflective optical system and the refractive optical system is reduced, thereby making the optical system resistant to vibration. Thus, the optical system can maintain high performance, particularly when used as a vehicle-mounted optical system. Further, this configuration combined with the integrally formed first reflection surface and lens of the image-forming optical system enables accurate image display and image processing conversion, since an annular image formed by the first optical system and an annular image formed by the second optical system can have the same central point more precisely.

It is preferable that the shape of the second reflection surface is substantially the same as the shape of a portion of the lens of the refractive optical system that corresponds to the light-transmitting portion. This configuration facilitates processing.

It is preferable that the shape of the second reflection surface differs from the shape of a portion of the lens of the refractive optical system that corresponds to the light-transmitting portion. With this configuration, the lens at the light-transmitting portion can have the same effect as a convex or concave lens, so that various aberrations generated in the wide-angle imaging optical system can be corrected optimally, thus producing a high-quality image that covers a wide range.

It is preferable that the image-forming optical system includes a third reflection surface that reflects rays of light imaged by the image-forming optical system. The third reflection surface can reflect rays of light in the direction substantially perpendicular to the central axis. Therefore, it is possible to increase the optical path length of the wide-angle imaging optical system even in a limited space.

It is preferable that the refractive optical system and the image-forming optical system are transparent to an infrared wavelength region including 1 to 10 μm. With this configuration, the refractive optical system and the image-forming optical system transmit light in a wide range of wavelength regions from visible to infrared. Thus, the apparatus can be used in a wide range of wavelength regions from visible to infrared.

A wide-angle imaging apparatus of the present invention includes the wide-angle imaging optical system of the present invention and an imaging device for picking up an image formed by the image-forming optical system. The wide-angle imaging apparatus can produce a panoramic image that covers a wide range, i.e., a maximum horizontal angle of view of 360 degrees and a vertical angle of view of about 180 degrees. Moreover, the main optical system can be composed of reflection surfaces that cause no chromatic aberration. This reduces not only man-hours for design but also constraints on fabrication, so that a small, lightweight, low-cost, and bright wide-angle imaging apparatus can be achieved.

In the wide-angle imaging apparatus, it is preferable that a plurality of wide-angle imaging optical systems and the imaging devices that correspond to each of the plurality of wide-angle imaging optical systems are arranged so as to produce separate images of an object. This configuration not only can produce a panoramic image that covers a maximum horizontal angle of view of 360 degrees, but also can increase the vertical angle of view compared with the configuration including a single wide-angle imaging optical system.

It is preferable that two wide-angle imaging optical systems and the imaging devices that correspond to each of the two wide-angle imaging optical systems are arranged so as to produce separate images of an object, and when an axis that joins centers of curvature of the first reflection surface and the second reflection surface is identified as a central axis, the two wide-angle imaging optical systems are arranged symmetrically with respect to an axis perpendicular to the central axis.

It is preferable that the plurality of wide-angle imaging optical systems share a single imaging device. This configuration is advantageous for small size and lightweight.

It is preferable that when an area in which rays of light enter the reflective optical system is identified as a first imaging area, and an area in which rays of light enter the refractive optical system is identified as a second imaging area, an image picked up by the imaging device includes a circular image that is obtained by taking the second imaging area and an annular image that is obtained by taking the first imaging area and formed outside the circular image, and that the first imaging area and the second imaging area do not overlap with each other, and further that the circular image and the annular image are arranged continuously. This configuration can use the effective area of the imaging device efficiently, eliminate missing or overlapping of images, and ensure accurate imaging.

It is preferable that a protective member is arranged so as to surround the open portion. This configuration can protect the reflective optical system easily and effectively.

It is preferable that the protective member is provided with a film for preventing internal reflection. This configuration effectively can eliminate ghost light that is reflected internally by the protective member and travels through the same optical path as normal light while protecting the reflection optical system easily and effectively.

It is preferable that the protective member is in the form of a substantially frustoconical, and the inner diameter of the protective member at the first reflection surface differs from the inner diameter of the protective member at the second reflection surface. This configuration can control the reflection angle of ghost light and prevent the ghost light from traveling through the same optical path as normal light.

It is preferable that at least one of the refractive optical system and the image-forming optical system has a zoom function. This configuration can produce an enlarged image of an object in the vicinity of the axial direction.

It is preferable that the wide-angle imaging apparatus can be mounted on an object, and a mounting angle can be adjusted. This configuration easily can change the imaging range.

The wide-angle imaging apparatus preferably includes a moving object sensing function. With this configuration, a moving object can be extracted, and therefore any motion in the surroundings can be detected and recognized precisely.

A surveillance imaging apparatus of the present invention includes the wide-angle imaging optical system of the present invention and thus can produce a panoramic image that covers a wide range of horizontal angle of view as well as vertical angle of view. Moreover, reflection surfaces made of a material that reflects light in a wide range of wavelength regions from visible to infrared are combined with lenses made of a material that transmits light in the visible to infrared wavelength regions. Thus, surveillance covering an ultra-wide range can be performed at any time of day or night.

A vehicle-mounted imaging apparatus of the present invention includes the wide-angle imaging optical system of the present invention and thus can produce a panoramic image that covers a wide range of horizontal angle of view as well as vertical angle of view. The image produced is displayed on a vehicle-installed monitor, which is installed in the vehicle, so that the vehicle-mounted imaging apparatus can be used, e.g., as a rear view monitor, a front view monitor, or a side view monitor.

A projection apparatus of the present invention includes the wide-angle imaging optical system of the present invention and thus can project an image of an object that covers an ultra-wide range by using a projector such as a video projector.

Hereinafter, embodiments of the present invention will be described with reference to the drawings.

Embodiment 1

Figure 2:
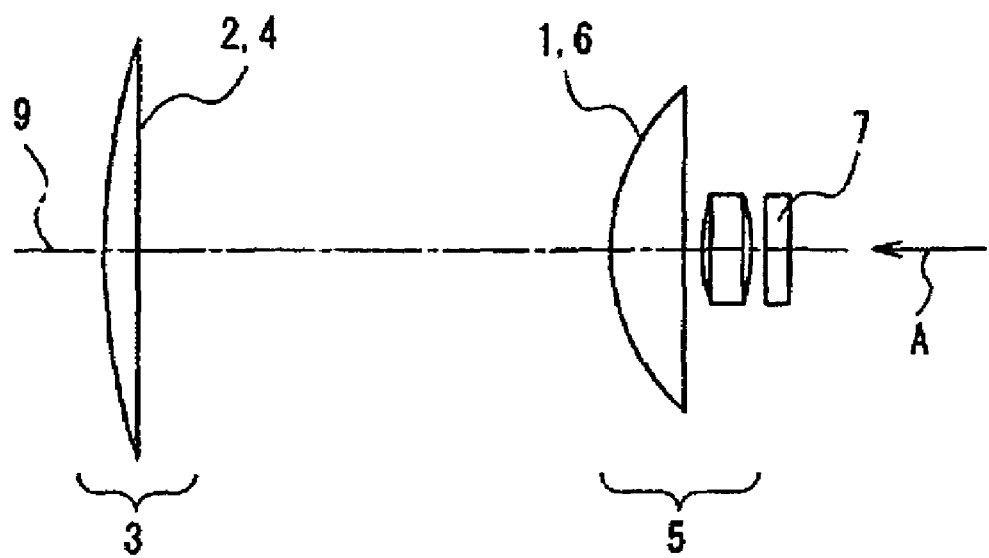
FIG. 2 is a schematic side view of a wide-angle imaging apparatus according to Embodiment 1 of the present invention.
Figure 3:
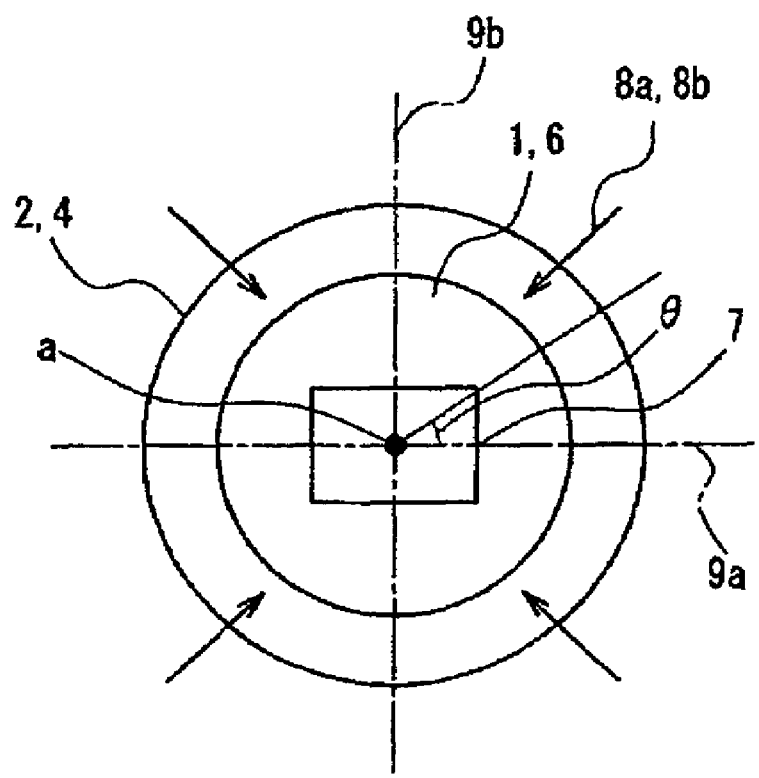
FIG. 3 is a view in the direction of the arrow A in FIG. 2.
Figure 4:
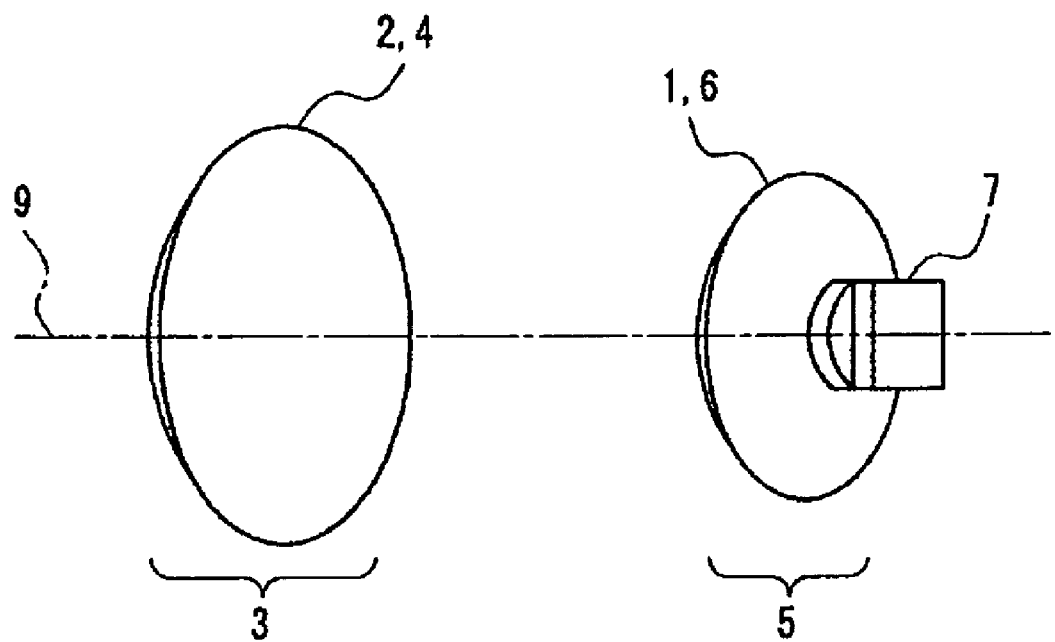
FIG. 4 is a schematic perspective view of a wide-angle imaging apparatus according to Embodiment 1 of the present invention.

FIG. 1 is a schematic cross-sectional view showing the basic configuration of a wide-angle imaging apparatus in Embodiment 1, taken along a plane containing a central axis 9. FIG. 2 is a side view of the substantial portion of the apparatus. FIG. 3 is a view in the direction of the arrow A in FIG. 2. FIG. 4 is a perspective view of the substantial portion of the apparatus. The wide-angle imaging apparatus in FIG. 1 includes a refractive optical system 3, a reflective optical system composed of a first reflection surface 1 and a second reflection surface 2, and an image-forming optical system 5. The central axis 9 joins centers of curvature of the first reflection surface 1 and the second reflection surface 2.

The optical system of the wide-angle imaging apparatus in FIG. 1 includes a first optical system and a second optical system. For the first optical system, the reflective optical system and the image-forming optical system 5 are arranged in the indicated order as seen from a longer conjugate distance side. For the second optical system, the refractive optical system 3 and the image-forming optical system 5 are arranged in the indicated order as seen from the longer conjugate distance side. In the example of FIG. 1, the longer conjugate distance side is opposite to an image plane (an imaging device 7). The same is true in the following drawings.

The first reflection surface 1 has a convex surface as seen from incident light 8*b* (rays of light from a first imaging area) from the outside (an object). The second reflection surface 2 has a concave surface as seen from the incident light 8*b*. A lens 6 of the image-forming optical system 5 is formed integrally with the first reflection surface 1, while a lens 4 of the refractive optical system 3 is formed integrally with the second reflection surface 2.

Incident light 8*a* (rays of light from a second imaging area) from the outside (an object) is refracted by the refractive optical system 3, passes through a light-transmitting portion 2*a*, i.e., a circular opening provided in the second reflection surface 2 and a circular aperture 1*a* provided in the first reflection surface 1, then is imaged by the image-forming optical system 5, and picked up by the imaging device 7.

The incident light 8*b* is reflected successively by the convex surface of the first reflection surface 1 and the concave surface of the second reflection surface 2, passes through the aperture 1*a* provided in the first reflection surface 1, then is imaged by the image-forming optical system 5, and picked up by the imaging device 7.

The first reflection surface 1 and the second reflection surface 2 are rotationally aspheric surfaces that are symmetrical with respect to the central axis 9. In this embodiment, the first reflection surface 1 and the second reflection surface 2 are obtained by rotating a parabola.

In FIG. 3, the central axis 9 passes through a point a where centerlines 9*a*, 9*b* cross at right angles. As can be seen from FIGS. 1 to 3, the first reflection surface 1 and the second reflection surface 2 are spaced at a predetermined distance away from each other on the central axis 9. Thus, an open portion is provided between the first reflection surface 1 and the second reflection surface 2 so that the portion is open toward the whole circumference of a circle whose center is on the central axis 9.

Therefore, the incident light 8*a*, 8*b* from the outside can enter any position of an angle θ ranging from 0 to 360 degrees, as shown in FIG. 3. In FIG. 1, on the other hand, when a vertical angle of view a is defined as positive in the counterclockwise direction, the rays of light 8*a* from the second imaging area are imaged by the wide-angle imaging optical system at a vertical angle of view a of about −30 to 30 degrees, while the rays of light 8*b* from the first imaging area are imaged at a vertical angle of view a of about 30 to 90 degrees and −30 to −90 degrees. Thus, the wide-angle imaging apparatus of this embodiment has a maximum horizontal angle of view of 360 degrees and a maximum vertical angle of view of about 180 degrees.

Figure 5:
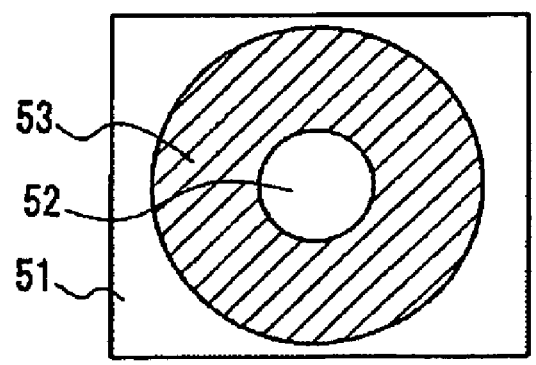
FIG. 5 is a schematic view of an image that appears on an imaging device of a wide-angle imaging apparatus according to Embodiment 1 of the present invention.

FIG. 5 shows the image of an object in a large area that is produced by the wide-angle imaging apparatus in FIG. 1. A circular image 52 of the second imaging area and an annular image 53 of the first imaging area appear on an imaging device 51. Since the imaging range of the first imaging area continues to that of the second imaging area, the circular image 52 and the annular image 53 are formed into a single continuous circular image. Therefore, the effective area of the imaging device 51 can be used efficiently. This image can be produced by making the aperture 1*a* and the light-transmitting portion 2*a* circular in shape, by adjusting the shape and arrangement of the reflection surfaces in the reflective optical system, and further by adjusting the shape and arrangement of the lenses in the refractive optical system 3 and the image-forming optical system 5.

It is preferable that a magnification for image formation of the first optical system and a magnification for image formation of the second optical system have the same sign. Thus, when the image formed by the first optical system is an erect image, the image formed by the second optical system also is an erect image. Moreover, when the image formed by the first optical system is an inverted image, the image formed by the second optical system also is an inverted image. Therefore, a continuous image can be obtained. In this case, it is more preferable that the magnification for image formation of the first optical system and the magnification for image formation of the second optical system are both negative. With the negative sign, the wide-angle imaging optical system is not a relay optical system, and the entire length of the optical system is reduced, so that a smaller apparatus can be achieved. The same is true in the following embodiments.

As described above, this embodiment allows the main optical system to be composed of reflection surfaces that cause no chromatic aberration. Therefore, not only man-hours for design but also constraints on fabrication can be reduced, providing a small, lightweight, low-cost, and bright wide-angle imaging apparatus. Moreover, the lenses of the refractive optical system and the reflective optical system and the reflection surfaces that are formed integrally with these lenses have an aspheric surface, so that various aberrations generated in the optical system can be corrected. Further, as shown in FIG. 5, it is possible to produce a panoramic image that covers an ultra-wide range (i.e., a maximum horizontal angle of view of 360 degrees and a maximum vertical angle of view of about 180 degrees) while using the imaging device efficiently.

In this embodiment, the first reflection surface 1 and the second reflection surface 2 are rotationally aspheric surfaces obtained by rotating a parabola. However, the reflection surfaces may be obtained by rotating an ellipse including a circle or a hyperbola. The same is true in the following embodiments.

For each of the lenses 4, 6, the portion provided with the reflection surface and the portion corresponding to the light-transmitting portion 2a or the aperture 1a are formed in a continuous uniform shape. However, the lens shape may be changed, e.g., by reversing the convexity and concavity of the lens at the light-transmitting portion 2a or the aperture 1a, which will be described in detail in the following embodiments.

Embodiment 2

Figure 6:
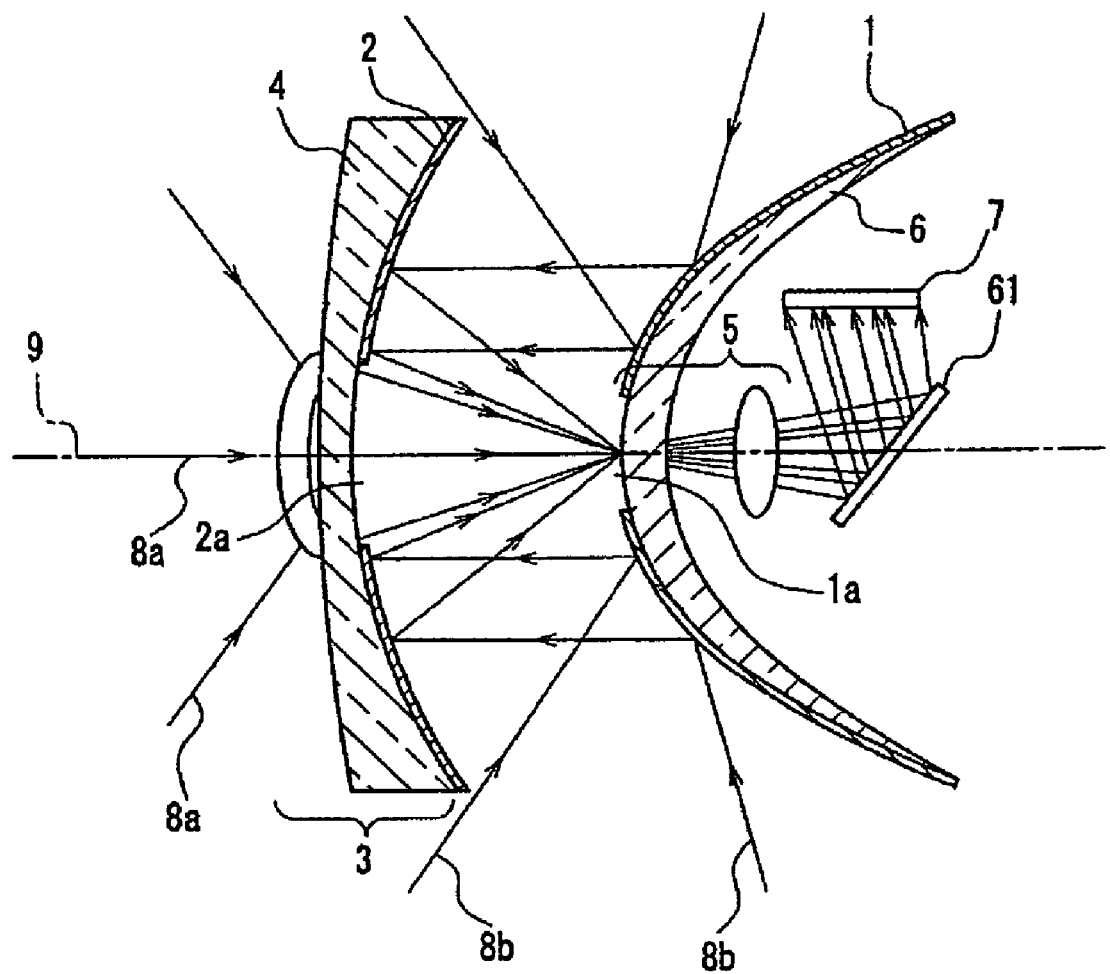
FIG. 6 is a schematic cross-sectional view of a wide-angle imaging apparatus according to Embodiment 2 of the present invention.
Figure 7:
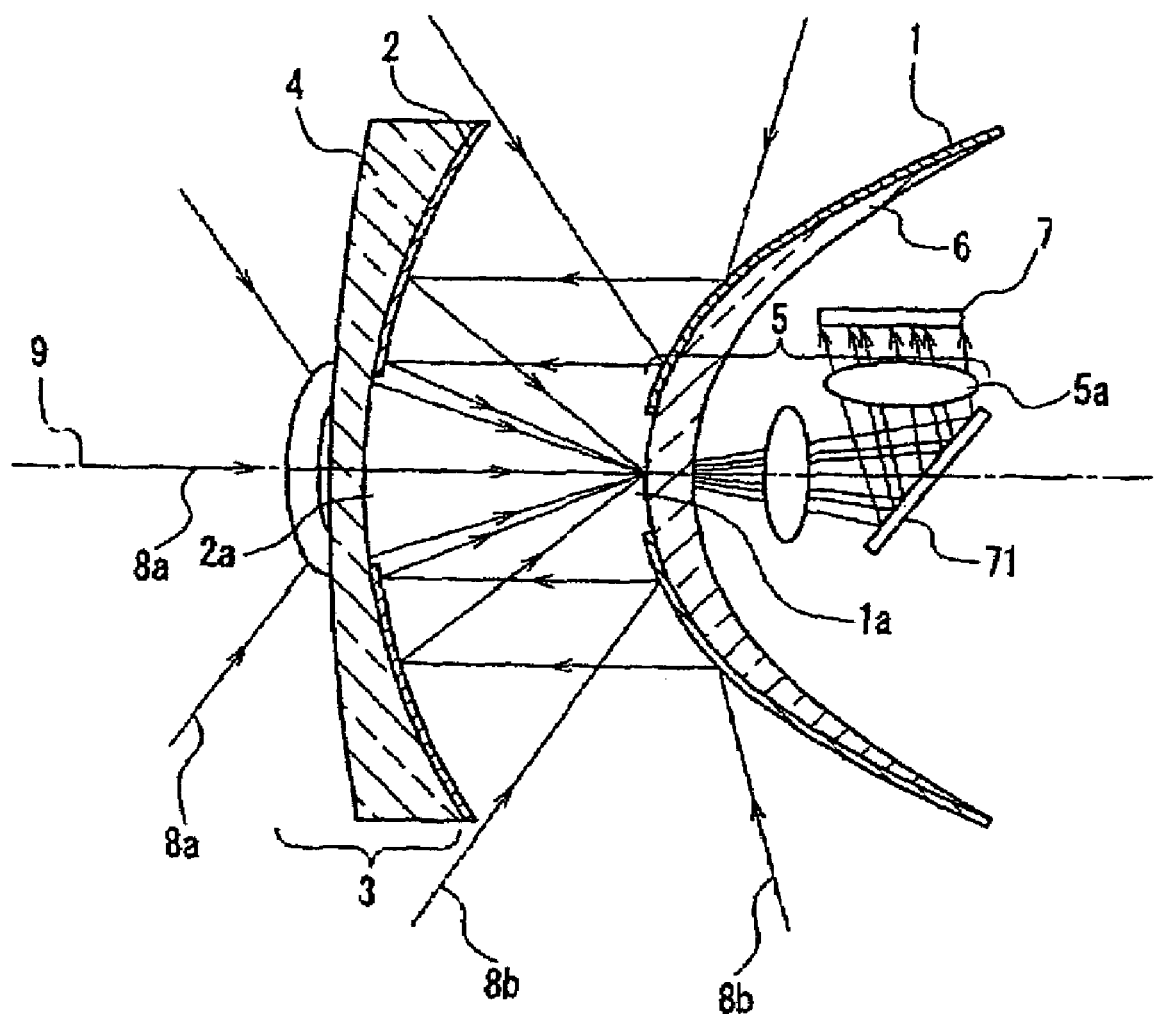
FIG. 7 is a schematic cross-sectional view of another example of a wide-angle imaging apparatus according to Embodiment 2 of the present invention.

FIGS. 6 and 7 are schematic cross-sectional views showing the basic configuration of a wide-angle imaging apparatus in Embodiment 2, taken along a plane containing a central axis 9. This embodiment is the same as Embodiment 1 (FIGS. 1 to 5) in basic configuration, but different in that a third reflection surface 61 with a flat surface of reflection is arranged in the optical path between the image-forming optical system 5 and the imaging device 7.

In FIG. 6, incident light 8a from the outside is refracted by the refractive optical system 3, passes through the light-transmitting portion 2a provided in the second reflection surface 2 and the aperture 1a provided in the first reflection surface 1, then is imaged by the image-forming optical system 5, reflected by the third reflection surface 61 in one direction, and picked up by the imaging device 7. Incident light 8b from the outside is reflected successively by the convex surface of the first reflection surface 1 and the concave surface of the second reflection surface 2, passes through the aperture 1a provided in the first reflection surface 1, then is imaged by the image-forming optical system 5, reflected by the third reflection surface 61 in one direction, and picked up by the imaging device 7. Consequently, the optical system can be made shorter in the direction of the central axis 9 by using the third reflection surface 61, thus reducing the size of the apparatus.

FIG. 7 is a schematic view showing another example of the basic configuration of a wide-angle imaging apparatus in Embodiment 2. This configuration is different from the configuration in FIG. 6 in that a condenser 5a is arranged between a third reflection surface 71 with a flat surface of reflection and the imaging device 7 in the image-forming optical system 5. Like the configuration in FIG. 6, the apparatus can be made shorter in the direction of the central axis 9 by using the third reflection surface 71, thus reducing the size of the apparatus.

Figure 8:
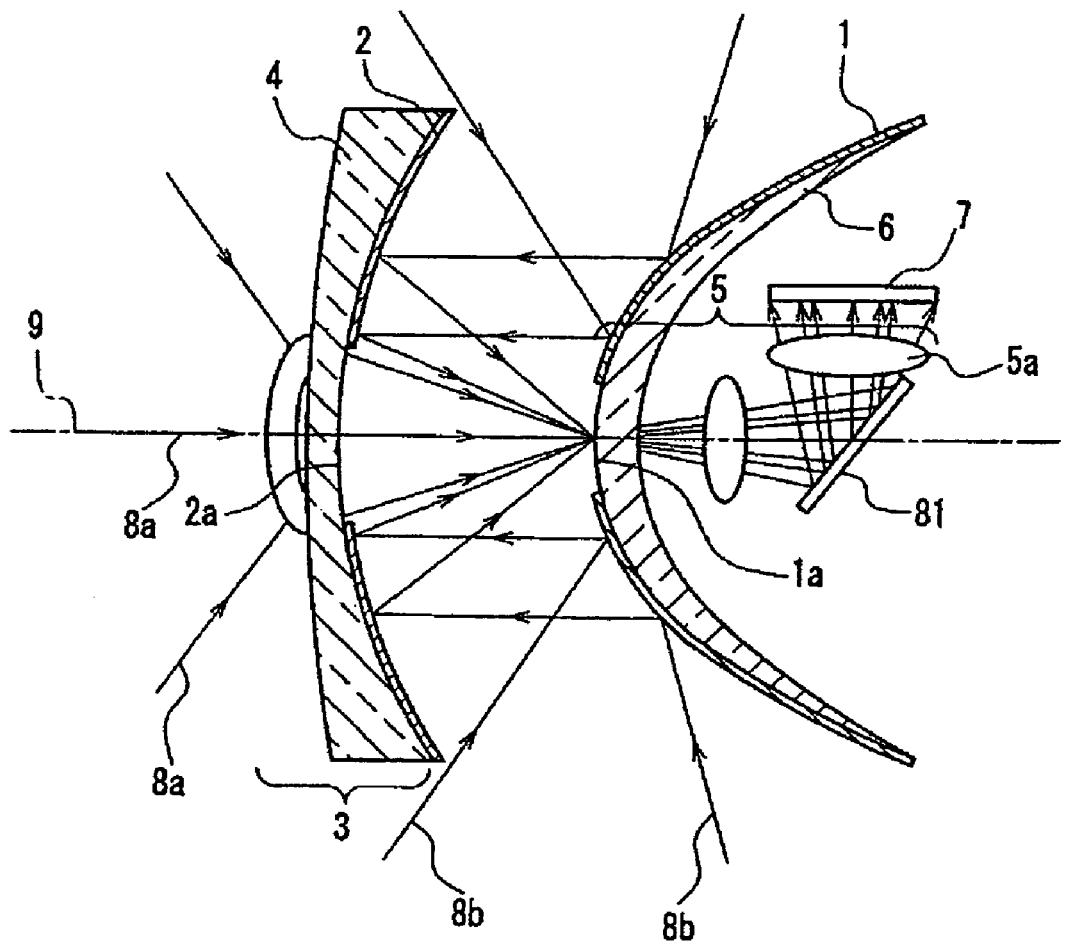
FIG. 8 is a schematic cross-sectional view of yet another example of a wide-angle imaging apparatus according to Embodiment 2 of the present invention.

For an embodiment as shown in FIG. 8, the basic configuration is the same as that in FIG. 7, but different in that a third reflection surface 81 with a flat surface of reflection is arranged so as to reflect rays of light that have been imaged by the image-forming optical system 5 after passing through the aperture 1a of the first reflection surface 1 in the direction substantially perpendicular to the central axis 9. This makes it possible not only to reduce the size of the wide-angle imaging apparatus, but also to increase the optical path length of the wide-angle imaging optical system even in a limited space.

Embodiment 3

Figure 9:
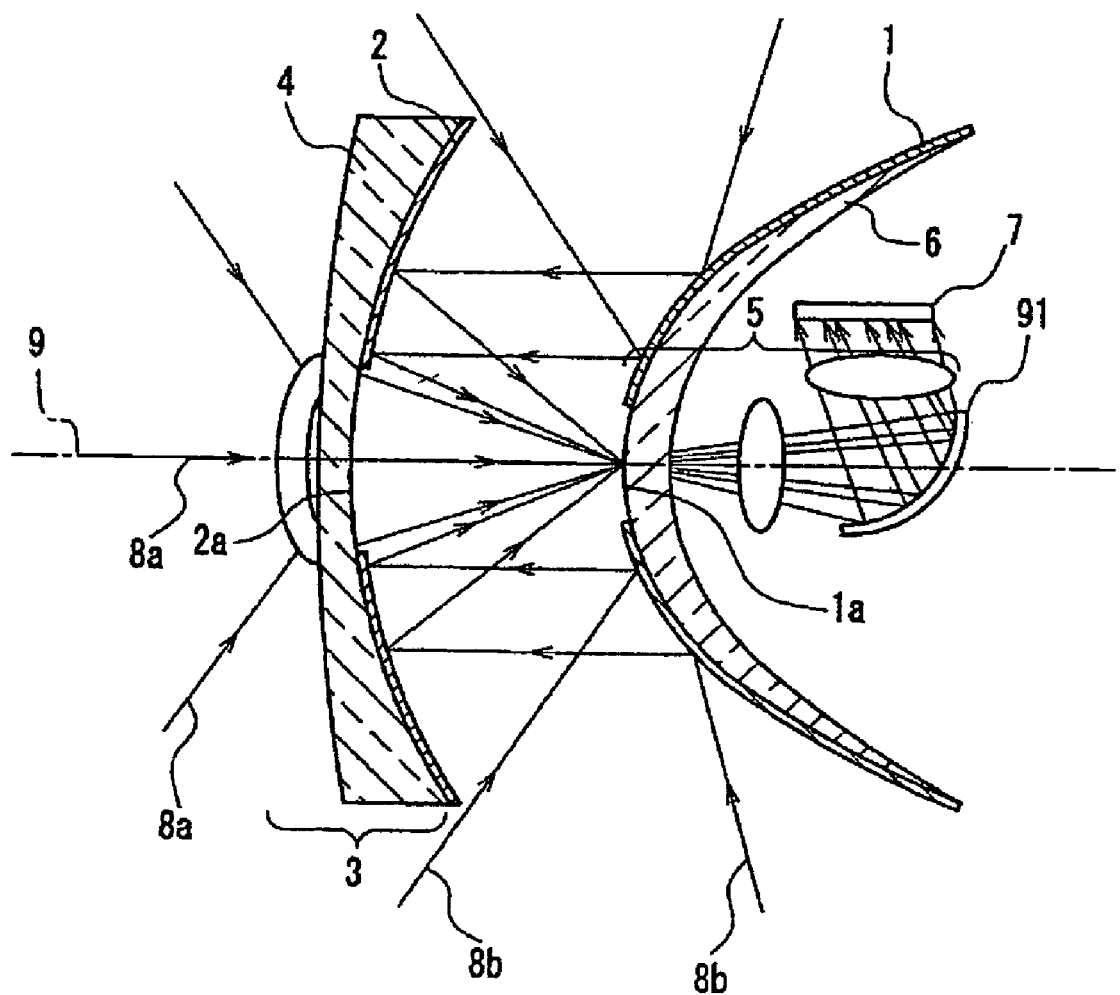
FIG. 9 is a schematic cross-sectional view of a wide-angle imaging apparatus according to Embodiment 3 of the present invention.

FIG. 9 is a schematic cross-sectional view showing the basic configuration of a wide-angle imaging apparatus in Embodiment 3, taken along a plane containing a central axis 9. This embodiment is the same as Embodiment 2 (FIGS. 6 to 8) in basic configuration, but different in that the third reflection surface is curved.

In FIG. 9, incident light 8a from the outside is refracted by the refractive optical system 3, passes through the light-transmitting portion 2a provided in the second reflection surface 2 and the aperture 1a provided in the first reflection surface 1, then is imaged by the image-forming optical system 5, reflected by a third reflection surface 91 with a curved surface of reflection in one direction, further imaged by the image-forming optical system 5, and picked up by the imaging device 7. Incident light 8b from the outside is reflected successively by the convex surface of the first reflection surface 1 and the concave surface of the second reflection surface 2, passes through the aperture 1a provided in the first reflection surface 1, then is imaged by the image-forming optical system 5, reflected by the third reflection surface 91 in one direction, further imaged by the image-forming optical system 5, and picked up by the imaging device 7. The third reflection surface 91 is arranged so as to reflect rays of light that have passed through the aperture 1a in the direction substantially perpendicular to the central axis 9. The third reflection surface 91 may have any curved surface such as a cylindrical surface, a toric surface, or a free-form surface. The free-form surface is a curved surface that does not have the axis of rotational symmetry.

Figure 10:
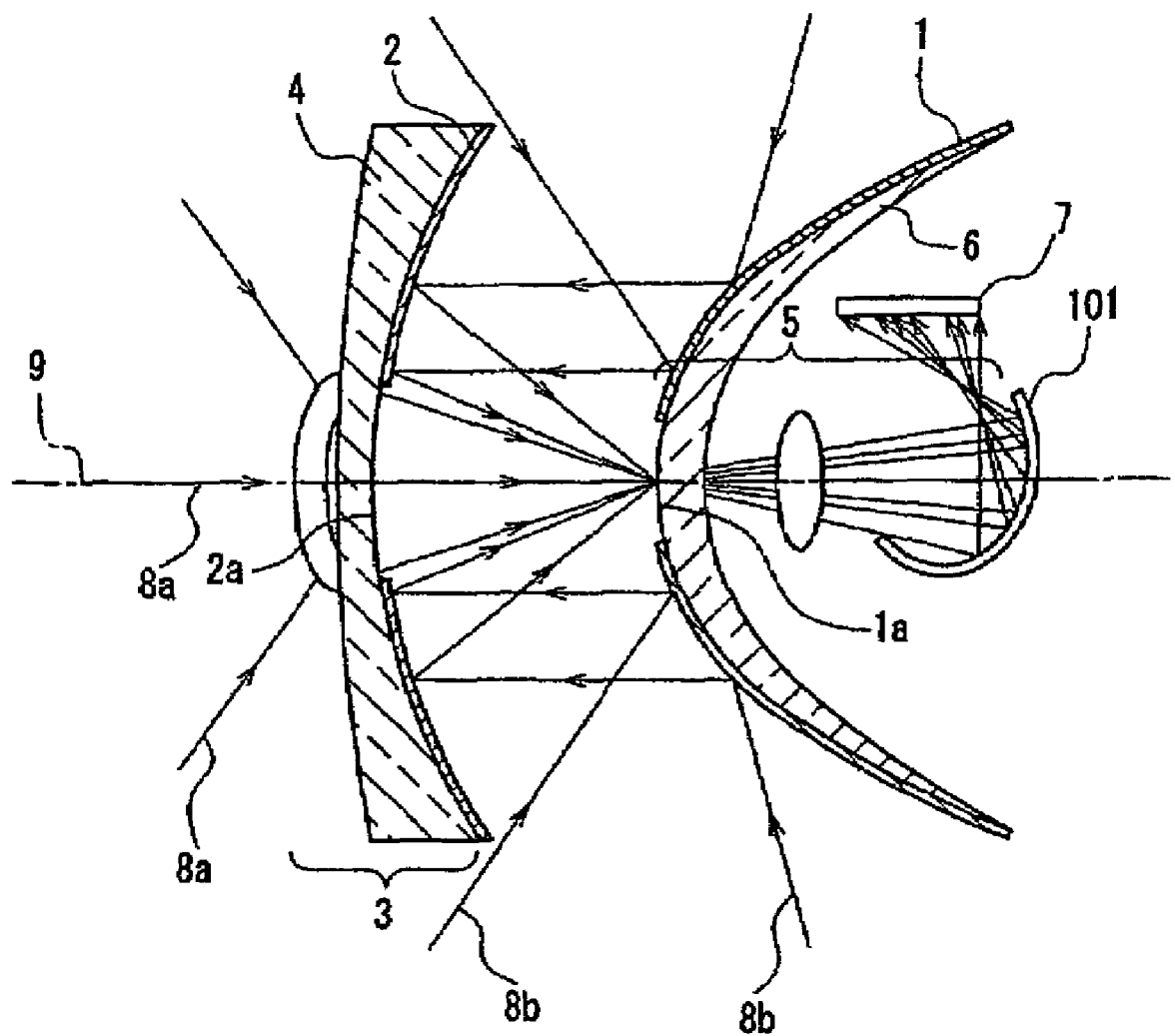
FIG. 10 is a schematic cross-sectional view of another example of a wide-angle imaging apparatus according to Embodiment 3 of the present invention.

For an embodiment as shown in FIG. 10, a third reflection surface 101 is curved and arranged so as to reflect rays of light that have passed through the aperture 1a in the direction substantially perpendicular to the central axis 9. In this embodiment, the third reflection surface 101 has a toric surface or free-form surface, so that the number of lenses in the image-forming optical system is reduced compared with the embodiment in FIG. 9.

Like Embodiment 2, this embodiment can reduce the size of the apparatus by using the third reflection surface. Moreover, the third reflection surface is arranged so as to reflect rays of light in the direction substantially perpendicular to the central axis 9. Therefore, it is possible to increase the optical path length of the wide-angle imaging optical system even in a limited space.

Embodiment 4

Figure 11:
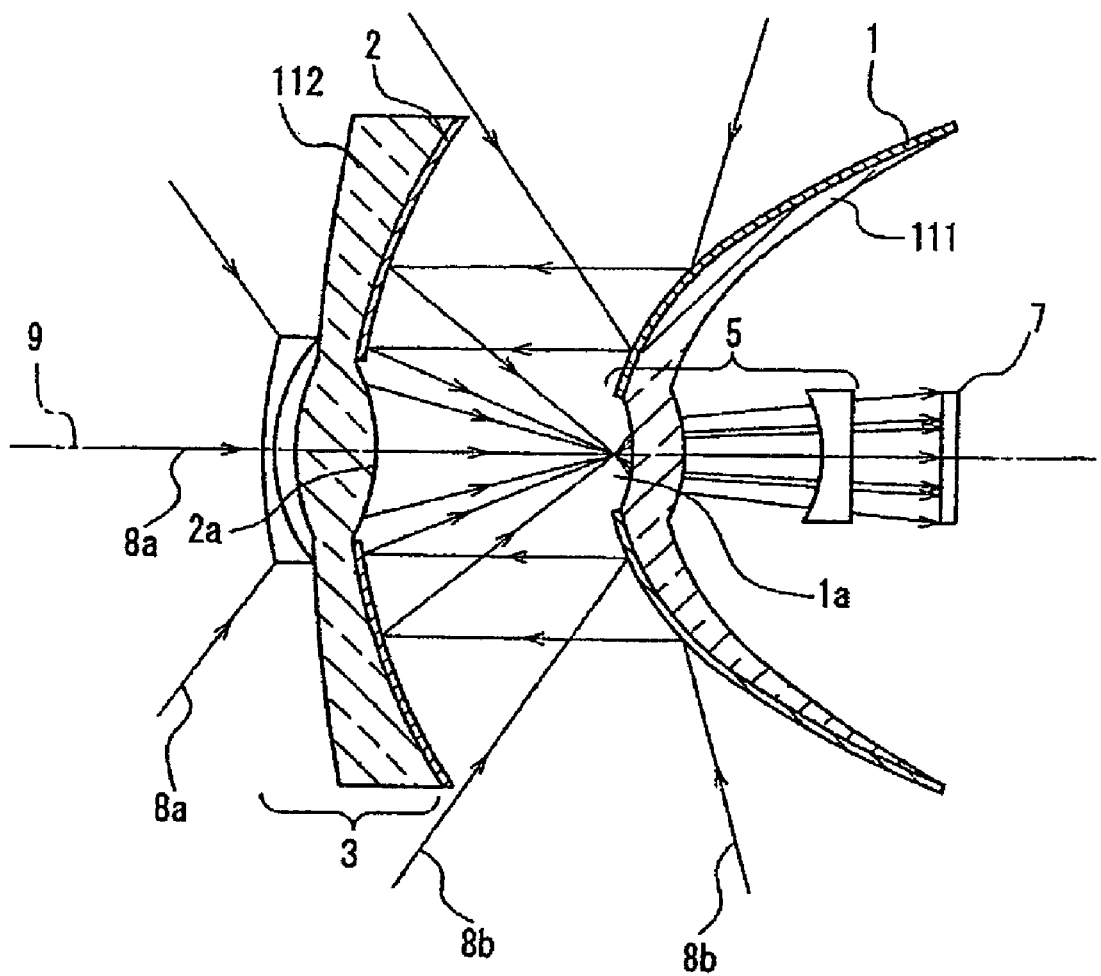
FIG. 11 is a schematic cross-sectional view of a wide-angle imaging apparatus according to Embodiment 4 of the present invention.

FIG. 11 is a schematic cross-sectional view showing the basic configuration of a wide-angle imaging apparatus in Embodiment 4, taken along a plane containing a central axis 9. This embodiment is the same as Embodiment 1 (FIGS. 1 to 5) in basic configuration, but different in that the shape of each reflection surface differs from the shape of a portion of each lens that corresponds to the aperture and the light-transmitting portion.

In the configuration in FIG. 1, the shape of the first reflection surface 1 is substantially the same as the shape of a portion of the lens 6 that corresponds to the aperture 1*a*. Similarly, the shape of the second reflection surface 2 is substantially the same as the shape of a portion of the lens 4 that corresponds to the light-transmitting portion 2*a*.

In the embodiment in FIG. 11, a portion of a lens 111 provided with the first reflection surface 1 is formed so that both surfaces, one facing the object side and the other facing the image plane side, are convex toward the object side. In the aperture 1*a*, however, both surfaces are concave toward the object side. On the other hand, a portion of a lens 112 provided with the second reflection surface 2 is formed so that both surfaces, one facing the object side and the other facing the image plane side, are convex toward the object side. In the light-transmitting portion 2*a*, however, the surface on the image plane side is concave toward the object side, while the surface on the object side is convex toward the object side. In this case, the degree of convexity in the light-transmitting portion 2*a* differs from that in the portion of the lens 112 provided with the second reflection surface 2.

Consequently, in the configuration in FIG. 11, the shape of the first reflection surface 1 differs from the shape of a portion of the lens 111 that corresponds to the aperture 1*a*. Similarly, the shape of the second reflection surface 2 differs from the shape of a portion of the lens 112 that corresponds to the light-transmitting portion 2*a*.

In this configuration, incident light 8*a* from the outside is refracted by the refractive optical system 3, passes through the light-transmitting portion 2*a* and the aperture 1*a* provided in the first reflection surface 1, then is imaged by the image-forming optical system 5, and picked up by the imaging device 7.

Incident light 8*b* from the outside is reflected successively by the convex surface of the first reflection surface 1 and the concave surface of the second reflection surface 2, passes through the aperture 1*a* provided in the first reflection surface 1, then is imaged by the image-forming optical system 5, and picked up by the imaging device 7. As described above, when the basic cross section of the lens in the light-transmitting portion or aperture is different from the basic cross section of the lens in a portion provided with the reflection surface, the effect can be comparable to that obtained by arranging a special convex or concave lens separately at the light-transmitting portion or aperture. Moreover, various aberrations generated in the wide-angle imaging optical system can be corrected optimally, thus producing a high-quality image that covers a wide range.

Figure 12:
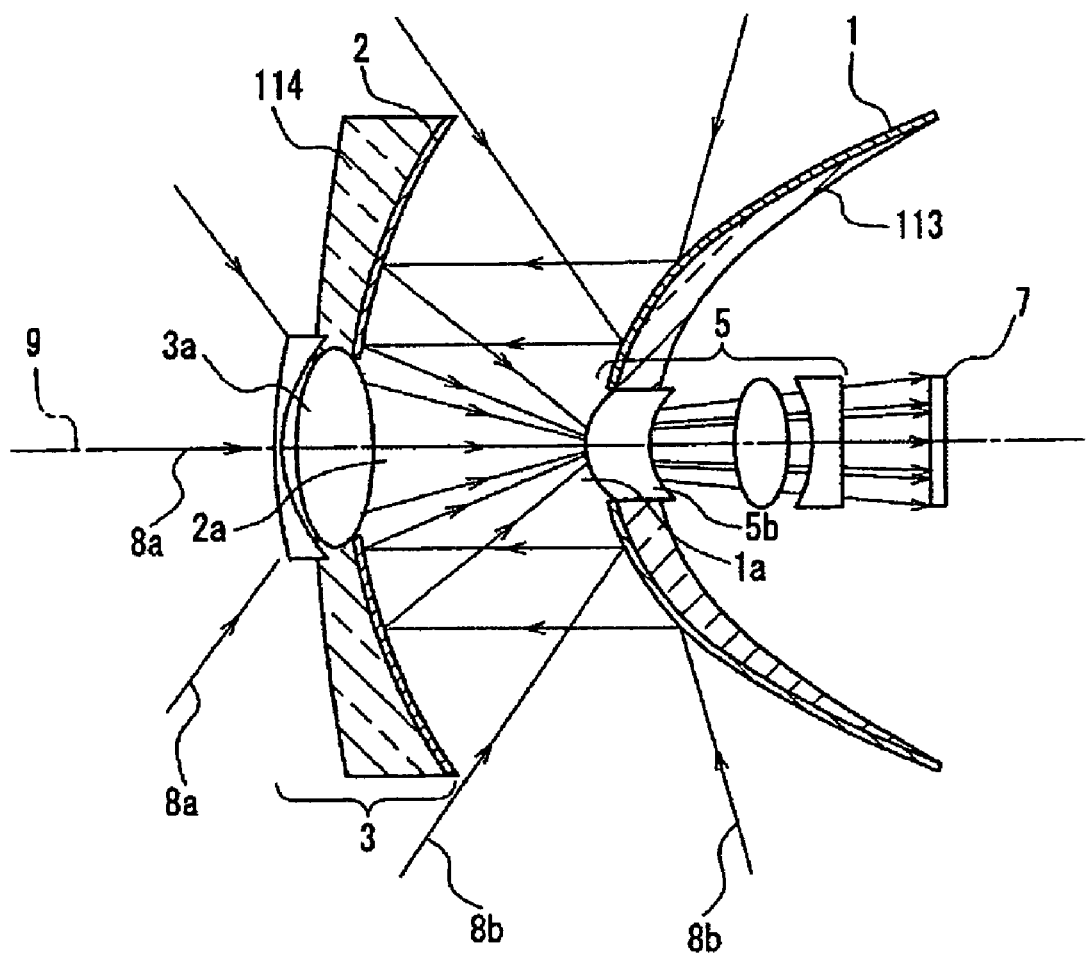
FIG. 12 is a schematic cross-sectional view of another example of a wide-angle imaging apparatus according to Embodiment 4 of the present invention.

FIG. 12 is a schematic cross-sectional view showing another example of the basic configuration of a wide-angle imaging apparatus in Embodiment 4, taken along a plane containing a central axis 9. This embodiment is the same as Embodiment 1 (FIGS. 1 to 5) in basic configuration, but different in that the first reflection surface 1 and the second reflection surface 2 are formed integrally with a resin substrate, and special lenses different from the resin substrate are arranged at the light-transmitting portion 2*a* and the aperture 1*a*, respectively. In this embodiment, the shape of the first reflection surface 1 differs from the shape of a portion of the lens that corresponds to the aperture 1*a*. Similarly, the shape of the second reflection surface 2 differs from the shape of a portion of the lens that corresponds to the light-transmitting portion 2*a*.

In FIG. 12, the first reflection surface 1 is formed integrally with a first resin substrate 113, while the second reflection surface 2 is formed integrally with a second resin substrate 114. Incident light 8*a* from the outside is refracted by the refractive optical system 3 including a lens 3*a*, passes through the light-transmitting portion 2*a* provided in the second reflection surface 2 and the second resin substrate 114 and the aperture 1*a* provided in the first reflection surface 1 and the first resin substrate 113, then is imaged by the image-forming optical system 5 including a lens 5*b*, and picked up by the imaging device 7.

Incident light 8*b* from the outside is reflected successively by the convex surface of the first reflection surface 1 and the concave surface of the second reflection surface 2, passes through the aperture 1*a* provided in the first reflection surface 1 and the first resin substrate 113, then is imaged by the image-forming optical system 5, and picked up by the imaging device 7.

As described above, the configuration in FIG. 12 can use special lenses for the light-transmitting portion 2*a* and the aperture 1*a*, respectively. Therefore, various aberrations generated in the wide-angle imaging optical system can be corrected optimally by changing the lens arrangement of the refractive optical system 3 and the image-forming optical system 5, thus producing a high-quality image that covers a wide range.

The image-forming optical system 5 can be held in contact with the aperture 1*a* provided in the first reflection surface 1 and the first resin substrate 113. Alternatively, the image-forming optical system 5 also can be held by being inserted into the aperture 1*a*. Similarly, the refractive optical system 3 can be held in contact with the light-transmitting portion 2*a* provided in the second reflection surface 2 and the second resin substrate 114. Alternatively, the refractive optical system 3 also can be held by being inserted into the light-transmitting portion 2*a*. An adhesive or the like may be used to hold the optical systems.

In FIG. 12, only the lens 5*b* of the lenses in the image-forming optical system 5 is held by the first resin substrate 113. However, when the lenses are fixed into one component, the entire image-forming optical system 5 can be held by the first resin substrate 113.

In the examples of FIGS. 11 and 12, the reflection surface has a different shape from the lens in both of the aperture 1*a* and the light-transmitting portion 2*a*. However, the reflection surface may have a different shape from the lens in either of the aperture 1*a* or the light-transmitting portion 2*a*.

Embodiment 5

Figure 13:
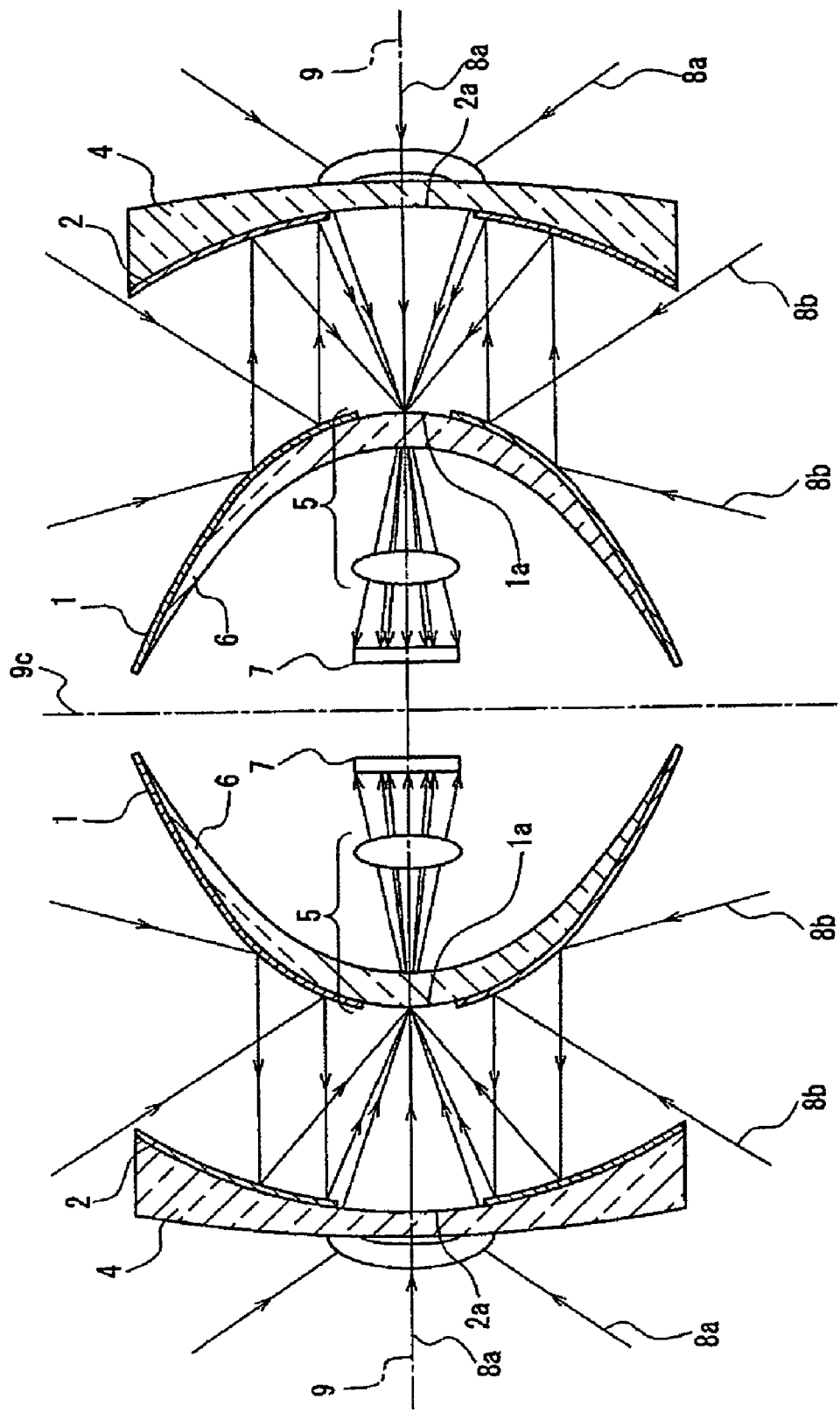
FIG. 13 is a schematic cross-sectional view of a wide-angle imaging apparatus according to Embodiment 5 of the present invention.

FIG. 13 is a schematic cross-sectional view showing the basic configuration of a wide-angle imaging apparatus in Embodiment 5, taken along a plane containing a central axis 9. This embodiment uses two wide-angle imaging optical systems of Embodiment 1 as shown in FIG. 1, and they are arranged symmetrically from side to side.

FIGS. 2 to 4 also can be applied to half of the wide-angle imaging optical systems of this embodiment. Although the illustration that corresponds to FIGS. 2 to 4 is not shown in the following embodiments, the illustration of the reflection surfaces is the same as FIGS. 2 to 4.

The basic configuration and operation of half of the wide-angle imaging optical systems are the same as those in Embodiment 1. Incident light 8*a* from the outside is refracted by the refractive optical system 3, passes through the light-transmitting portion 2*a* provided in the second reflection surface 2 and the aperture 1*a* provided in the first reflection surface 1, then is imaged by the image-forming optical system 5, and picked up by the imaging device 7.

Incident light 8*b* from the outside is reflected successively by the convex surface of the first reflection surface 1 and the concave surface of the second reflection surface 2, passes through the aperture 1a provided in the first reflection surface 1, then is imaged by the image-forming optical system 5, and picked up by the imaging device 7.

Like Embodiment 1, half of the wide-angle imaging optical systems has a maximum horizontal angle of view of 360 degrees and a maximum vertical angle of view of 180 degrees. In FIG. 13, a centerline 9c and the central axis 9 cross at right angles, and the two wide-angle imaging optical systems are symmetrical with respect to the centerline 9c. The left wide-angle imaging optical system has a vertical angle of view of about 180 degrees, and the right wide-angle imaging optical system has a vertical angle of view of about 180 degrees. In other words, this embodiment uses two imaging optical systems to produce separate images of an object in a large area at a vertical angle of view of 360 degrees in total.

Figure 14:
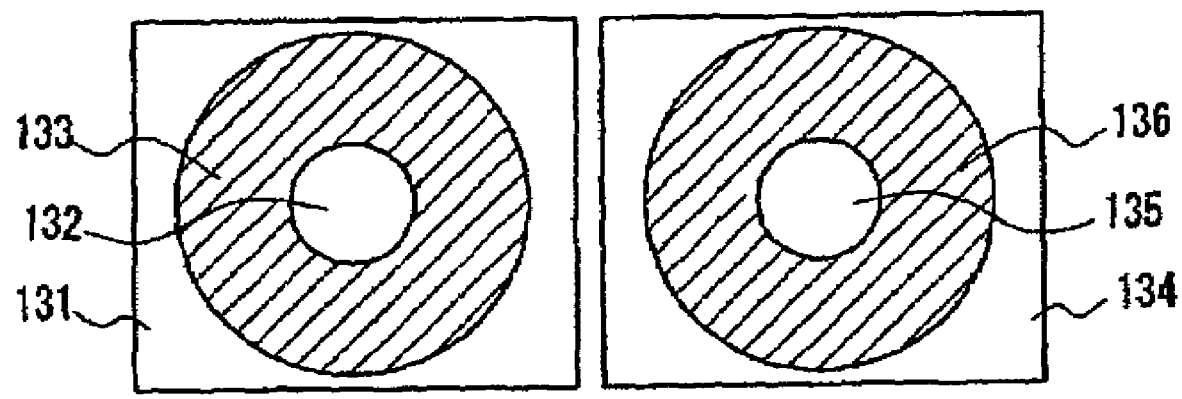
FIG. 14 is a schematic view of an image that appears on an imaging device of a wide-angle imaging apparatus according to Embodiment 5 of the present invention.

FIG. 14 shows the images of an object in a large area that are produced by the wide-angle imaging apparatus in FIG. 13. A circular image 132 of the second imaging area and an annular image 133 of the first imaging area appear on a first imaging device 131. Since the imaging range of the first imaging area continues to that of the second imaging area, the circular image 132 and the annular image 133 are formed into a single continuous circular image. Therefore, the effective area of the first imaging device 131 can be used efficiently.

Similarly, a circular image 135 of the second imaging area and an annular image 136 of the first imaging area appear on a second imaging device 134. Since the imaging range of the first imaging area continues to that of the second imaging area, the circular image 135 and the annular image 136 are formed into a single continuous circular image. Therefore, the effective area of the second imaging device 134 can be used efficiently.

As described above, this embodiment can produce a panoramic image that covers a maximum horizontal angle of view of 360 degrees. Moreover, this embodiment can produce an image at a maximum vertical angle of view of 360 degrees, compared with about 180 degrees in Embodiment 1.

Embodiment 6

Figure 15:
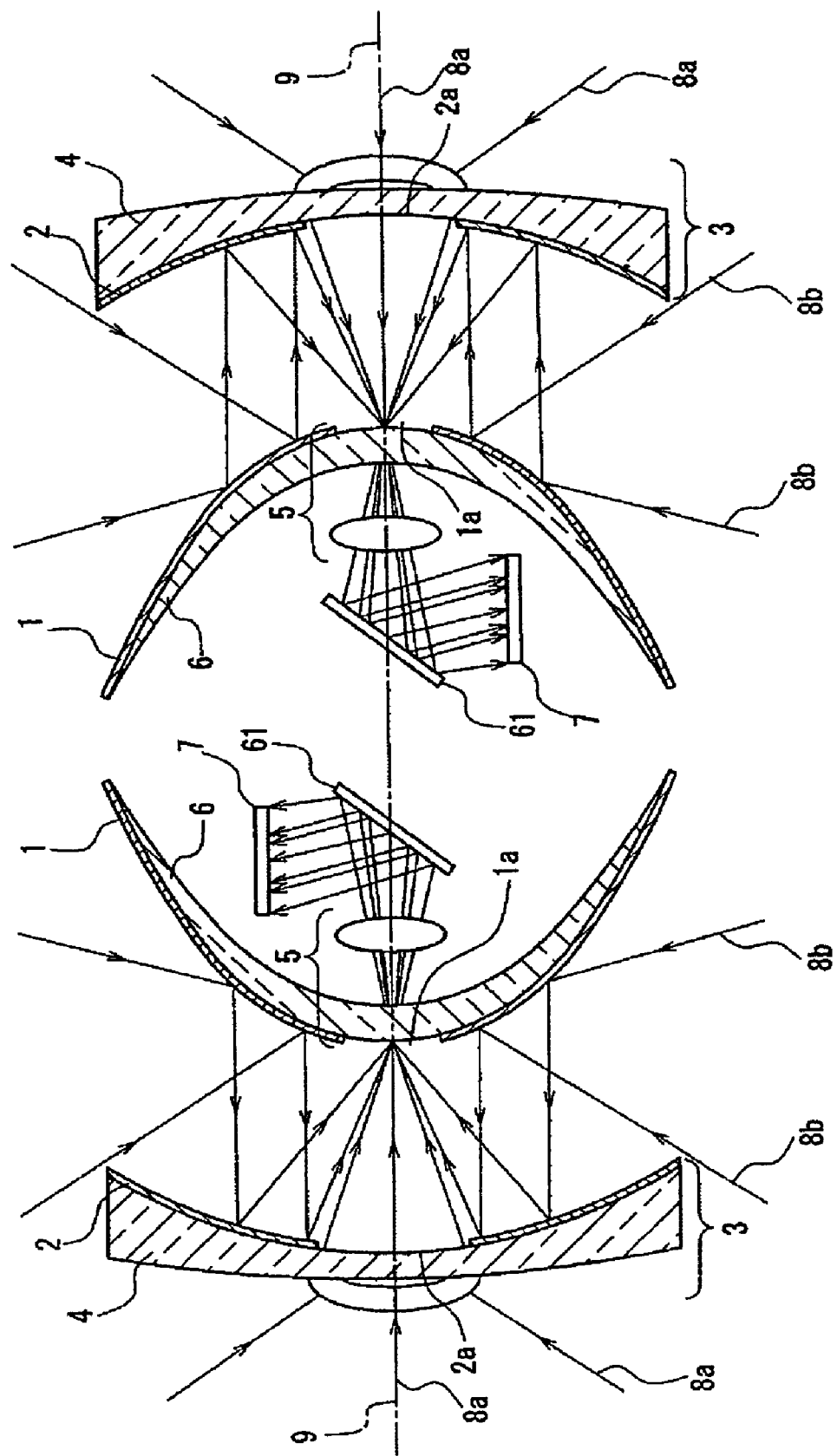
FIG. 15 is a schematic cross-sectional view of a wide-angle imaging apparatus according to Embodiment 6 of the present invention.
Figure 16:
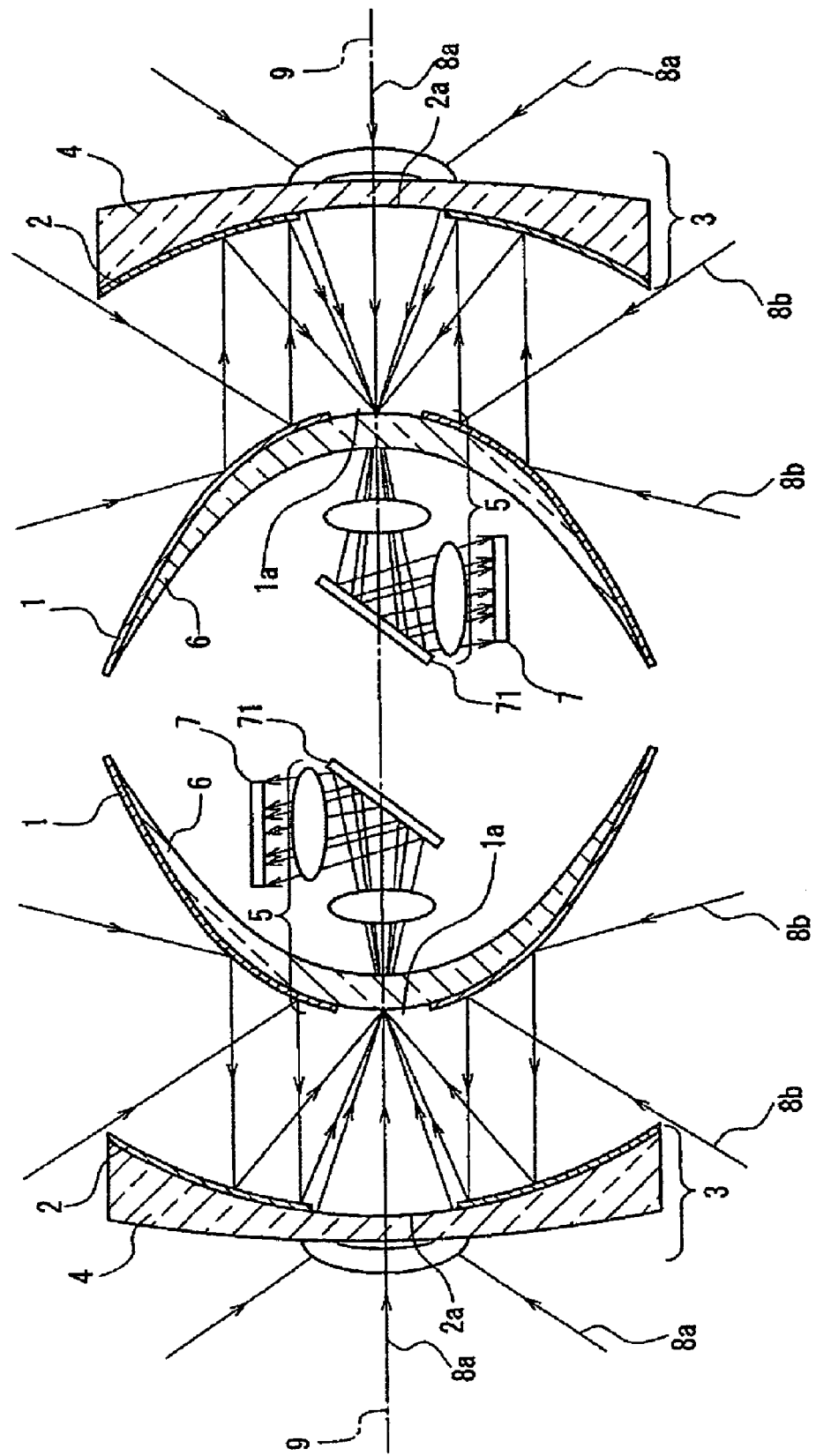
FIG. 16 is a schematic cross-sectional view of another example of a wide-angle imaging apparatus according to Embodiment 6 of the present invention.

FIGS. 15 and 16 are schematic cross-sectional views showing the basic configuration of a wide-angle imaging apparatus in Embodiment 6, taken along a plane containing a central axis 9. This embodiment uses two wide-angle imaging optical systems of Embodiment 2 as shown in FIGS. 6 and 7, and they are arranged symmetrically from side to side. The basic configuration and operation of half of the wide-angle imaging optical systems are the same as those in Embodiment 2.

The configuration in FIG. 15 uses two wide-angle imaging optical systems as shown in FIG. 6. In FIG. 15, incident light 8a from the outside is refracted by the refractive optical system 3, passes through the light-transmitting portion 2a provided in the second reflection surface 2 and the aperture 1a provided in the first reflection surface 1, then is imaged by the image-forming optical system 5, reflected by the third reflection surface 61 with a flat surface of reflection in one direction, and picked up by the imaging device 7.

Incident light 8b from the outside is reflected successively by the convex surface of the first reflection surface 1 and the concave surface of the second reflection surface 2, passes thought the aperture 1a provided in the first reflection surface 1, then is imaged by the image-forming optical system 5, reflected by the third reflection surface 61 in one direction, and picked up by the imaging device 7.

The configuration in FIG. 16 uses two wide-angle imaging optical systems as shown in FIG. 7. In FIG. 16, incident light 8a from the outside is refracted by the refractive optical system 3, passes through the light-transmitting portion 2a provided in the second reflection surface 2 and the aperture 1a provided in the first reflection surface 1, then is imaged by the image-forming optical system 5, reflected by the third reflection surface 71 with a flat surface of reflection in one direction, further imaged by the image-forming optical system 5, and picked up by the imaging device 7.

Incident light 8b from the outside is reflected successively by the convex surface of the first reflection surface 1 and the concave surface of the second reflection surface 2, passes through the aperture 1a provided in the first reflection surface 1, then is imaged by the image-forming optical system 5, reflected by the third reflection surface 71 in one direction, further imaged by the image-forming optical system 5, and picked up by the imaging device 7.

Like Embodiment 2, half of the wide-angle imaging optical systems has a maximum horizontal angle of view of 360 degrees and a maximum vertical angle of view of about 180 degrees. Therefore, this embodiment also can produce an image at a maximum vertical angle of view of 360 degrees using two wide-angle imaging optical systems.

Embodiment 7

Figure 17:
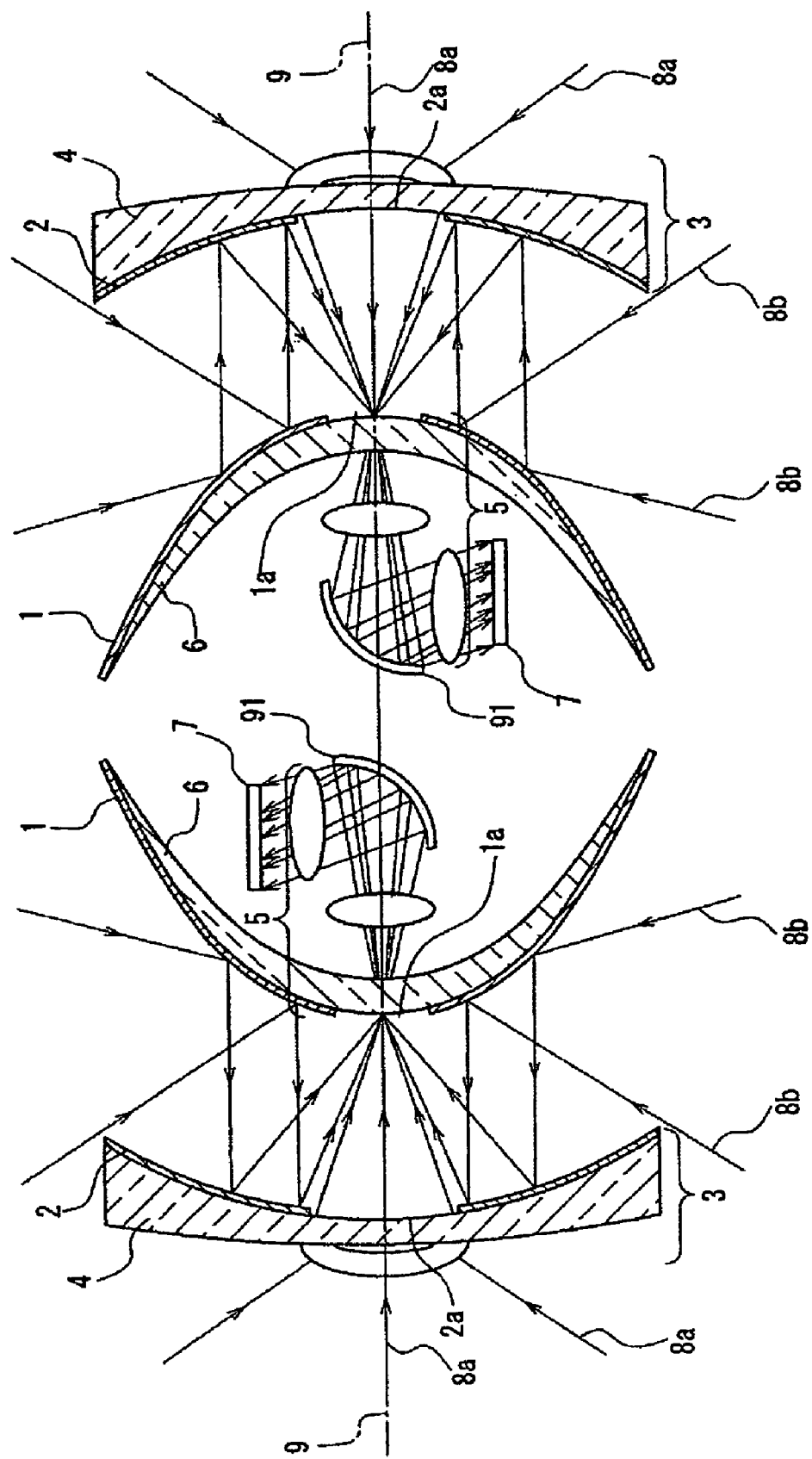
FIG. 17 is a schematic cross-sectional view of a wide-angle imaging apparatus according to Embodiment 7 of the present invention.

FIG. 17 is a schematic cross-sectional view showing the basic configuration of a wide-angle imaging apparatus in Embodiment 7, taken along a plane containing a central axis 9. The basic configuration is the same as that in Embodiment 6 (FIGS. 15 and 16). This embodiment uses two wide-angle imaging optical systems as shown in FIG. 9, and is different from Embodiment 6 in that the third reflection surface is curved. The third reflection surface 91 may have any curved surface such as a cylindrical surface, a toric surface, or a free-form surface.

As in the case of the third reflection surface with a flat surface, this embodiment can make the optical system shorter in the direction of the central axis 9, thus reducing the size of the apparatus. Moreover, the third reflection surface is arranged so as to reflect rays of light that have passed through the aperture 1a in the direction substantially perpendicular to the central axis 9. Therefore, it is possible to increase the optical path length of the wide-angle imaging optical system even in a limited space.

Embodiment 8

Figure 18:
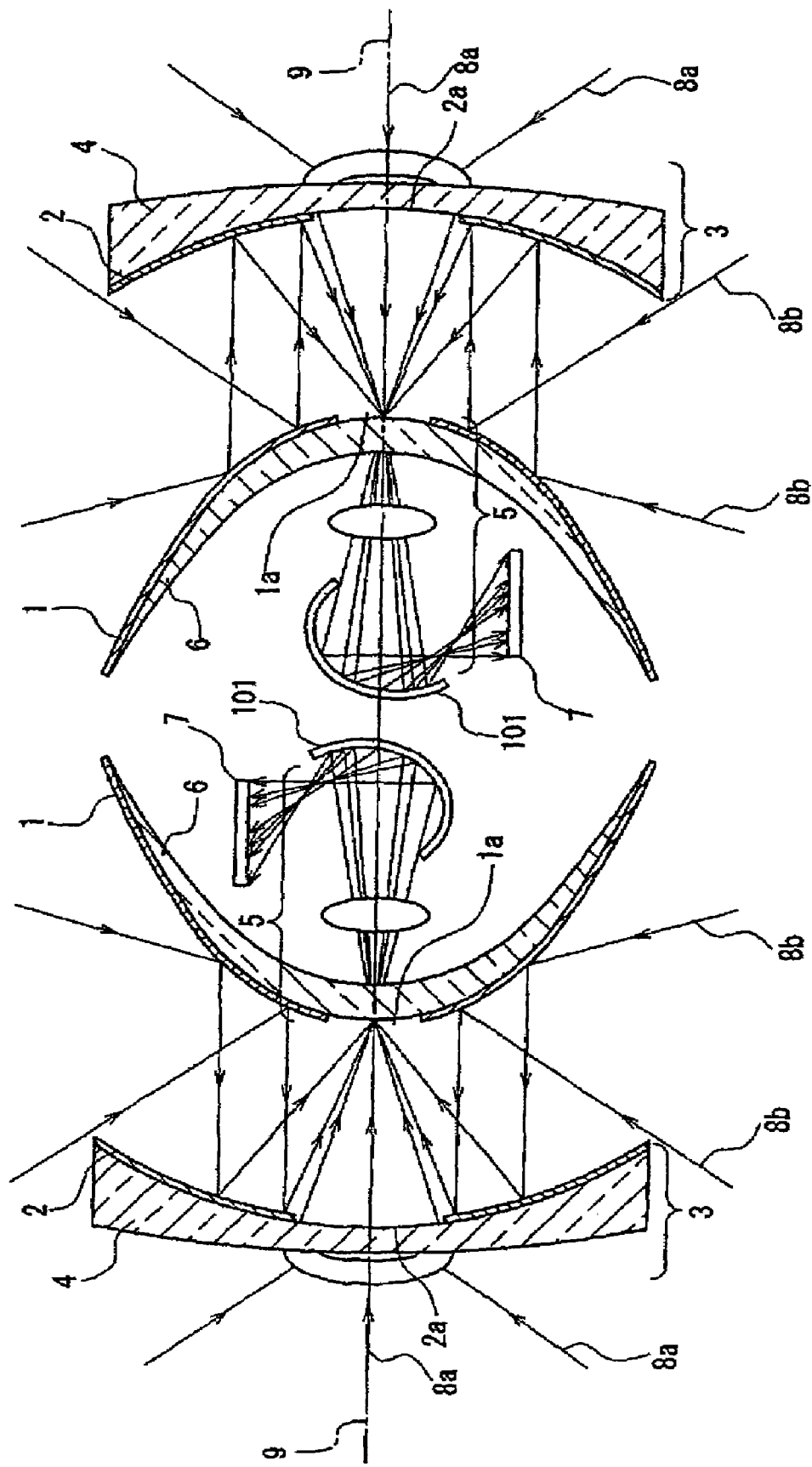
FIG. 18 is a schematic cross-sectional view of a wide-angle imaging apparatus according to Embodiment 8 of the present invention.

FIG. 18 is a schematic cross-sectional view showing the basic configuration of a wide-angle imaging apparatus in Embodiment 8, taken along a plane containing a central axis 9. The basic configuration is the same as that in Embodiment 7 (FIG. 17). This embodiment uses two wide-angle imaging optical systems as shown in FIG. 10, and the third reflection surface 101 has a toric surface or free-form surface, so that the number of lenses in the image-forming optical system is reduced. With this configuration, the apparatus can be both lightweight and low-cost.

Embodiments 5 to 8 use two wide-angel imaging optical systems of the embodiments as shown in FIG. 1 or FIGS. 6 to 10. However, the wide-angle optical systems of the embodiments as shown in FIGS. 11 and 12 also can be used.

Embodiment 9

Figure 19:
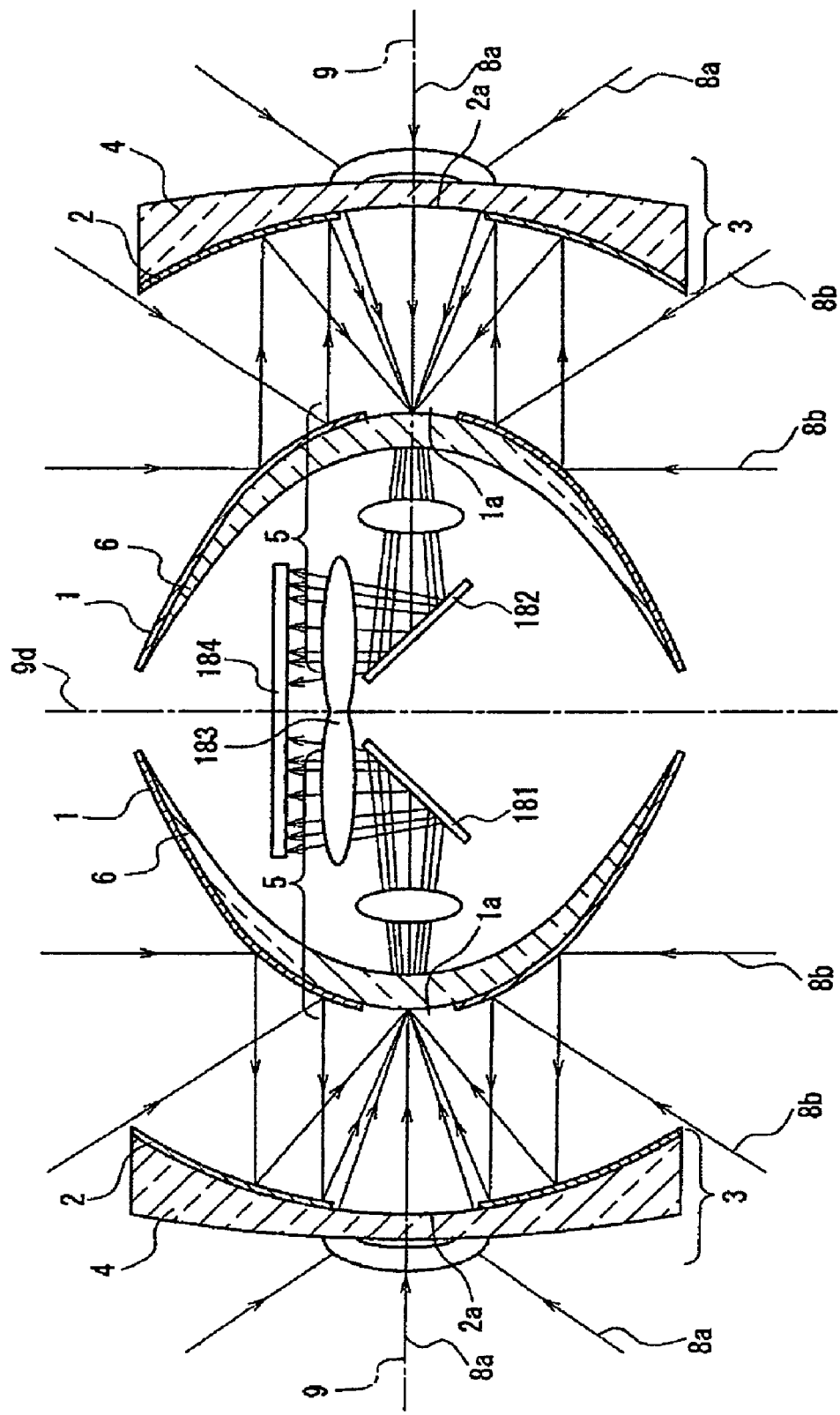
FIG. 19 is a schematic cross-sectional view of a wide-angle imaging apparatus according to Embodiment 9 of the present invention.

FIG. 19 is a schematic cross-sectional view showing the basic configuration of a wide-angle imaging apparatus in Embodiment 9, taken along a plane containing a central axis 9. This embodiment is the same as Embodiment 6 in that two pairs of first and second reflection surfaces are arranged symmetrically from side to side, and the third reflection surface further is arranged for rays of light that have been imaged by the image-forming optical system. However, this embodiment is different from Embodiment 6 in that the left optical system and the right optical system share a lens 183 and an imaging device 184 in the image-forming optical system.

A third reflection surface 181 with a flat surface corresponding to the left optical system and a third reflection surface 182 with a flat surface corresponding to the right optical system are arranged symmetrically with respect to a centerline 9d. In each of the right and left wide-angle imaging optical systems, incident light 8a from the outside is refracted by the refractive optical system 3, passes through the light-transmitting portion 2a provided in the second reflection surface 2, and enters the aperture 1a provided in the first reflection surface 1. Incident light 8b from the outside is reflected successively by the convex surface the first reflection surface 1 and the concave surface of the second reflection surface 2, and enters the aperture 1a provided in the first reflection surface 1.

The incident light from the left is reflected by the third reflection surface 181 in one direction, the incident light from the right is reflected by the third reflection surface 182 in one direction, and the reflected light is imaged by the lens 183 and picked up by the imaging device 184.

Figure 20:
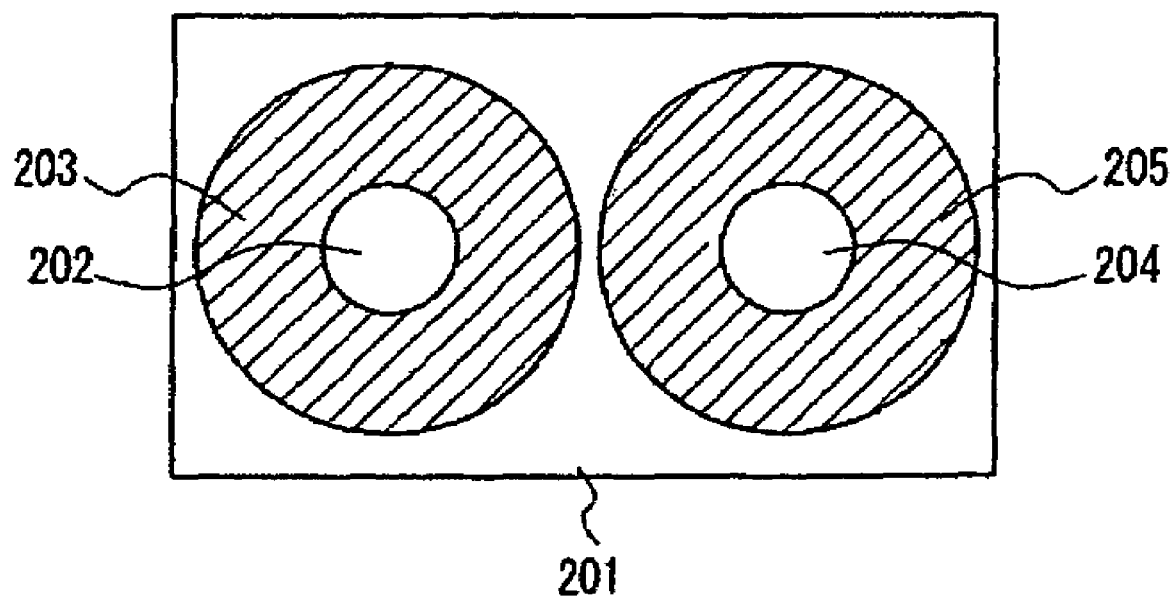
FIG. 20 is a schematic view of an image that appears on an imaging device of a wide-angle imaging apparatus according to Embodiment 9 of the present invention.

FIG. 20 shows the image of an object in a large area that is produced by the wide-angle imaging apparatus in FIG. 19. A circular image 202 of the second imaging area and an annular image 203 of the first imaging area that are formed by the left optical system and a circular image 204 of the second imaging area and an annular image 205 of the first imaging area that are formed by the right optical system appear on an imaging device 201.

Since the imaging range of the first imaging area continues to that of the second imaging area, the circular image 202 and the annular image 203 are formed into a single continuous circular image, and similarly the circular image 204 and the annular image 205 are formed into a single continuous circular image. Therefore, the effective area of the imaging device 201 can be used efficiently.

In this embodiment, the right and left optical systems share the lens 183 and the imaging device 184, so that the wide-angle imaging apparatus can be reduced in size, weight and cost.

Embodiment 10

Figure 21:
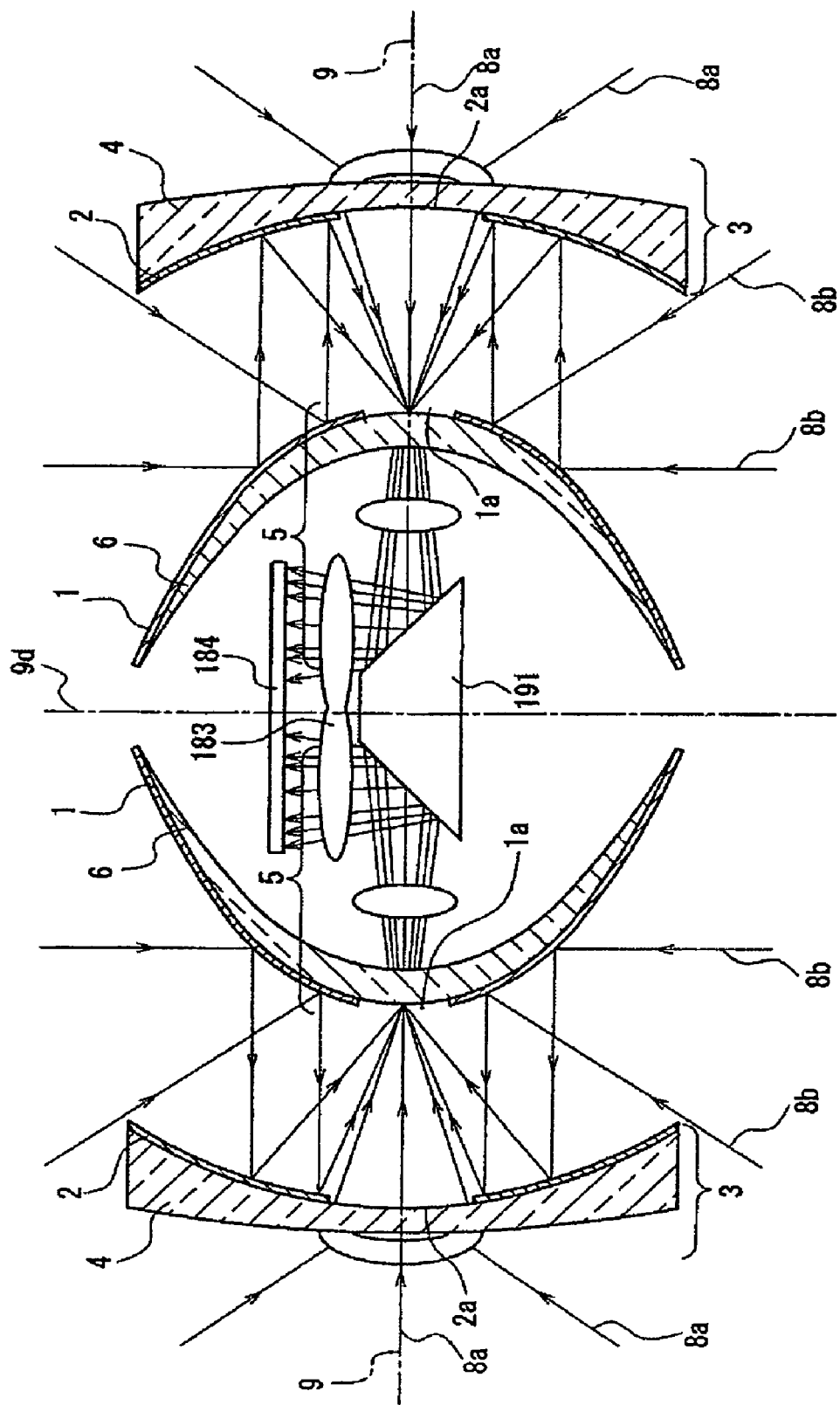
FIG. 21 is a schematic cross-sectional view of a wide-angle imaging apparatus according to Embodiment 10 of the present invention.

FIG. 21 is a schematic cross-sectional view showing the basic configuration of a wide-angle imaging apparatus in Embodiment 10, taken along a plane containing a central axis 9. This embodiment is different from Embodiment 9 in that a prism 191 is used instead of the third reflection surfaces 181, 182 as shown in FIG. 19.

In this embodiment, the right and left optical systems share the prism 191, the lens 183, and the imaging device 184, so that the wide-angle imaging apparatus can be reduced in size, weight and cost further.

The explanation of an image produced by the wide-angle imaging apparatus in this embodiment is the same as that in Embodiment 9 (FIG. 20).

Embodiment 11

Figure 22:
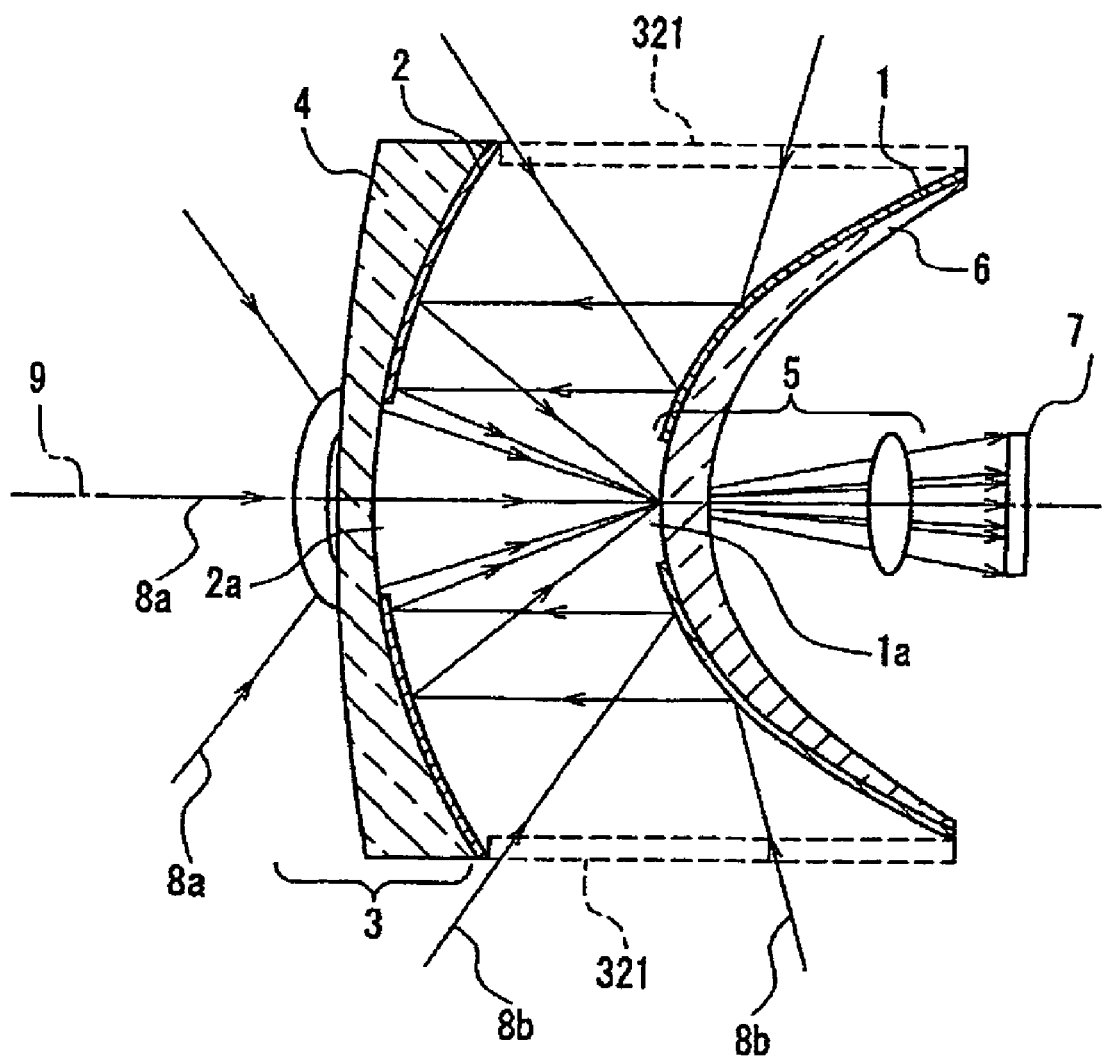
FIG. 22 is a schematic perspective view of a wide-angle imaging apparatus according to Embodiment 11 of the present invention.

FIG. 22 is a schematic cross-sectional view showing the basic configuration of a wide-angle imaging apparatus in Embodiment 11; taken along a plane containing a central axis 9. This embodiment is the same as Embodiment 1 (FIGS. 1 to 5) in basic configuration, but different in that a cylindrical cover 321 is used as a member for protecting the reflective optical system in the wide-angle imaging optical system. The cover 321 is made of a resin material having, e.g., a thickness of about several millimeters.

The cover 321 is arranged so as to surround the open portion between the first reflection surface 1 and the second reflection surface 2. Therefore, incident light 8b from the outside reaches the first reflection surface 1 through the cover 321. The cover 321 may be used not only in the wide-angle imaging optical system in FIG. 1, but also in any of the wide-angle imaging optical systems of other embodiments.

In FIG. 22, incident light 8a from the outside is refracted by the refractive optical system 3, passes through the light-transmitting portion 2a provided in the second reflection surface 2 and the aperture 1a provided in the first reflection surface 1, then is imaged by the image-forming optical system 5, and picked up by the imaging device 7. Incident light 8b from the outside is refracted by the cover 321, reflected successively by the convex surface of the first reflection surface 1 and the concave surface of the second reflection surface 2, passes through the aperture 1a provided in the first reflection surface 1, then is imaged by the image-forming optical system 5, and picked up by the imaging device 7. Thus, the cover 321 can protect the reflective optical system easily and effectively.

Embodiment 12

Figure 23:
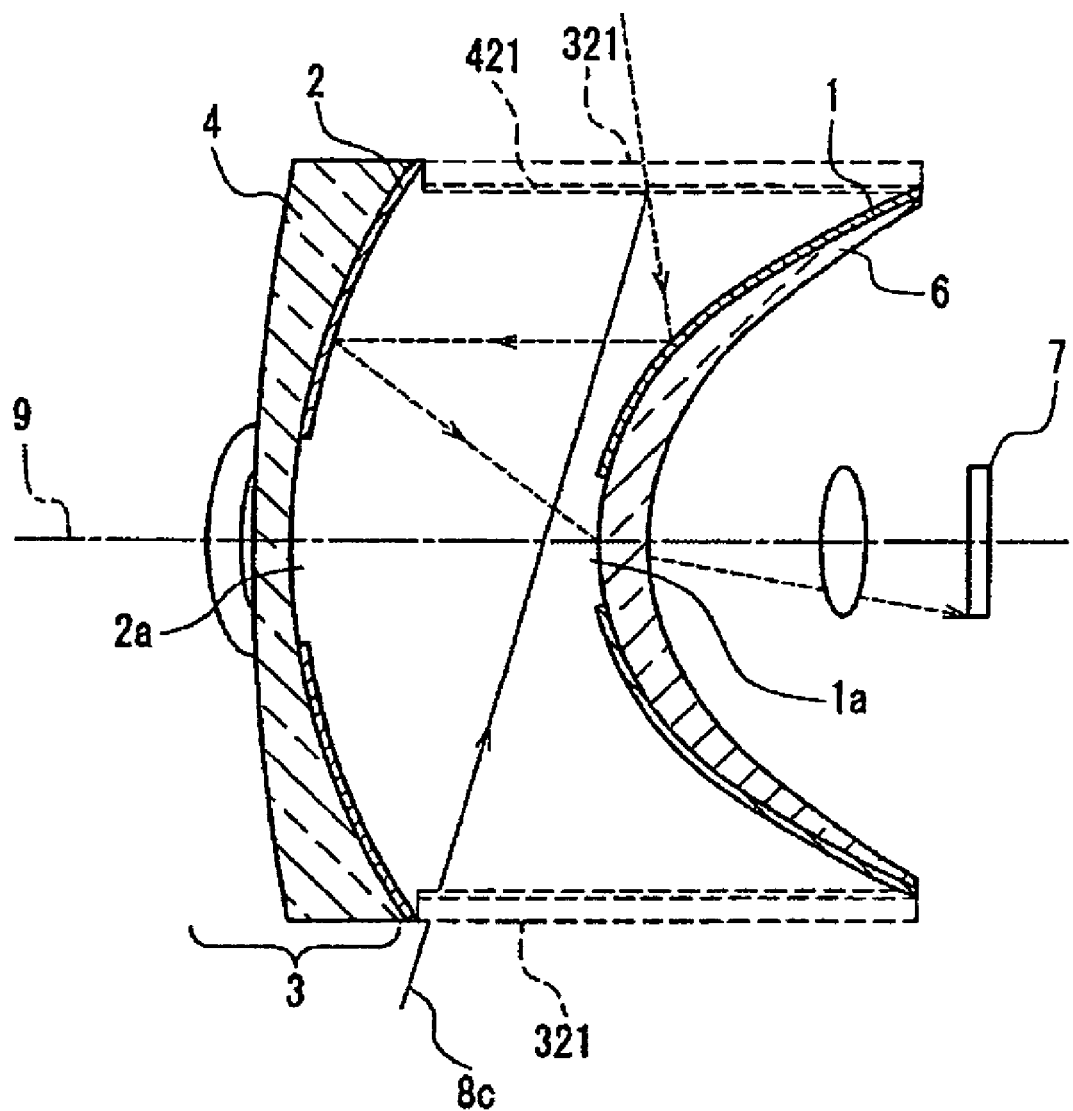
FIG. 23 is a schematic perspective view showing a wide-angle imaging apparatus according to Embodiment 12 of the present invention.
Figure 24:
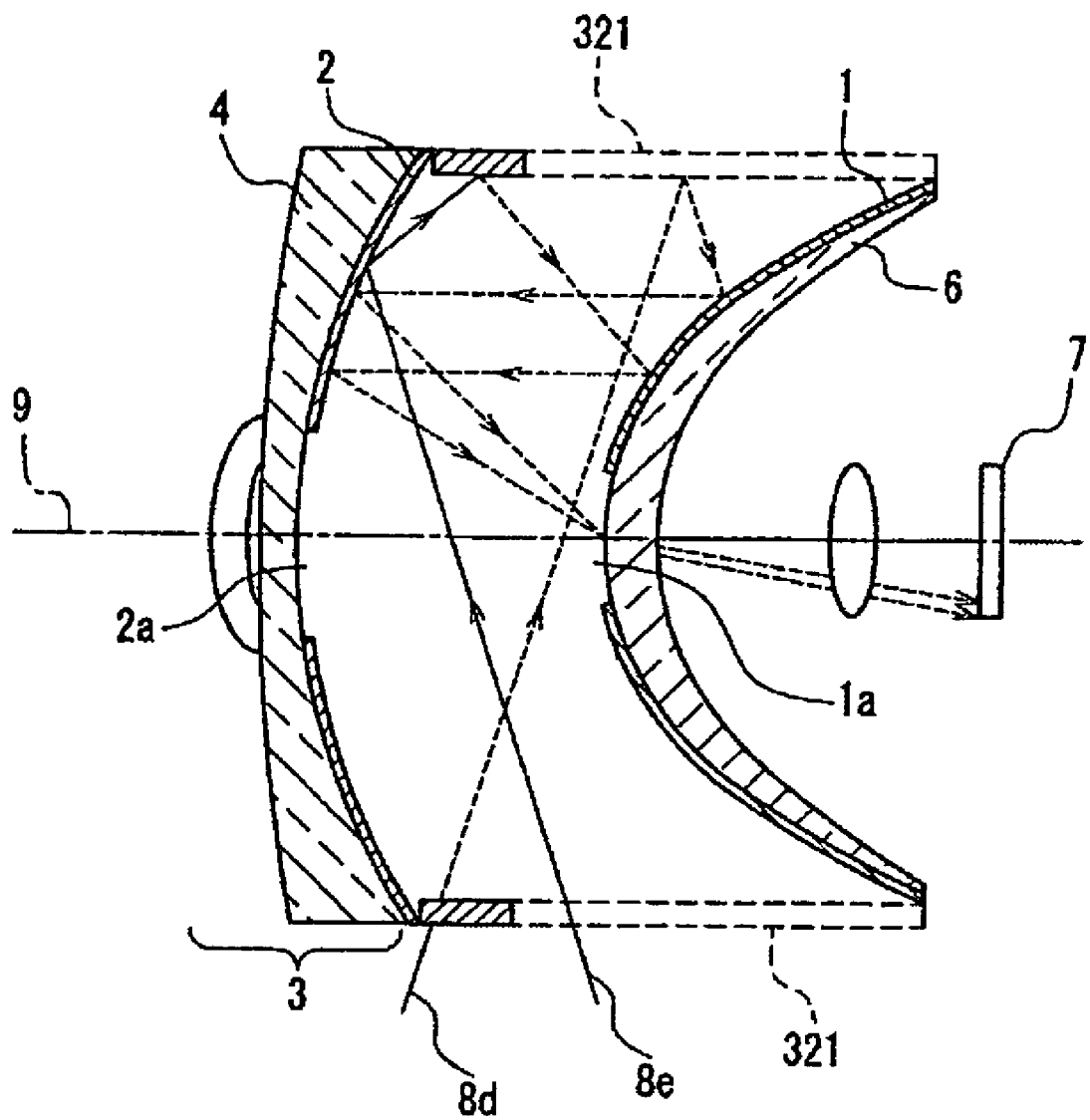
FIG. 24 is a schematic perspective view of another example of a wide-angle imaging apparatus according to Embodiment 12 of the present invention.

FIGS. 23 and 24 are schematic cross-sectional views showing the basic configuration of a wide-angle imaging apparatus in Embodiment 12, taken along a plane containing a central axis 9. The embodiment in FIG. 23 is the same as that in FIG. 22 in basic configuration, but different in that an antireflection coating 421 is applied to the inner surface of the cover 321. The coating 421 can be formed, e.g., by dipping.

In the configuration in FIG. 23, ghost light 8c passes through the cover 321 and enters a space in the cover 321. However, the coating 421 prevents internal reflection. Therefore, it is also possible to prevent the ghost light 8c from reaching the imaging device 7 through the same optical path as normal light that directly enters the inside of the cover 321, which is indicated by a broken line.

The embodiment in FIG. 24 is the same as that in FIG. 22 in basic configuration, but different in that the end of the cover 321 is painted black. In the configuration in FIG. 24, ghost light 8d is cut off at the end of the cover 321. If the ghost light 8d is not cut off, it enters the inside of the cover 321, is reflected by the cover 321, and then reaches the imaging device 7 through the same path as normal light that directly enters the inside of the cover 321, which is indicated by a broken line.

Ghost light 8e entering a space in the cover 321 is cut off at the end of the inner surface of the cover 321. If the ghost light 8e is not cut off, it is reflected by this end, further reflected by the first reflection surface 1, and then reaches the imaging device 7 through the same path as normal light. Thus, this configuration can prevent both of the ghost light 8d and 8e from joining halfway through the optical path of normal light and reaching the imaging device 7.

In this embodiment, the end of the cover 321 is painted black. However, any shielding member can be provided at the end of the cover 321, e.g., the end of the cover 321 may be formed of a shielding material.

The basic configuration of the wide-angle imaging optical system is not limited to the example as shown in FIG. 1, and any of the wide-angle imaging optical systems of other embodiments also can be used.

Embodiment 13

Figure 25:
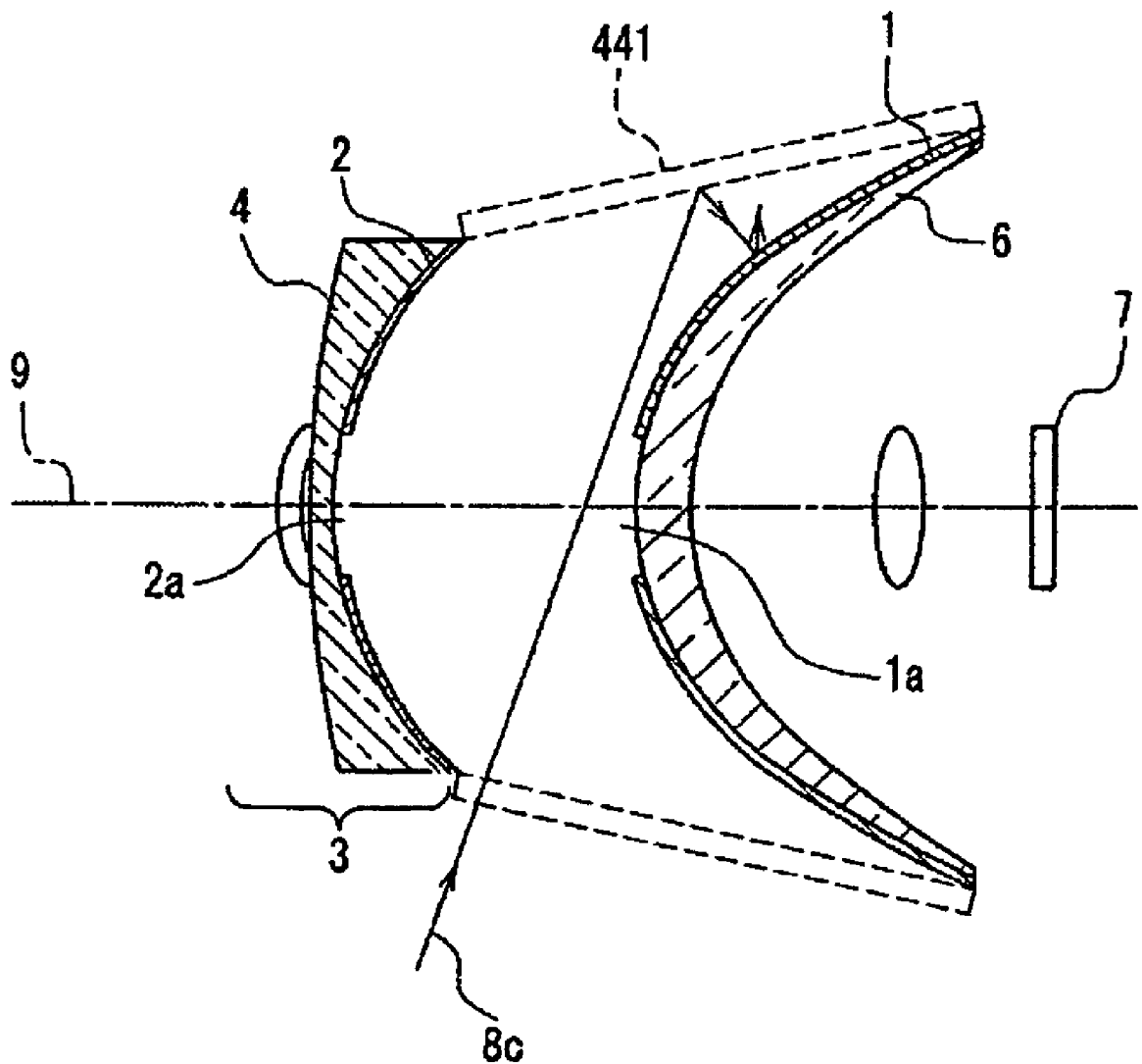
FIG. 25 is a schematic perspective view of a wide-angle imaging apparatus according to Embodiment 13 of the present invention.

FIG. 25 is a schematic cross-sectional view showing the basic configuration of a wide-angle imaging apparatus in Embodiment 13, taken along a plane containing a central axis 9. In the configuration in FIG. 25, the outer diameter of the second reflection surface 2 is smaller than that of the first reflection surface 1. A cover 441 is arranged so as to surround the open portion between the first reflection surface 1 and the second reflection surface 2. The external shape of the cover 441 is a substantially frustoconical, and the inner and outer surfaces are tapered. The cover 441 in the form of a substantially frustoconical is made of a resin material having, e.g., a thickness of about several millimeters.

While Embodiment 12 uses the coating 421 to prevent internal reflection so that ghost light does not travel through the same optical path as normal light, this embodiment achieves the same effect with the shape of the cover 441. Specifically, as shown in FIG. 25, ghost light 8c entering the inside of the cover 441 is reflected internally by the inclined plane of the cover 441, and the reflected ghost light 8c travels through a different optical path from normal light, thus preventing the generation of ghost light. In other words, this embodiment can adjust the reflection angle of the ghost light 8c by the shape of the cover 441, and therefore can prevent the generation of ghost light using the cover 441 itself without coating or the like.

Not only the example as shown in FIG. 25 but also other embodiments may employ the above configuration in which the outer diameter of the second reflection surface is smaller than that of the first reflection surface, and a cover in the form of a substantially frustoconical is used.

Embodiment 14

Figure 26:
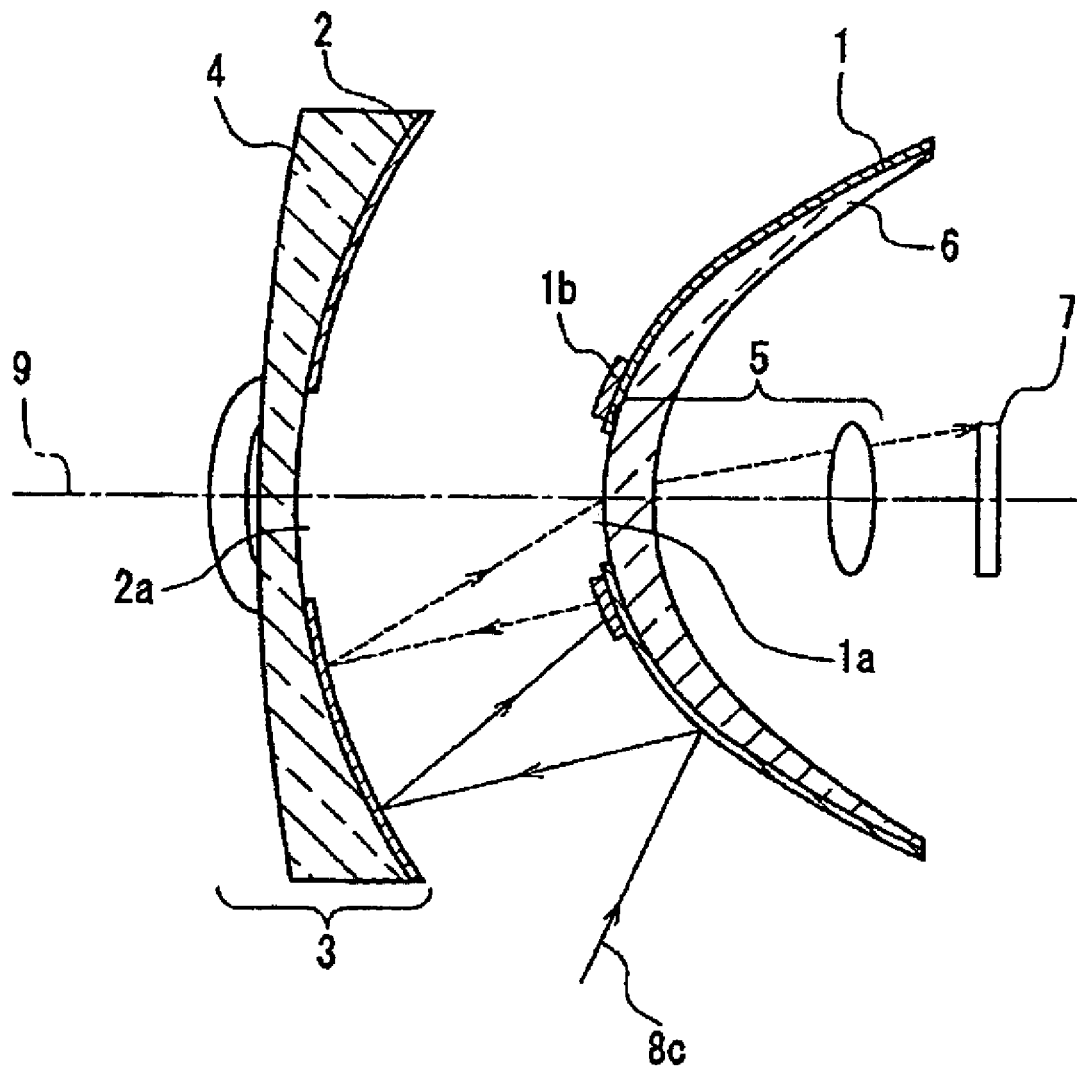
FIG. 26 is a schematic perspective view of a wide-angle imaging apparatus according to Embodiment 14 of the present invention.

FIG. 26 is a schematic cross-sectional view showing the basic configuration of a wide-angle imaging apparatus in Embodiment 14, taken along a plane containing a central axis 9. This embodiment is the same as that in FIG. 1 in basic configuration, but different in that a shielding member 1b is formed near the periphery of the aperture 1a.

Ghost light 8c is reflected by the reflection surfaces 1 and 2, directed to the reflection surface 1 again, and cut off by the shielding member 1b. When the shielding member 1b is not used, the ghost light 8c is again reflected by the reflection surfaces 1 and 2 (i.e., the ghost light 8c is reflected four times between the reflection surfaces), enters the aperture 1a, then is imaged by the image-forming optical system 5, and picked up by the imaging device 7, as indicated by a broken line.

In the example as shown in FIG. 26, the ghost light that is reflected four times by the reflection surfaces and enters the aperture 1a is cut off. However, ghost light to be cut off may be rays of light that are reflected four or more times by the reflection surfaces and enter the aperture 1a.

The basic configuration of the wide-angle imaging optical system is not limited to the example as shown in FIG. 1, and any of the wide-angle imaging optical systems of other embodiments also can be used.

Embodiment 15

Figure 27:
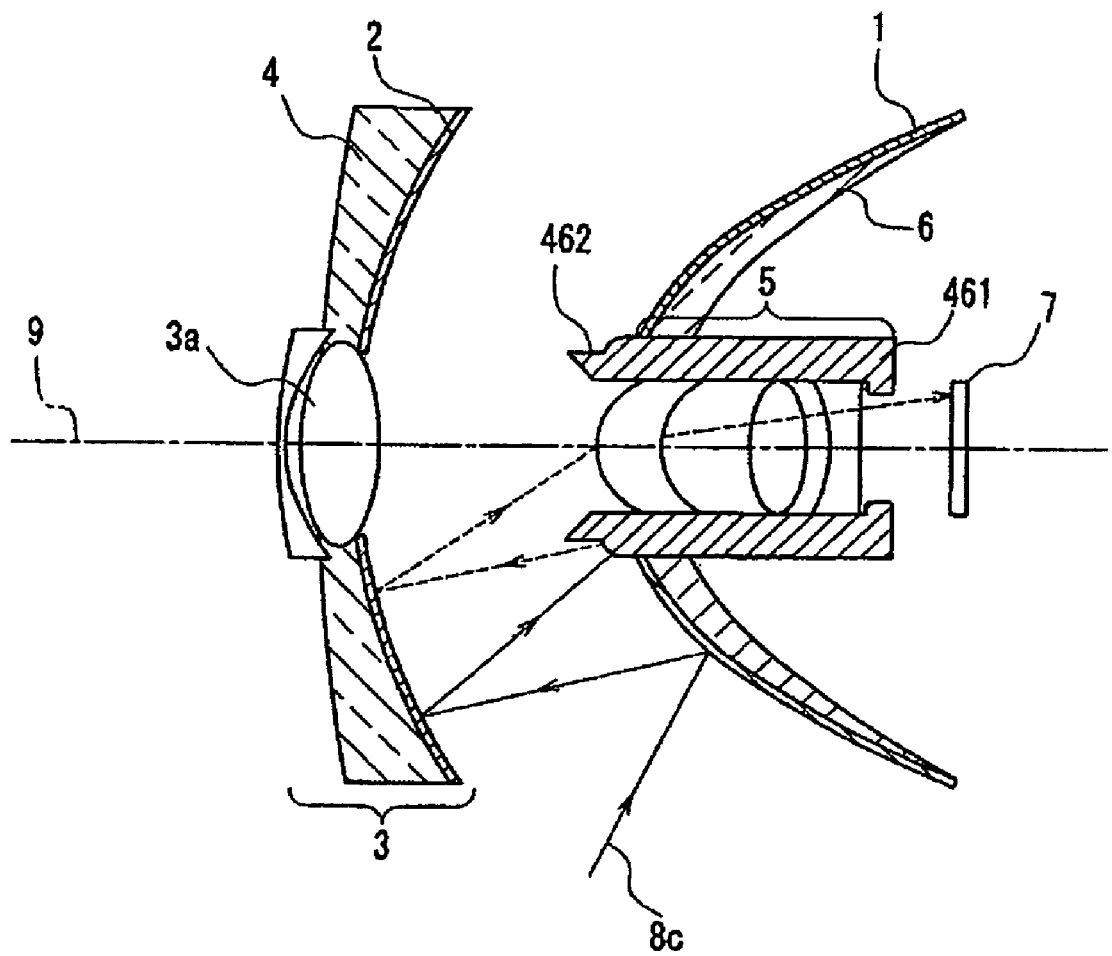
FIG. 27 is a schematic perspective view of a wide-angle imaging apparatus according to Embodiment 15 of the present invention.

FIG. 27 is a schematic cross-sectional view showing the basic configuration of a wide-angle imaging apparatus in Embodiment 15, taken along a plane containing a central axis 9. This embodiment is the same as that in FIG. 12 in basic configuration, but different in that a lens barrel 461 for supporting the image-forming optical system 5 also serves as a shielding member. Therefore, another shielding member is not necessary, and the lens barrel 461 is used efficiently. In this configuration, ghost light 8c is reflected by the reflection surfaces 1 and 2, and then is cut off by the lens barrel 461. Accordingly, it is possible to prevent the ghost light from traveling through the same optical path as normal light, which is indicated by a broken line.

A hood 462 that is formed, e.g., of a black-painted shielding member, may be provided at the tip of the lens barrel 461. The hood 462 can limit rays of light entering the image-forming optical system 5 and eliminate unwanted light outside the angle of view that causes stray light or flare.

Reflected light may be generated due to rays of light that enter at an angle approximately equal to the inclination angle of the hood. In such a case, the hood surface can be made uneven by forming fine steps like stairs, thus allowing the reflected light to diverge.

In this embodiment, the hood is provided in the image-forming optical system 5. However, the refractive optical system including the lens 3a also may use a hood to limit rays of light entering the refractive optical system.

The basic configuration of the wide-angle imaging optical system is not limited to the example as shown in FIG. 12, and any of the wide-angle imaging optical systems of other embodiments also can be used.

Embodiment 16

Figure 28:
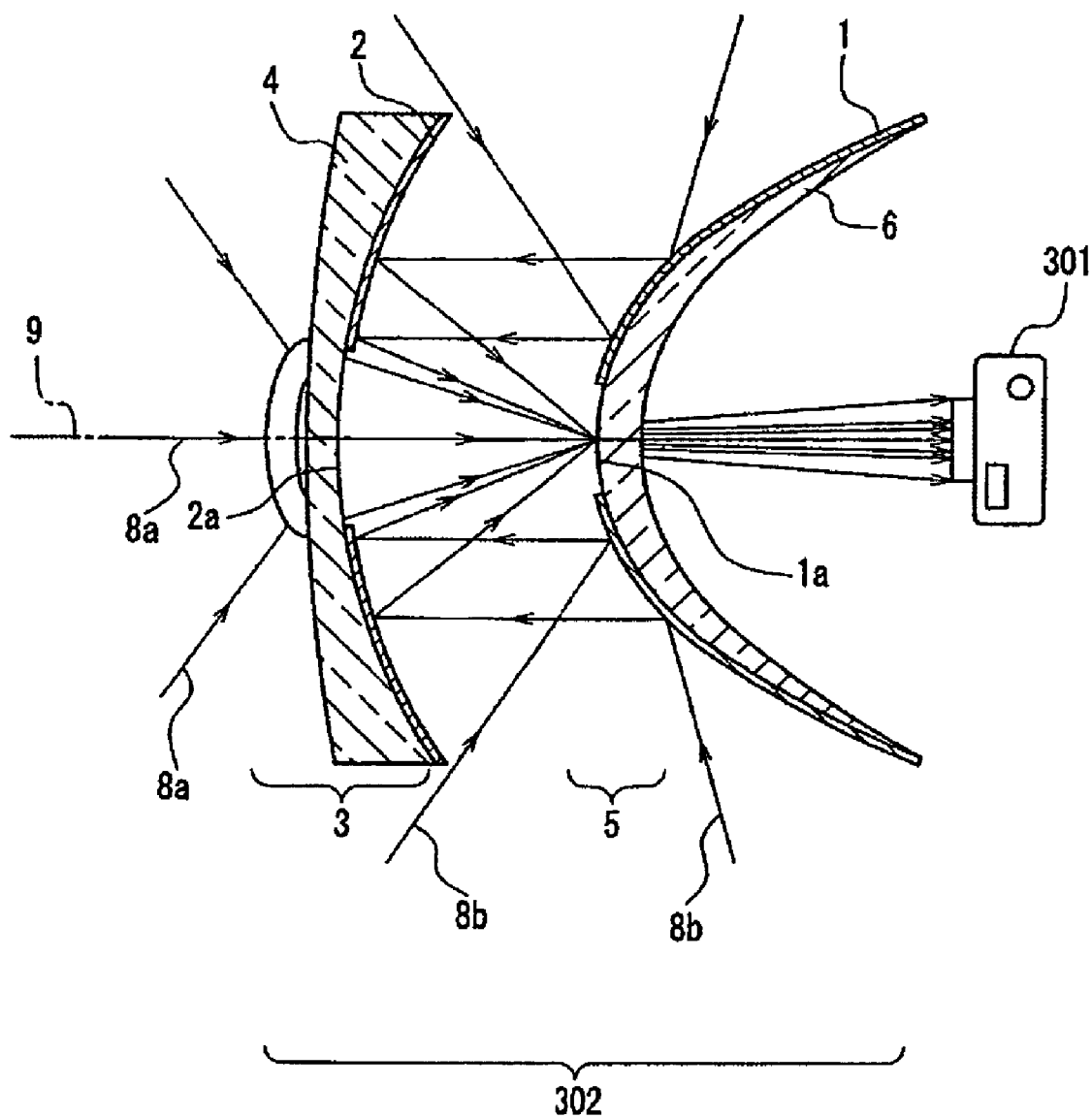
FIG. 28 is a schematic perspective view of a wide-angle imaging apparatus according to Embodiment 16 of the present invention.

FIG. 28 shows an embodiment of a wide conversion lens that includes a wide-angle imaging optical system of the present invention. In the wide conversion lens, an image pickup device 301 for video cameras or cameras is used instead of the image-forming optical system 5 and the imaging device 7 of the wide-angle imaging optical system as shown in FIG. 1. This makes it possible to produce an image covering a wide range at a time. Not only the wide-angle imaging optical system in FIG. 1 but also any of the wide-angle imaging optical systems of other embodiments can be used in the wide conversion lens.

Embodiment 17

Figure 29:
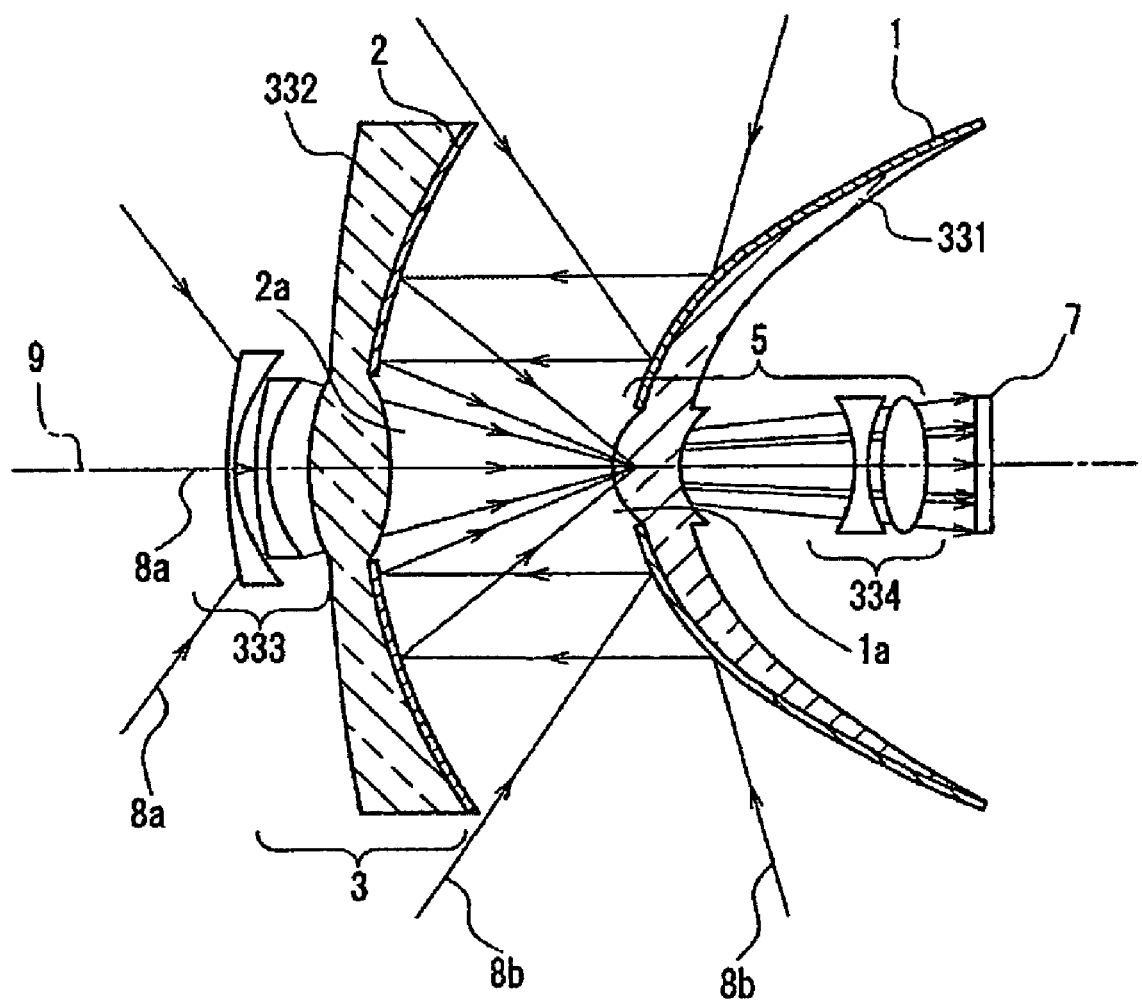
FIG. 29 is a schematic cross-sectional view of a wide-angle imaging apparatus according to Embodiment 17 of the present invention.
Figure 31:
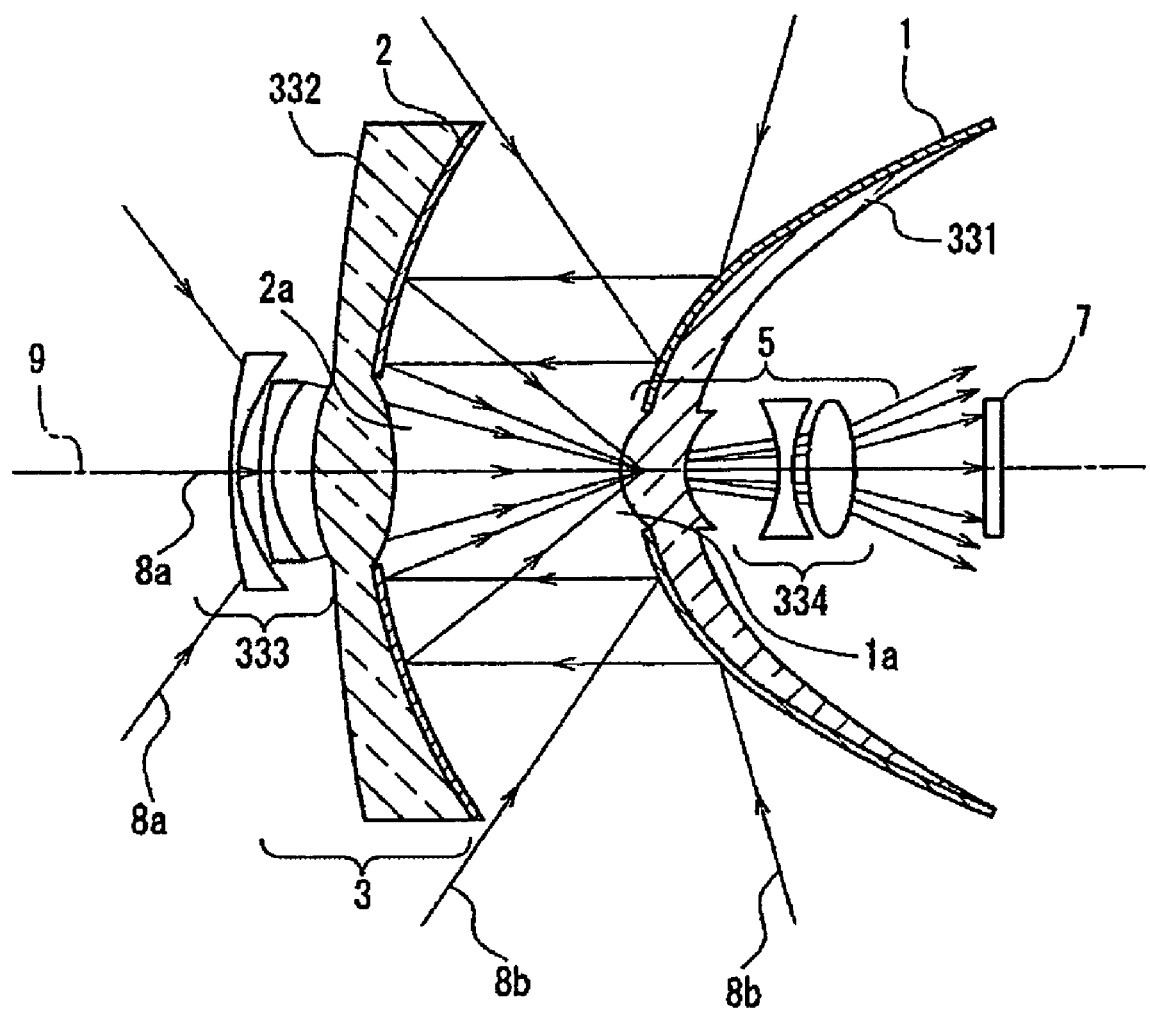
FIG. 31 is a schematic cross-sectional view of another example of a wide-angle imaging apparatus according to Embodiment 17 of the present invention.

FIGS. 29 and 31 are schematic cross-sectional views showing the basic configuration of a wide-angle imaging apparatus in Embodiment 17, taken along a plane containing a central axis 9. This embodiment is the same as Embodiment 1 (FIGS. 1 to 5) in basic configuration, but different in that the shape of each reflection surface differs from the shape of a portion of each lens that corresponds to the light-transmitting portion 2a and the aperture 1a, and the refractive optical system and the image-forming optical system have a zoom function. The explanation of the shape of a portion of each lens that corresponds to the light-transmitting portion 2a and the aperture 1a is the same as that in Embodiment 4.

In FIG. 29, incident light 8a from the outside is refracted by the refractive optical system 3 including a zoom lens 333, passes through the light-transmitting portion 2a provided in the second reflection surface 2 and the aperture 1a provide in the first reflection surface 1, then is imaged by the image-forming optical system 5 including a zoom lens 334, and picked up by the imaging device 7. Incident light 8b from the outside is reflected successively by the convex surface of the first reflection surface 1 and the concave surface of the second reflection surface 2, passes through the aperture 1a provided in the first reflection surface 1, then is imaged by the image-forming optical system 5 including the zoom lens 334, and picked up by the imaging device 7.

Figure 30:
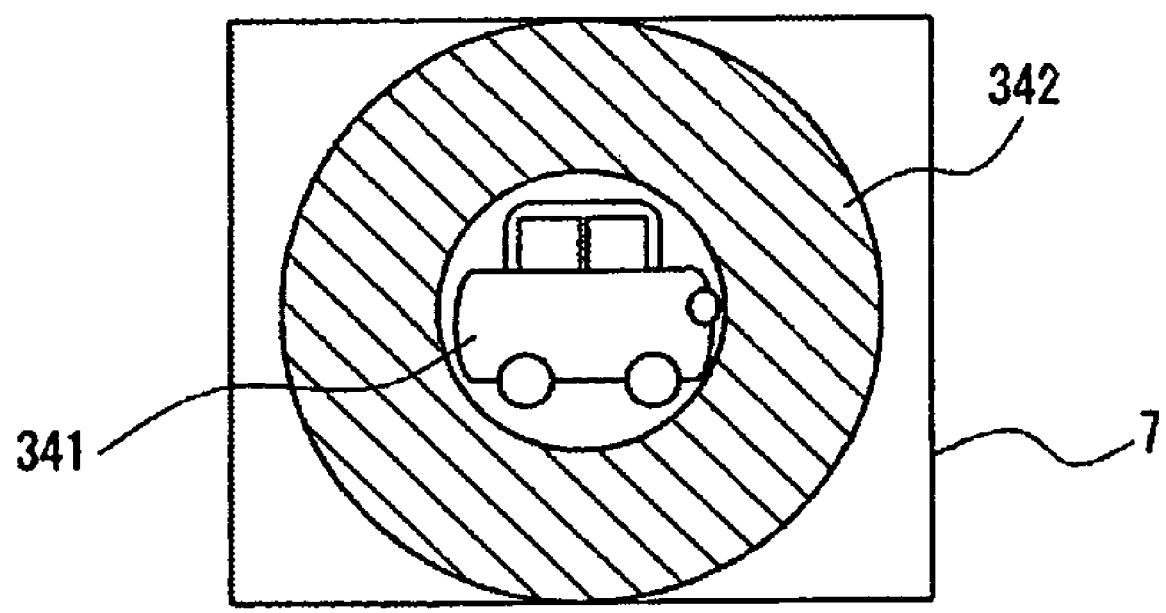
FIG. 30 is a schematic view of an image that appears on an imaging device of a wide-angle imaging apparatus according to Embodiment 17 of the present invention.

FIG. 30 shows the image of an object in a large area that is produced by the wide-angle imaging apparatus in FIG. 29. A circular image 341 of the second imaging area and an annular image 342 of the first imaging area appear on the imaging device 7. In FIG. 31, the zoom lens 334 is moved toward the object side to change the magnification in the wide-angle imaging apparatus in FIG. 29.

Figure 32:
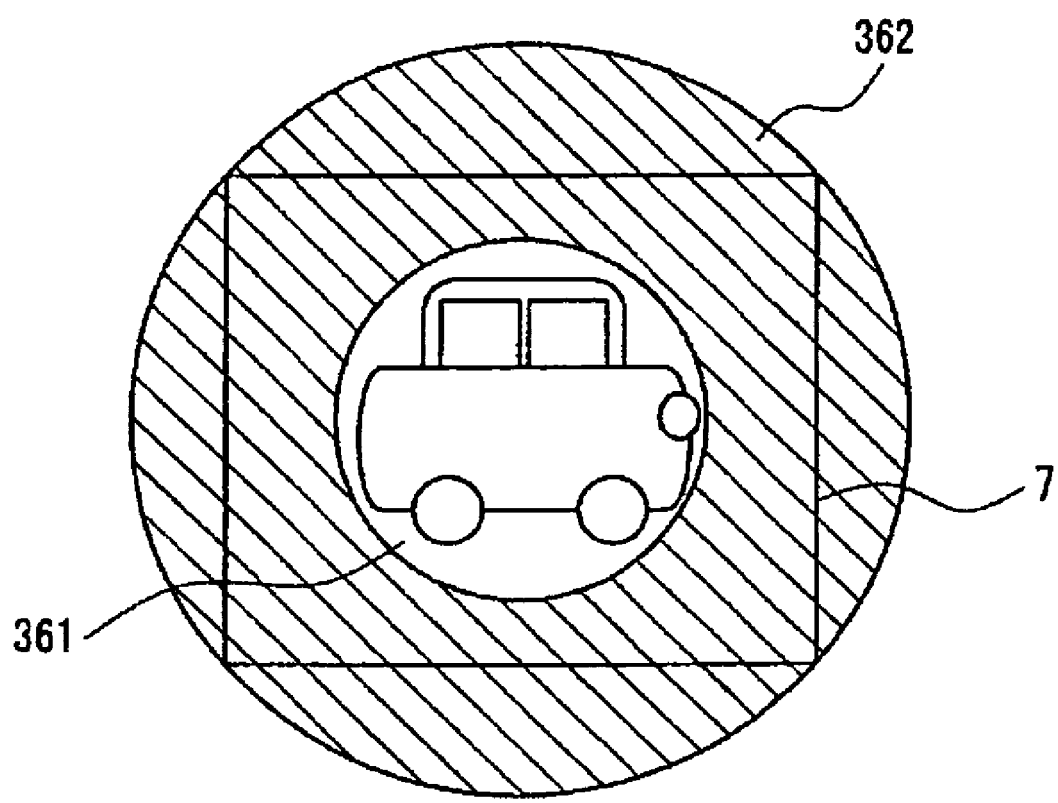
FIG. 32 is a schematic view of an image that is formed by changing the magnification and appears on an imaging device of another example of a wide-angle imaging apparatus according to Embodiment 17 of the present invention.

FIG. 32 shows the image of an object that is produced by the wide-angle imaging apparatus in FIG. 31. A circular image 361 of the second imaging area that is obtained by changing the magnification and part of an annular image 362 of the first imaging area that is obtained by changing the magnification and formed outside the circular image 361 appear on the imaging device 7. By using the zoom lens, the image of an object in the vicinity of the central axis is enlarged in the center of the imaging device 7, so that a more detailed image can be produced.

Embodiment 18

Figure 33:
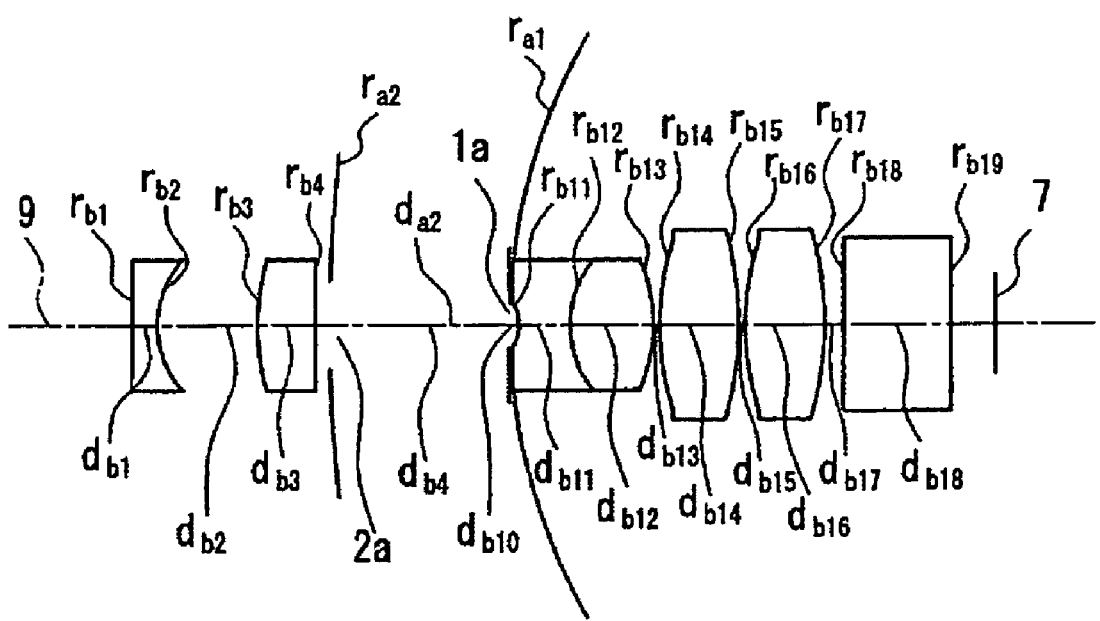
FIG. 33 is a schematic perspective view of a wide-angle imaging apparatus according to Embodiment 18 of the present invention.
Figure 34:
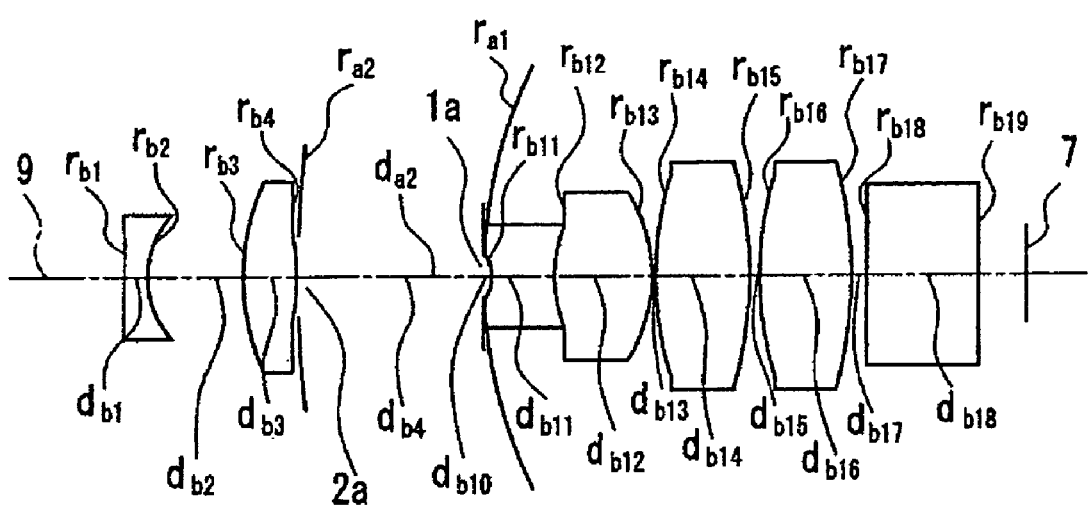
FIG. 34 is a schematic perspective view of another example of a wide-angle imaging apparatus according to Embodiment 18 of the present invention.
Figure 35:
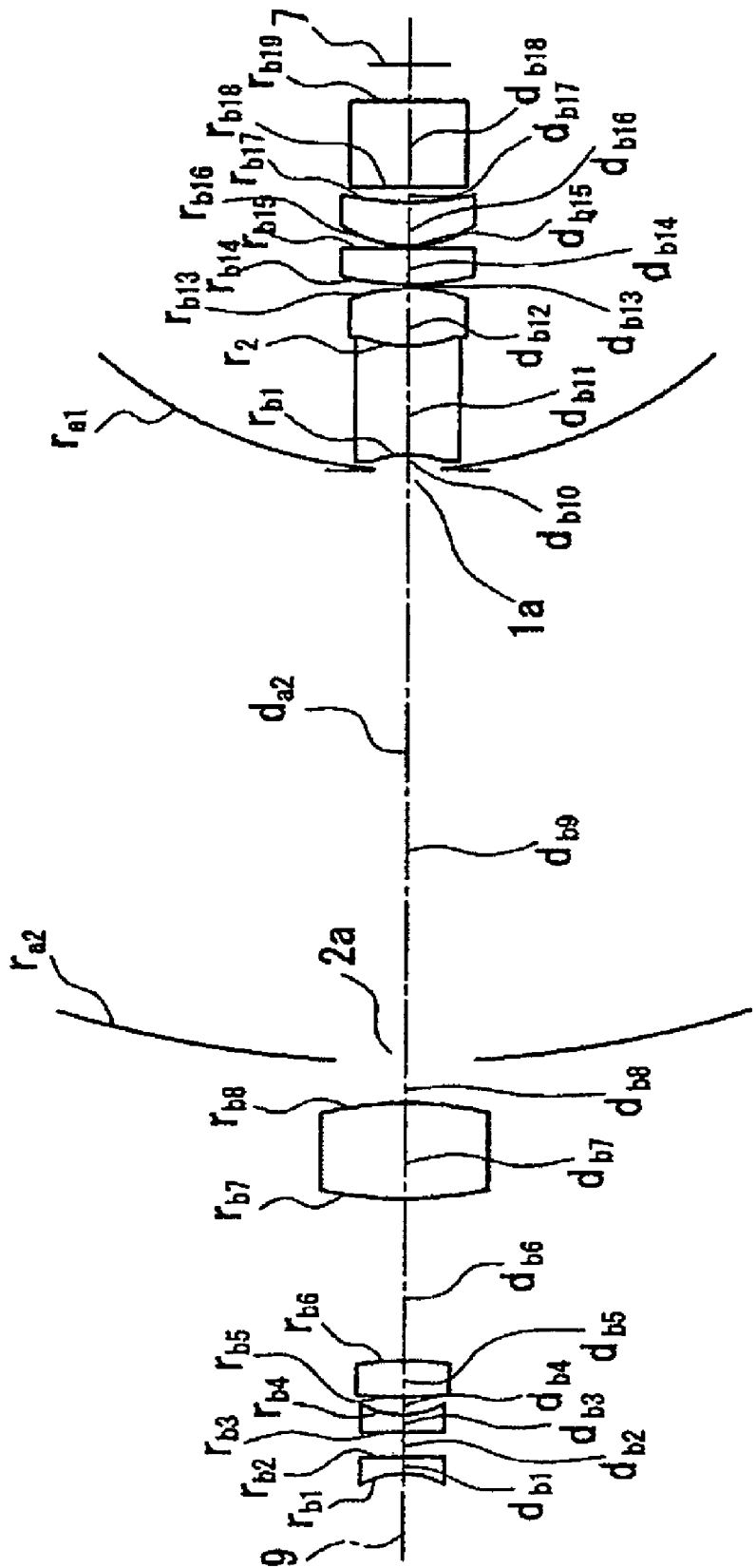
FIG. 35 is a schematic perspective view of yet another example of a wide-angle imaging apparatus according to Embodiment 18 of the present invention.

FIGS. 33, 34 and 35 are schematic configuration diagrams of a wide-angle imaging apparatus in Embodiment 18. This embodiment is the same as Embodiment 1 (FIGS. 1 to 5) in basic configuration, but different in lens configuration and the shape of reflection surfaces, which will be described in detail later. In each of FIGS. 33, 34, and 35, numerical subscript ai (i=1, 2, 3, . . . ) indicates a surface number of the first optical system, and bi (i=1, 2, 3, . . . ) indicates a surface number of the second optical system. The number of i increases in the order of light traveling from the object side. The reference numerals rai and rbi denote the radius of curvature of each surface, and dai and dbi denote the lens thickness or air space that corresponds to each surface.

The shape of the reflection surfaces in this embodiment is a rotationally symmetrical aspheric surface including an aspherical coefficient, and the amount of sag Z is expressed by $$Z = \frac{h^2/R}{1+\{1-(1+K)(h/R)^2\}^{1/2}} + A2 \times h^2 + A4 \times h^4 + A6 \times h^6 + A8 \times h^8 + A10 \times h^{10} \quad \text{Formula (1)}$$

where h is a height from the optical axis, R is a radius of curvature of the surface, A2 to A10 are aspherical coefficients, and K is a conical coefficient.

In this embodiment, the first reflection surface of the reflective optical system has a convex surface, and the second reflection surface has a concave surface as seen from incident light from an object. Moreover, the refractive optical system includes a first lens group with negative power and a second lens group with positive power that are arranged in the indicated order from the object side. Thus, the wide-angle imaging optical system does not form any intermediate image at a halfway point, and a bright optical system can be achieved.

The position of a lens stop preferably is located inside the image-forming optical system or between the image-forming optical system and the second reflection surface. With this configuration, one of the focal points of the second reflection surface coincides with the center of the lens stop. Therefore, rays of light can be imaged by the image-forming optical system while a chief ray converges on the position of the lens stop. In this embodiment, the position of the lens stop is set to the vertex of the first reflection surface.

The lenses of the image-forming optical system are arranged in the following order as seen from the object side: a negative lens, a positive lens, a positive lens, and a positive lens. Thus, the image-forming optical system can have a relatively long back focal length, improved aberration correction, and brightness even with a small number of lenses. The lens configuration of the image-forming optical system may be such that a negative lens, a positive lens, and a positive lens are arranged in the indicated order as seen from the object side.

A plate that is inserted between the lens closest to the image side and the imaging device 7 serves as an optical low-pass filter and a near-infrared cutoff filter. In this embodiment, the shape of the first reflection surface differs from the shape of a portion of the lens that corresponds to the aperture 1a. Similarly, the shape of the second reflection surface differs from the shape of a portion of the lens that corresponds to the light-transmitting portion 2a.

In the configurations in FIGS. 33 and 34, the external shape of the second reflection surface is smaller than that of the first reflection surface, and a tapered conical cover as shown in FIG. 25 is used as a member for supporting and protecting the reflective optical system. In the configuration in FIG. 35, the external shape of the first reflection surface is substantially the same as that of the second reflection surface, and a cylindrical cover as shown in FIG. 22 is used as a member for supporting and protecting the reflective optical system.

This embodiment preferably satisfies at least one of the following formulas (2) to (9):

$$fa > 0 \quad \text{Formula (2)}$$

$$fb > 0 \quad \text{Formula (3)}$$

$$f2 \geq d \quad \text{Formula (4)}$$

$$|f12/fa| > 5 \quad \text{Formula (5)}$$

$$r2 > 0 \quad \text{Formula (6)}$$

$$0.3 < r1/r2 < 0.7 \quad \text{Formula (7)}$$

$$|fb - fa|/|fa| < 0.5 \quad \text{Formula (8)}$$

$$1.2 < bf/fi < 1.8 \quad \text{Formula (9)}$$

In the formula (2), fa is a combined focal length of the first optical system. When fa is not more than the lower limit, an intermediate image is formed inside the first optical system, and thus the image of an object formed by the first optical system is an erect image. Moreover, the first optical system becomes a relay optical system, which increases the entire length of the optical system.

In the formula (3), fb is a combined focal length of the second optical system. When fb is not more than the lower limit, an intermediate image is formed inside the second optical system, and thus the image of an object formed by the second optical system is an erect image. Moreover, the second optical system becomes a relay optical system, which increases the entire length of the optical system. In this case, when the image formed by the first optical system is inverted, the resultant image is not continuous.

In the formula (4), f2 is a focal length of the second reflection surface, and d is a distance on the axis between the first reflection surface and the second reflection surface. When the formula (4) is not satisfied, an intermediate image is formed inside the reflective optical system, and the angle of deviation of rays of light passing through the image-forming optical system becomes larger, thus making it difficult to correct aberration in the image-forming optical system. Moreover, the image formed by the first optical system is an erect image. Therefore, when the image formed by the second optical system is inverted, the resultant image is not continuous.

In the formula (5), fa is a combined focal length of the first optical system, and f12 is a combined focal length of the first reflection surface and the second reflection surface. The formula (5) represents the degree of a focal system of the reflection surfaces. When the value is not more than the lower limit, the combined focal length of the first and second reflection surfaces is reduced. Therefore, a relay optical system rather than an a focal system is provided while an intermediate image is formed inside the wide-angle imaging optical system, so that the entire length of the optical system becomes longer.

In the formulas (6) and (7), r1 is a radius of curvature of the first reflection surface, and r2 is a radius of curvature of the second reflection surface. When r2 is not more than the lower limit in the formula (6), the second reflection surface has a convex surface as seen from incident light from an object, and rays of light entering the image-forming optical system are divergent. Therefore, the image-forming optical system itself becomes larger, which in turn increases the size of the apparatus.

The formula (7) represents a ratio of the radius of curvature of the first reflection surface to that of the second reflection surface. When the value is not less than the upper limit in the formula (7), rays of light from the second reflection surface enter the aperture at a larger angle, thus making it difficult to correct aberration in the image-forming optical system. Moreover, the aperture efficiency also is reduced, so that brightness cannot be ensured at the periphery. When the value is not more than the lower limit in the formula (7), the area used by the first optical system on the second reflection surface extends to near the central axis, and thus the area of the light-transmitting portion becomes narrower. Consequently, rays of light from the second image-forming optical system do not pass through the light-transmitting portion, and an image cannot be formed.

The formula (8) represents the relationship in combined focal length between the first optical system and the second optical system and defines a difference between them. When the value is not less than the upper limit in the formula (8), a difference in back focal length between the first optical system and the second optical system is increased. Moreover, since the magnification for image formation of the first optical system differs from that of the second optical system, an annular image formed by the first optical system and a circular image formed by the second optical system are not continuous, resulting in missing or overlapping of images.

In the formula (9), bf is a back focal length of the image-forming optical system measured in terms of air when rays of light from an object at infinity enter the image-forming optical system in parallel, and fi is a combined focal length of the image-forming optical system. When the value is not less than the upper limit in the formula (9), the back focal length is increased to make the entire length of the optical system longer, which in turn increases the size of the apparatus. When the value is not more than the lower limit in the formula (9), the back focal length is reduced, and the optical system cannot be provided.

The formulas (1) to (9) may be applied not only to the configurations in FIGS. 33 to 35, but also to any of the configurations of other embodiments.

EXAMPLE 1

Example 1 is directed to the wide-angle imaging apparatus in FIG. 33. In Example 1, the focal length fa (mm), brightness Fno, and imaging range (half angle of view) ω (°) of the first optical system are as follows:

$fa=1.00$, $Fno=1.94$, and $\omega=30$ to $90°$.

Table 1 shows numerical values of the first optical system in Example 1, where nd and vd indicate a refractive index and an Abbe number on the d line, respectively. The same is true in the following tables.

TABLE 1

| No. | rai | dai | nd | vd | |
|---|---|---|---|---|---|
| a1 | 12.687 | −3.68 | | | Reflection surface |
| a2 | 24.582 | 3.68 | | | Reflection surface |
| a10 | ∞ | 0.15 | | | Lens stop plane |
| a11 | −1.292 | 1.10 | 1.84666 | 23.8 | Cemented lens |
| a12 | 1.867 | 1.69 | 1.72916 | 54.7 | |
| a13 | −3.223 | 0.11 | | | |
| a14 | 5.759 | 1.62 | 1.72916 | 54.7 | |
| a15 | −6.777 | 0.11 | | | |
| a16 | 3.970 | 1.62 | 1.52404 | 56.4 | |
| a17 | −11.959 | 0.37 | | | |
| a18 | ∞ | 2.0 | 1.51680 | 64.2 | |
| a19 | ∞ | | | | |

In Example 1, the focal length fb (mm), brightness Fno, and imaging range (half angle of view) ω (°) of the second optical system are as follows:

$fb=0.75$, $Fno=1.94$, and $\omega=0$ to $30°$.

Table 2 shows numerical values of the second optical system in Example 1.

TABLE 2

| No. | rbi | dbi | nd | vd | |
|---|---|---|---|---|---|
| b1 | 22.051 | 0.44 | 1.84666 | 23.8 | |
| b2 | 1.522 | 1.76 | | | |
| b3 | 3.826 | 1.10 | 1.51680 | 64.2 | |
| b4 | −5.316 | 3.68 | | | |
| b10 | ∞ | 0.15 | | | Lens stop plane |
| b11 | −1.292 | 1.10 | 1.84666 | 23.8 | Cemented lens |
| b12 | 1.867 | 1.69 | 1.72916 | 54.7 | |
| b13 | −3.223 | 0.11 | | | |
| b14 | 5.759 | 1.62 | 1.72916 | 54.7 | |
| b15 | −6.777 | 0.11 | | | |
| b16 | 3.970 | 1.62 | 1.52404 | 56.4 | |
| b17 | −11.959 | 0.37 | | | |
| b18 | ∞ | 2.0 | 1.51680 | 64.2 | |
| b19 | ∞ | | | | |

In this embodiment, the first optical system and the second optical system share the image-forming optical system. Therefore, the values of a10 to a19 in Table 1 are equal to those of b10 to b19 in Table 2. The same is true in Examples 2.

The aspherical coefficients and conical coefficients in Example 1 are shown in the following. As described above, the first optical system and the second optical system share the image-forming optical system. Therefore, the values of the a16 surface and the a17 surface are equal to those of the b16 surface and the b17 surface, respectively. The same is true in Examples 2.

$A4=2.8000\times10^{-5}, K=0.577$     a1 surface $A4=-3.000\times10^{-6}, K=-0.478$     a2 surface $A4=-1.304\times10^{-3}$ $A6=-3.388\times10^{-3}$ $A8=4.371\times10^{-4}$ $A10=-7.611\times10^{-5}$ $K=-0.814$     a16 surface $A4=-1.214\times10^{-2}$ $A6=6.983\times10^{-4}$ $A8=-2.812\times10^{-4}$ $A10=1.681\times10^{-5}$ $K=7.287$     a17 surface The values of the formulas (2) to (9) in Example 1 are shown in the following.

Figure 36A:
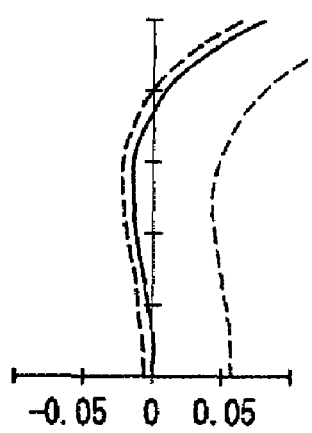
FIG. 36A shows the spherical aberration of a first optical system in Example 1 of the present invention.
Figure 36B:
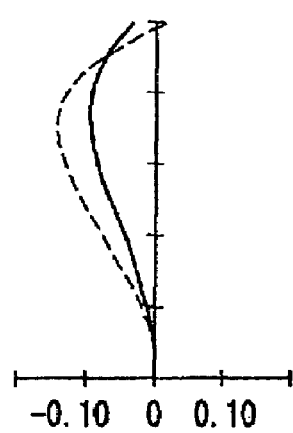
FIG. 36B shows the astigmatism of a first optical system in Example 1 of the present invention.
Figure 36C:
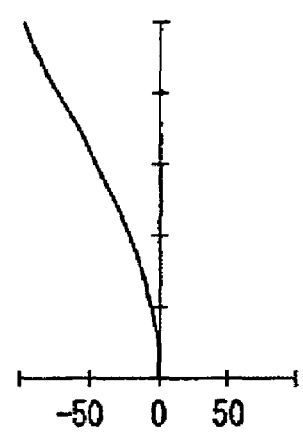
FIG. 36C shows the distortion of a first optical system in Example 1 of the present invention.
Figure 37A:
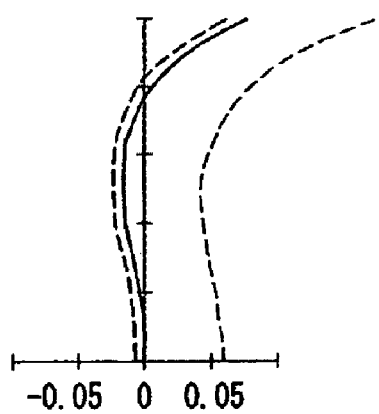
FIG. 37A shows the spherical aberration of a second optical system in Example 1 of the present invention.
Figure 38A:
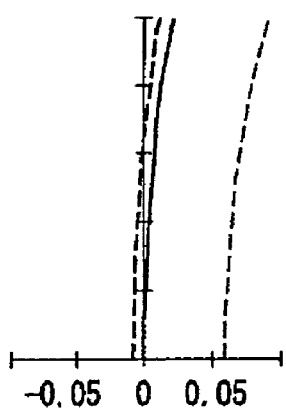
FIG. 38A shows the spherical aberration of a first optical system in Example 2 of the present invention.
Figure 39A:
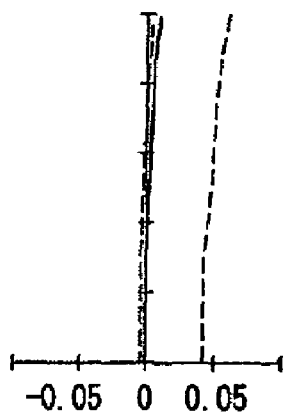
FIG. 39A shows the spherical aberration of a second optical system in Example 2 of the present invention.

$fa=1$ $fb=0.75$ $f2 \geq d (f2=12.3, d=3.68)$ $|f12/fa|=34.4$ $r2=24.6$ $r1/r2=0.52$ $|fb-fa|/|fa|=0.25$ $bf/fi=1.59$ FIGS. 36A to 36C and FIGS. 37A to 37C show aberration curves of the first optical system and the second optical system in Example 1, respectively. FIGS. 36A and 37A show spherical aberration (mm), in which the solid line indicates values at a wavelength of 587.62 nm, the broken line with a smaller pitch indicates values at a wavelength of 435.84 nm, and the broken line with a larger pitch indicates values at a wavelength of 656.27 nm. The same is true in FIGS. 38A and 39A.

Figure 37B:
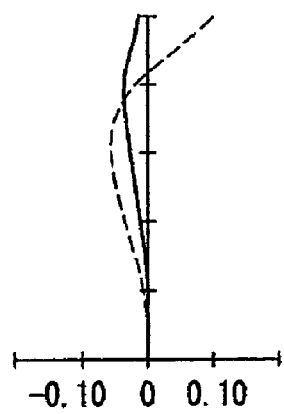
FIG. 37B shows the astigmatism of a second optical system in Example 1 of the present invention.
Figure 37C:
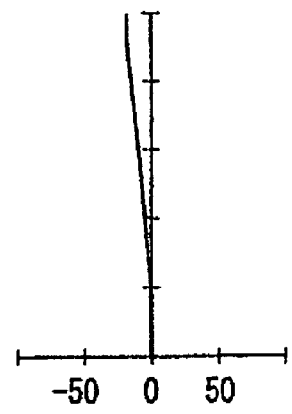
FIG. 37C shows the distortion of a second optical system in Example 1 of the present invention.
Figure 38B:
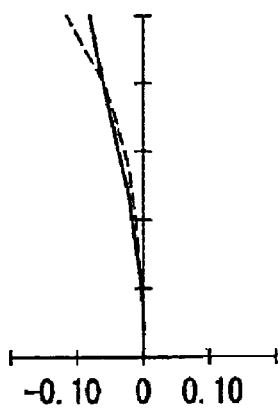
FIG. 38B shows the astigmatism of a first optical system in Example 2 of the present invention.
Figure 38C:
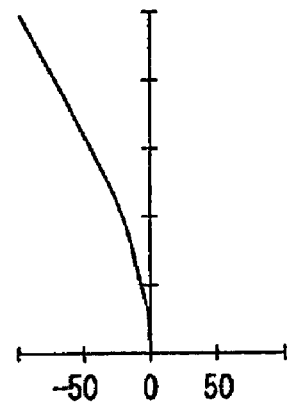
FIG. 38C shows the distortion of a first optical system in Example 2 of the present invention.
Figure 39B:
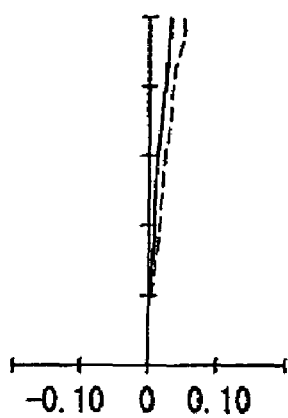
FIG. 39B shows the astigmatism of a second optical system in Example 2 of the present invention.
Figure 39C:
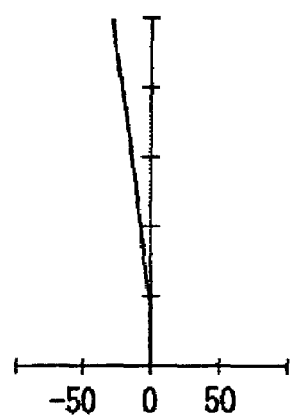
FIG. 39C shows the distortion of a second optical system in Example 2 of the present invention.

FIGS. 36B and 37B show astigmatism (mm), in which the solid line indicates sagittal curvature of field, and the broken line indicates meridional curvature of field. The same is true in FIGS. 38B and 39B. FIGS. 36C and 37C show distortion (%). The same is true in FIGS. 38C and 39C.

EXAMPLE 2

Example 2 is directed to the wide-angle imaging apparatus in FIG. 35. In Example 2, the focal length fa (mm), brightness Fno, and imaging range (half angle of view) ω (°) of the first optical system are as follows:

fa=1.00, Fno=2.00, and ω=25 to 90°.

Table 3 shows numerical values of the first optical system in Example 2.

TABLE 3

| No. | rai | dai | nd | vd | |
|---|---|---|---|---|---|
| a1 | 12.659 | −13.82 | | | Reflection surface |
| a2 | 28.527 | 13.82 | | | Reflection surface |
| a10 | ∞ | 0.38 | | | Lens stop plane |
| a11 | −2.662 | 2.87 | 1.84665 | 23.8 | Cemented lens |
| a12 | 3.760 | 1.52 | 1.72916 | 54.7 | |
| a13 | −4.125 | 0.08 | | | |
| a14 | 5.822 | 0.94 | 1.72916 | 54.7 | |
| a15 | 737.670 | 0.08 | | | |
| a16 | 3.017 | 1.13 | 1.72916 | 54.7 | |
| a17 | 6.441 | 0.38 | | | |
| a18 | ∞ | 2.00 | 1.51680 | 64.2 | |
| a19 | ∞ | | | | |

In Example 2, the focal length fb (mm), brightness Fno, and imaging range (half angle of view) ω (°) of the second optical system are as follows:

fb=0.80, Fno=2.00, and ω=0 to 25°.

Table 4 shows numerical values of the second optical system in Example 2.

TABLE 4

| No. | rbi | dbi | nd | vd | |
|---|---|---|---|---|---|
| b1 | −2.519 | 0.60 | 1.67270 | 32.2 | |
| b2 | −17.248 | 0.75 | | | |
| b3 | 25.568 | 0.60 | 1.72825 | 28.3 | |
| b4 | 2.451 | 0.45 | | | |
| b5 | 16.328 | 1.13 | 1.51680 | 64.2 | |
| b6 | −10.878 | 5.10 | | | |
| b7 | 9.947 | 3.02 | 1.56883 | 56.0 | |
| b8 | −8.364 | 1.13 | | | |
| b9 | | 13.82 | | | |
| b10 | ∞ | 0.38 | | | Lens stop plane |
| b11 | −2.662 | 2.87 | 1.84665 | 23.8 | Cemented lens |
| b12 | 3.760 | 1.52 | 1.72916 | 54.7 | |
| b13 | −4.125 | 0.08 | | | |
| b14 | 5.822 | 0.94 | 1.72916 | 54.7 | |
| b15 | 737.670 | 0.08 | | | |
| b16 | 3.017 | 1.13 | 1.72916 | 54.7 | |
| b17 | 6.441 | 0.38 | | | |
| b18 | ∞ | 2.00 | 1.51680 | 64.2 | |
| b19 | ∞ | | | | |

The aspherical coefficients and conical coefficients in Example 2 are shown in the following.

$A4=1.900\times10^{-5}$ $A6=1.037\times10^{-7}, K=0.271$     a1 surface $A4=-2.000\times10^{-6}$ $A6=-4.713\times10^{-9}, K=-0.515$     a2 surface The values of the formulas (2) to (9) in Example 2 are shown in the following.

$fa=1$ $fb=0.80$ $f2 \geq d (f2=14.3, d=13.8)$ $|f12/fa|=15.3$ $r2=28.5$ $r1/r2=0.44$ $|fb-fa|/|fa|=0.20$ $bf/f1=1.34$ FIGS. 38A to 38C and FIGS. 39A to 39C show aberration curves of the first optical system and the second optical system in Example 2, respectively.

Embodiment 19

Figure 40:
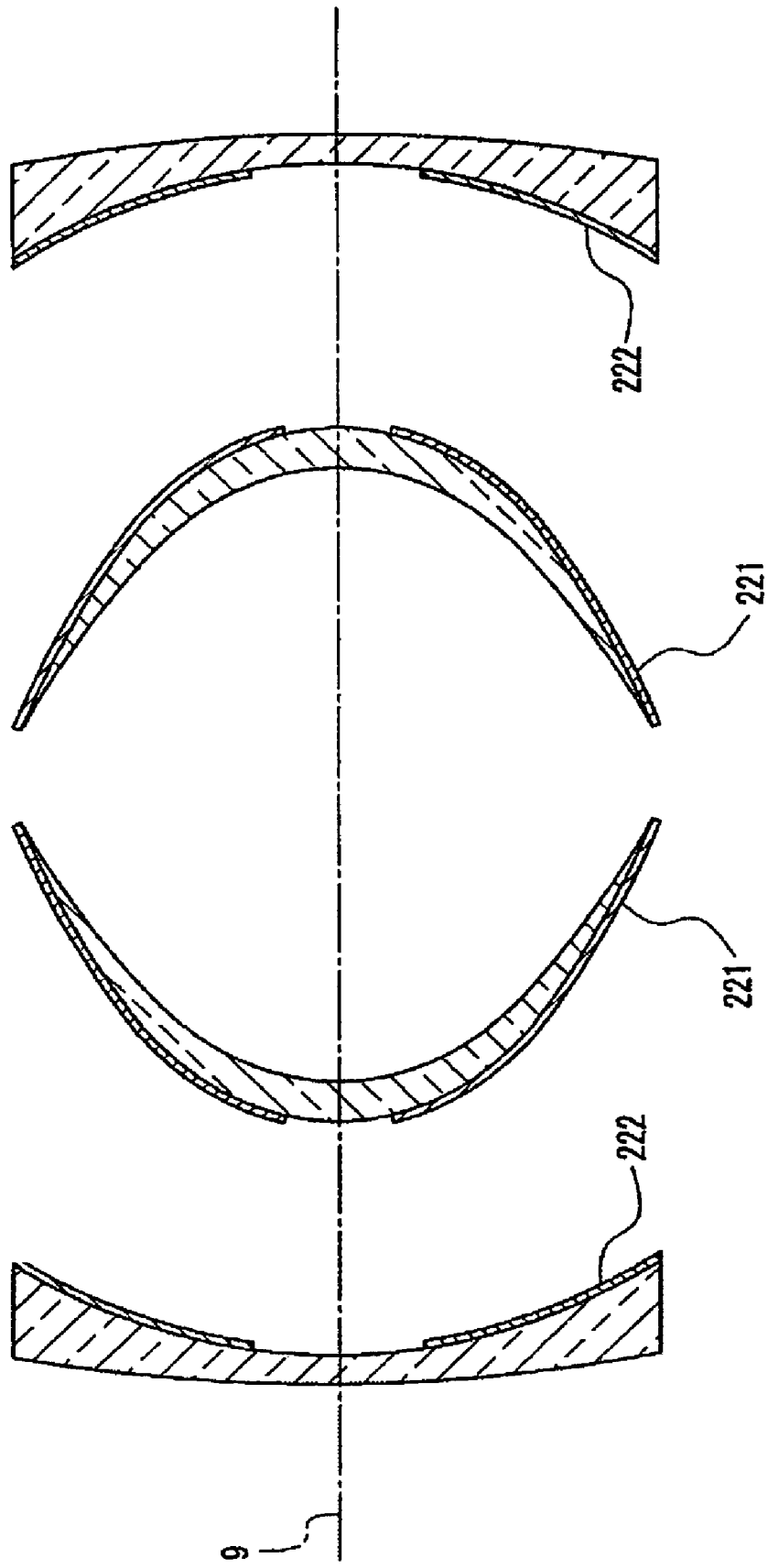
FIG. 40 is a schematic cross-sectional view showing an example of the combination of reflection surfaces according to Embodiment 19 of the present invention.

FIG. 40 shows the combination of a first reflection surface and a second reflection surface and corresponds to a cross-sectional view taken along a plane containing a central axis 9. FIG. 40 only illustrates lenses of the image-forming optical system and first reflection surfaces 221 that are formed integrally with the lenses, and lenses of the refractive optical system and second reflection surfaces 221 that are formed integrally with the lenses, but does not illustrate a third reflection surface, an imaging device, or the like.

In this configuration, the first reflection surfaces 221 have a convex surface as seen from incident light from the object side, and the second reflection surfaces 222 have a concave surface as seen from the incident light. In FIG. 40, two pairs of reflection surfaces are arranged from side to side. However, half of the pairs can be applied to any of the configurations as shown in FIGS. 1 to 12.

Embodiment 20

Figure 41:
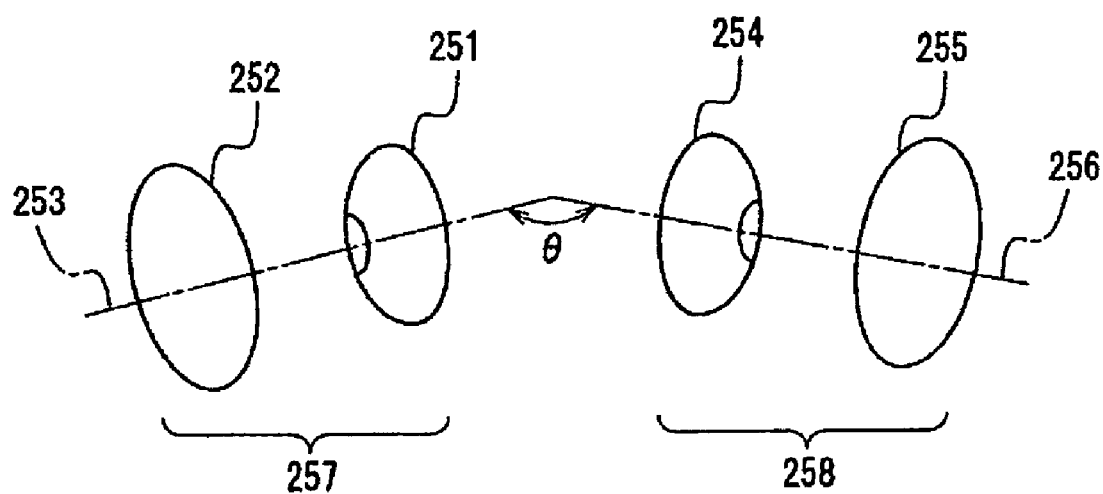
FIG. 41 is a schematic perspective view of a wide-angle imaging apparatus according to claim 20 of the present invention.

FIG. 41 is a perspective view showing a wide-angle imaging apparatus in Embodiment 20. Like Embodiments 5 to 10, this embodiment uses two wide-angle imaging optical systems. As shown in FIG. 41, a first reflection surface 251 and a second reflection surface 252 are included in a first wide-angle imaging optical system 257, while a first reflection surface 254 and a second reflection surface 255 are included in a second wide-angle imaging optical system 258.

In this embodiment, a central axis 253 of the first wide-angle imaging optical system 257 and a central axis 256 of the second wide-angle imaging optical system 258 cross at an angle θ other than 180 degrees. That is, the central axis differs depending on the wide-angle imaging optical system. On the other hand, each of the above embodiments shows an example of θ=180 degrees, which means that the central axis is common to the wide-angle imaging optical systems.

In FIG. 41, the two central axes have an intersection point. However, it is also possible not to provide any intersection point between the central axes. In Embodiments 5 to 10, the central axes either may cross at a predetermined angle θ or may have no intersection point.

Embodiment 21

Figure 42:
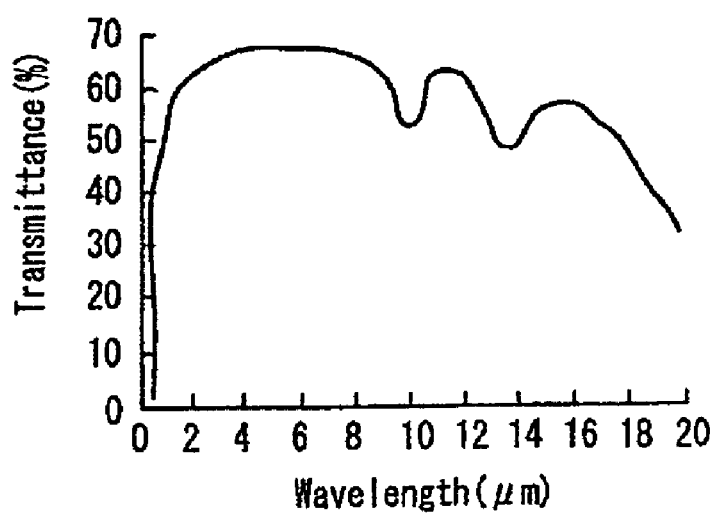
FIG. 42 shows a light transmission curve of $Si_2AsTe_2$.

FIG. 42 shows a light transmission curve of $Si_2AsTe_2$, which is Si—As—Te glass. As can be seen from the graph, $Si_2AsTe_2$ has a higher transmittance in an infrared wavelength region (1 to 10 μm). Similarly, a material such as germanium also has a higher transmittance in the infrared wavelength region. On the other hand, a reflecting mirror formed, e.g., of a glass substrate coated with Al and $MgF_2$ can reflect at least 85% of light in a wide range of wavelength regions from visible to infrared.

Accordingly, when the reflection surfaces formed, e.g., of a glass substrate coated with Al and $MgF_2$ are combined with the refractive optical system and the image-forming optical system that include lenses made, e.g., of $Si_2AsTe_2$ or germanium in each of the above embodiments, the reflection surfaces reflect light, and both of the refractive optical system and the image-forming optical system transmit light in a wide range of wavelength regions from visible to infrared. Thus, the apparatus can be used in a wide range of wavelength regions from visible to infrared.

Embodiment 22

Figure 43:
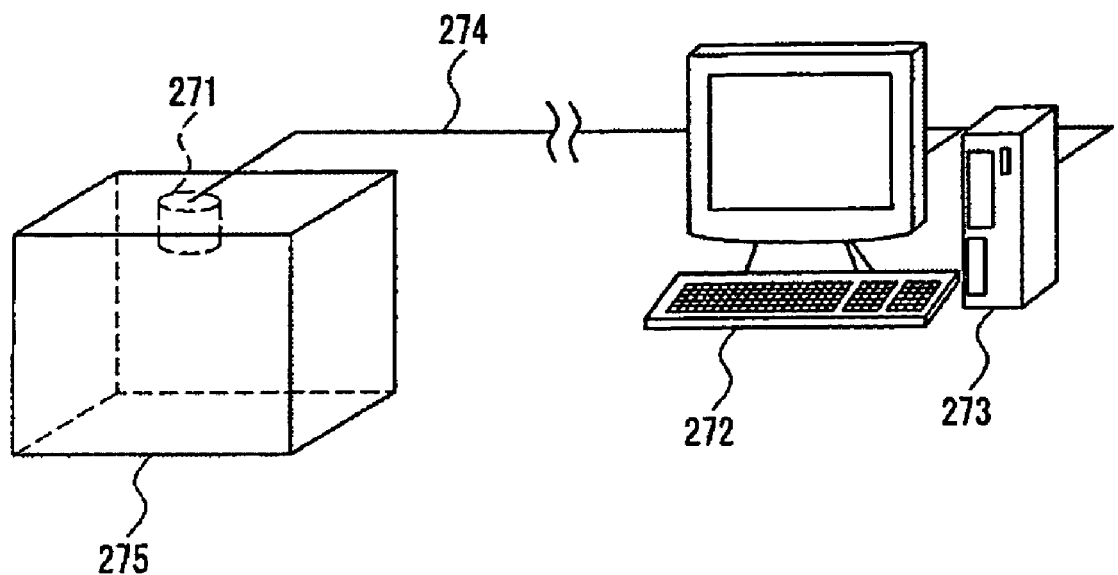
FIG. 43 is a schematic view of an embodiment of a surveillance wide-angle imaging apparatus of the present invention.

FIG. 43 shows an embodiment of a surveillance imaging system that includes any of the wide-angle imaging apparatuses in the above embodiments. A surveillance imaging apparatus 271 is installed in a monitoring space 275 and connected to a monitor 272 and an image processor 273 by a cable 274. The images produced are processed by the image processor 273 to create a panoramic image, which makes it possible to perform real-time surveillance covering a wide range. The image processor 273 also functions as a recording medium, so that the images can be stored and used as a database.

Moreover, when the combination of reflection surfaces and lenses as described in Embodiment 13 is employed, the apparatus can be used in a wide range of wavelength regions from visible to infrared. Thus, surveillance covering a wide range can be performed at any time of day or night, and its condition can be recorded.

Embodiment 23

Figure 44:
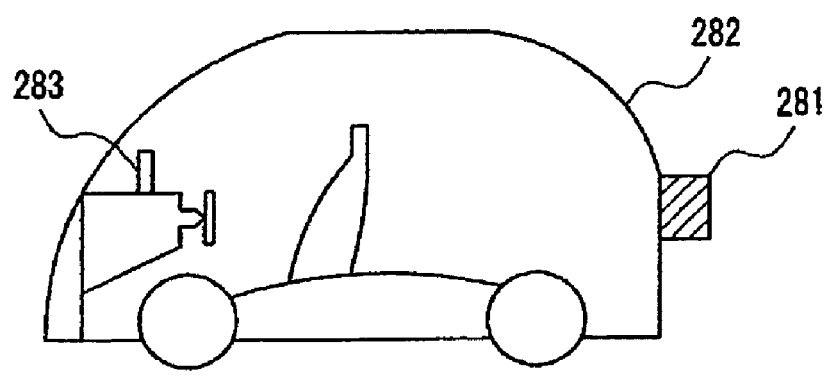
FIG. 44 is a schematic view of an embodiment of a vehicle-mounted wide-angle imaging apparatus of the present invention.

FIG. 44 shows an embodiment of a vehicle-mounted imaging system that includes any of the wide-angle imaging apparatuses in the above embodiments. When a vehicle-mounted imaging apparatus 281 is mounted, e.g., on the front, rear, or side view mirror portion of a vehicle 282, the panoramic image produced is displayed on a vehicle-installed monitor 283, which is installed in the vehicle 282, so that the vehicle-mounted imaging apparatus 281 can serve as a rear view monitor, a front view monitor, or a side view monitor. This makes it possible for a driver to grasp the traffic situation in real time, thus ensuring more safety and comfortable driving.

Embodiment 24

Figure 45:
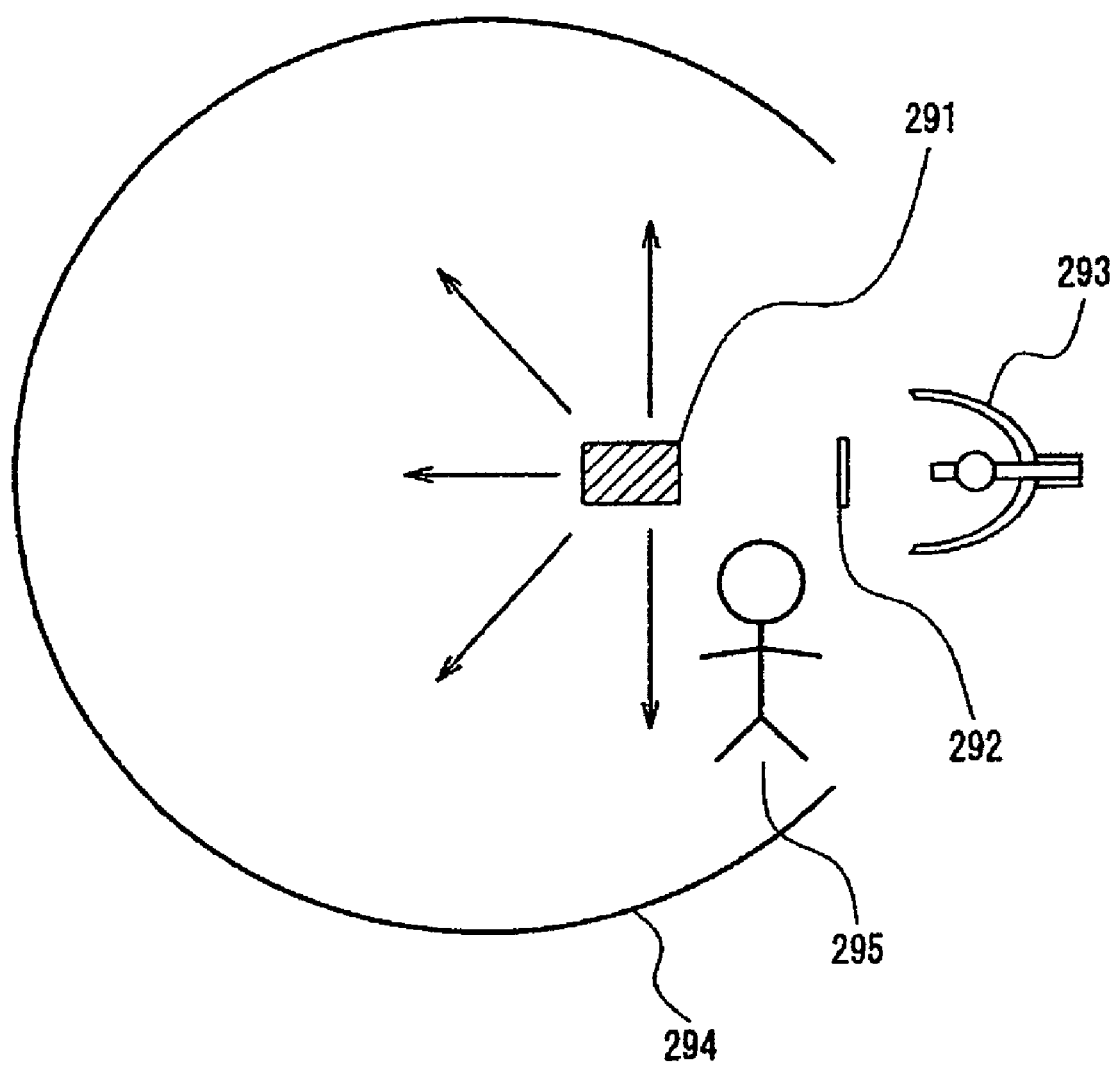
FIG. 45 is a schematic view of an embodiment of a projection wide-angle imaging apparatus of the present invention.

FIG. 45 shows an embodiment of a projection system that includes any of the wide-angle imaging apparatuses in the above embodiments. In this projection system, a spatial light modulator 292 is, e.g., a liquid crystal panel that forms an optical image. A screen 294 is used as a focusing plane onto which an image is projected by a wide-angle imaging optical system 291.

An image is formed on the spatial light modulator 292 that is illuminated by a light source 293, and then is magnified and projected by the wide-angle imaging optical system 291 onto the screen 294. Thus, it is possible to achieve a video projector that provides an extremely wide field of view for an observer 295.

Embodiment 25

Figure 46:
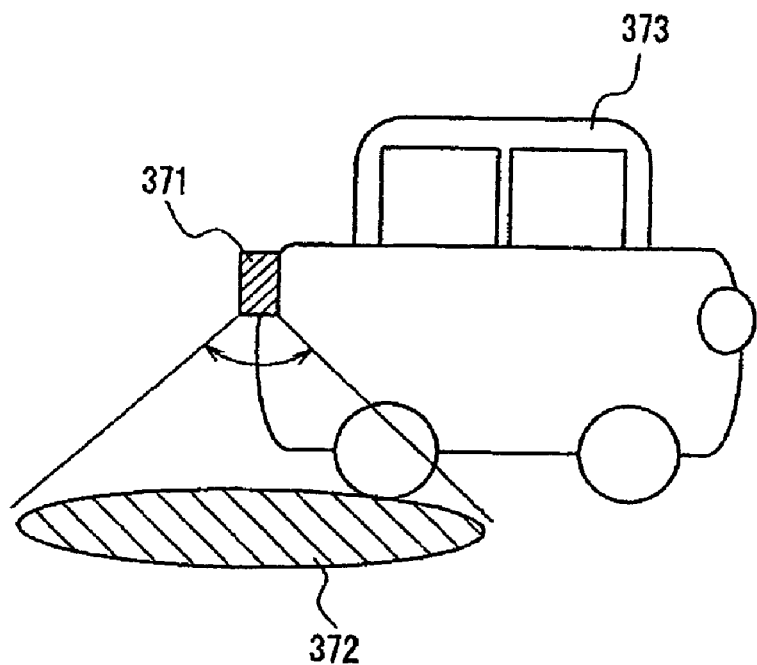
FIG. 46 is a schematic view of a vehicle-mounted imaging apparatus according to Embodiment 25 of the present invention.
Figure 47:
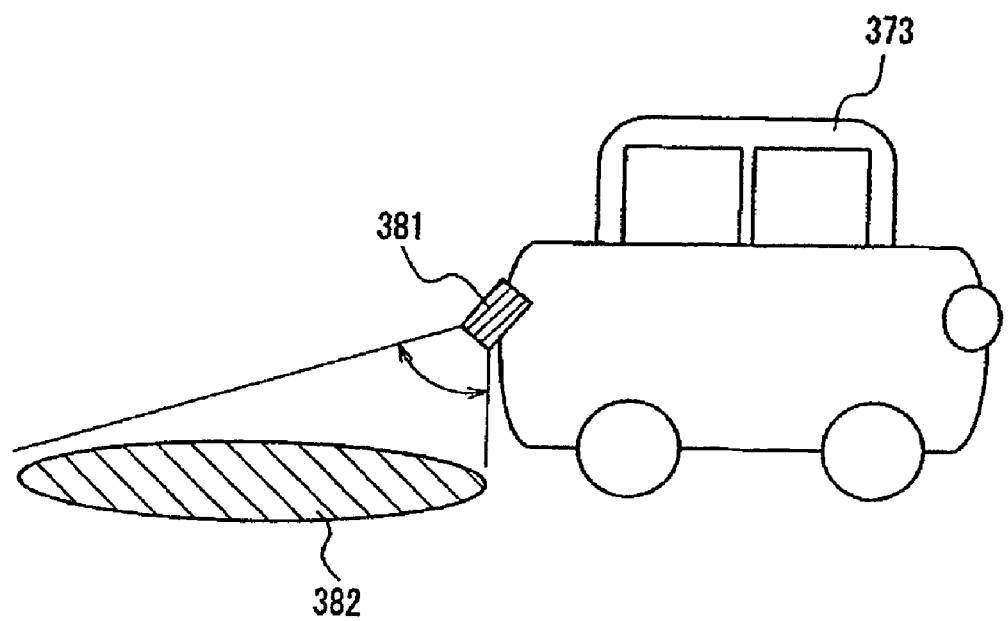
FIG. 47 is a schematic view of a vehicle-mounted imaging apparatus according to Embodiment 25 of the present invention when a mounting angle is changed.

A wide-angle imaging apparatus of Embodiment 25 can be mounted on an object, and the mounting angle can be adjusted. FIGS. 46 and 47 each show an embodiment when the wide-angle imaging apparatus is used as a vehicle-mounted imaging apparatus. In these examples, a vehicle-mounted imaging apparatus 371 is mounted on the side face in the rear of a vehicle 373. The basic configuration of the vehicle-mounted imaging apparatus 371 can be that of any of the wide-angle imaging apparatuses in the above embodiments.

In the example of FIG. 46, the vehicle-mounted imaging apparatus 371 is mounted on the vehicle 373 with its central axis substantially perpendicular to the ground that is to be imaged. In the example of FIG. 47, a vehicle-mounted imaging apparatus 381 is mounted by changing the mounting angle so that the central axis tilts with respect to the ground. Such a change in mounting angle of the vehicle-mounted imaging apparatus with respect to the vehicle 373 allows the imaging range to be changed from an imaging range 372 (FIG. 46) to an imaging range 382 (FIG. 47).

When a movable means for changing the mounting angle of the vehicle-mounted imaging apparatus is provided so as to control the mounting angle from the inside of the vehicle 373, the imaging range easily can be changed, and thus the surrounding situation can be detected and recognized precisely.

In this embodiment, the wide-angle imaging apparatus is used as a vehicle-mounted imaging apparatus. However, it is not limited thereto, but also can be used, e.g., as a surveillance imaging apparatus.

Embodiment 26

Figure 48:
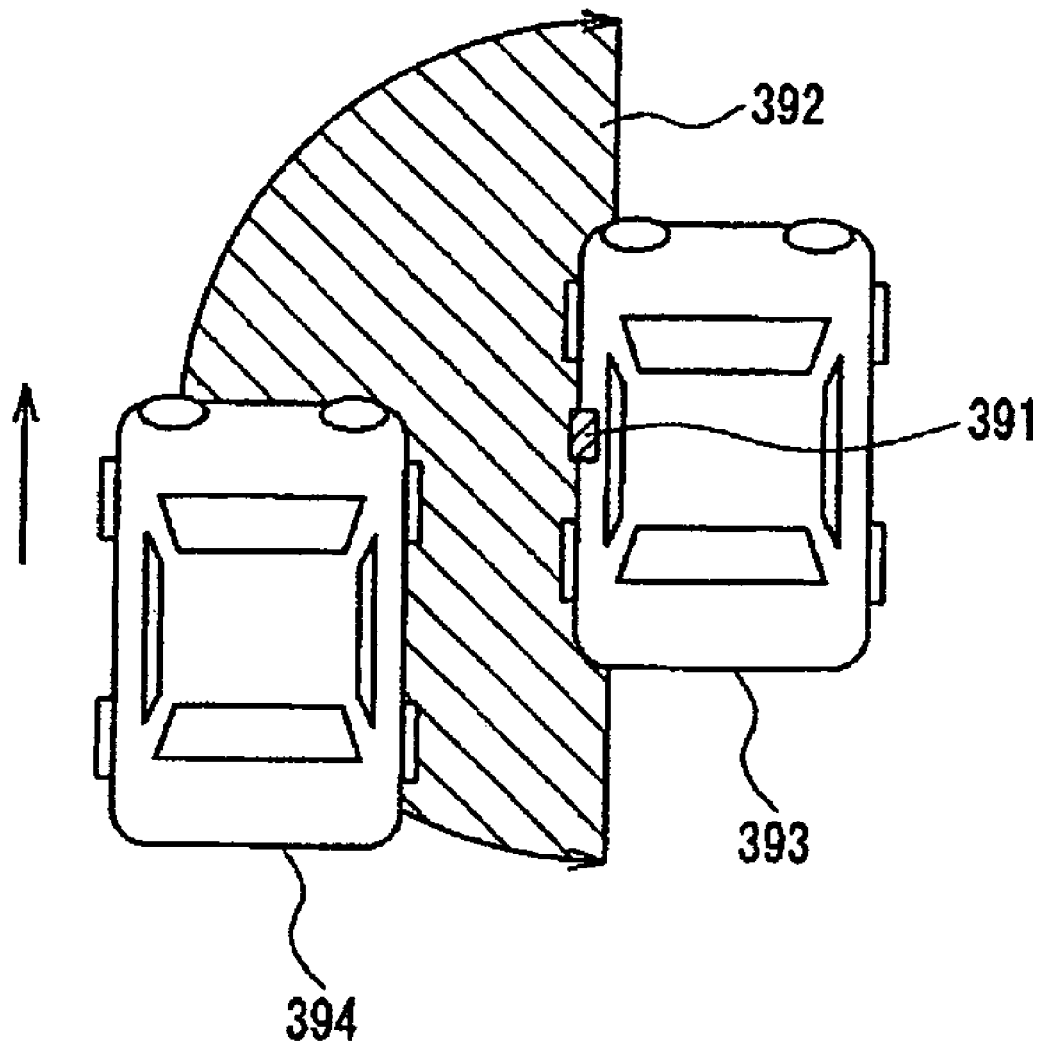
FIG. 48 is a schematic view of a vehicle-mounted imaging apparatus according to Embodiment 26 of the present invention.
Figure 49:
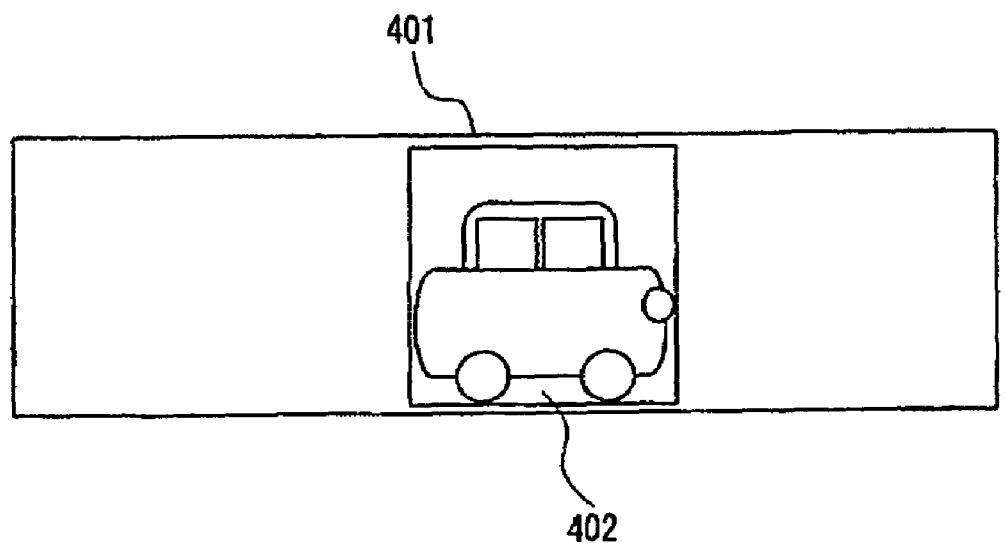
FIG. 49 shows a wide-area image of a vehicle-mounted imaging apparatus according to Embodiment 26 of the present invention.
Figure 50:
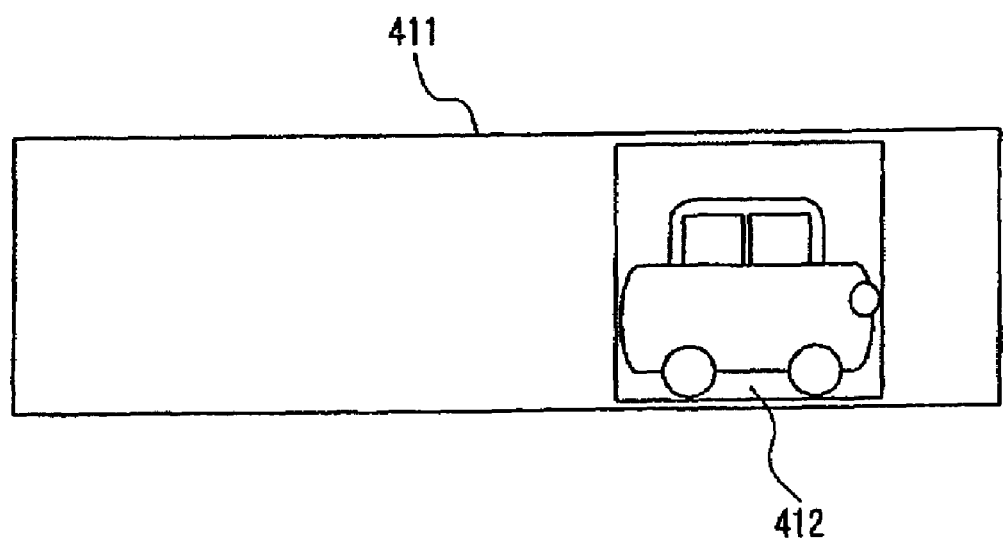
FIG. 50 shows a wide-area image of a vehicle-mounted imaging apparatus according to Embodiment 26 of the present invention when a vehicle in an imaging area moves.

FIGS. 48 to 50 each show an embodiment of a vehicle-mounted imaging apparatus. In FIG. 48, a vehicle-mounted imaging apparatus 391 is mounted on a vehicle 393. The diagonally shaded area 392 indicates an imaging range. The vehicle-mounted imaging apparatus 391 includes a moving object sensing function, and the basic configuration of the apparatus itself can be that of any of the wide-angle imaging apparatuses in the above embodiments.

FIGS. 49 and 50 show wide-area images of the vehicle-mounted imaging apparatus 391. When a vehicle 394 comes into the imaging range 392 of the vehicle-mounted imaging apparatus 391, the moving object sensing function operates so that the image of the vehicle 394 appears on a wide-area image 401 as a moving object image 402, as shown in FIG. 49.

Moreover, when the vehicle 394 moves, it is tracked automatically, and the image of the vehicle 394 appears on a wide-area image 411 as a moving object image 412, as shown in FIG. 50. The moving object sensing function allows any moving object in the surroundings to be extracted and displayed, thus drawing more of the observer's attention.

The combination of Embodiments 17, 25, and 26 also can provide highly improved imaging as a wide-angle imaging system that includes a zoom function, an imaging range variable function with inclination, and a moving object sensing function.

INDUSTRIAL APPLICABILITY

As described above, the present invention includes the reflective optical system with the first reflection surface and the second reflection surface, the open portion provided between the first reflection surface and the second reflection surface, the light-transmitting portion provided in the second reflection surface, and the aperture provided in the first reflection surface, thereby producing a panoramic image that covers a wide range, i.e., a maximum horizontal angle of view of 360 degrees and a vertical angle of view of about 180 degrees. Moreover, the main optical system can be composed of reflection surfaces that cause no chromatic aberration. This reduces not only man-hours for design but also constrains on fabrication, so that a small, lightweight, low-cost, and bright wide-angle imaging optical system can be achieved. Therefore, the wide-angle imaging optical system of the present invention is useful for a surveillance imaging apparatus, a vehicle-mounted imaging apparatus, and a projection apparatus.

The invention claimed is:

1. A wide-angle imaging optical system comprising:
    a refractive optical system having one or more lenses;
    a reflective optical system; and
    an image-forming optical system,
    wherein the reflective optical system and the image-forming optical system are arranged in the indicated order as seen from a longer conjugate distance side and constitute a first optical system, and the refractive optical system and the image-forming optical system are arranged in the indicated order as seen from the longer conjugate distance side and constitute a second optical system,
    wherein the reflective optical system comprises a first reflection surface that directly reflects rays of light from an object, and a second reflection surface that reflects rays of light from the first reflection surface,
    wherein the refractive optical system comprises at least one lens located on an object side of the second reflection surface,
    wherein an open portion is provided between the first reflection surface and the second reflection surface, and rays of light from the object enter the open portion,
    wherein a light-transmitting portion is provided in the second reflection surface and transmits rays of light that have entered the refractive optical system, and
    wherein an aperture is provided in the first reflection surface and allows rays of light from the second reflection surface and rays of light that have entered the light-transmitting portion from the refractive optical system to enter the image-forming optical system, and
    wherein no intermediate image is formed inside the wide-angle imaging optical system.

2. The wide-angle imaging optical system according to claim 1, wherein the first optical system and the second optical system share the image-forming optical system.

3. The wide-angle imaging optical system according to claim 1, satisfying the relationship expressed by $fa>0$ $fb>0$ where fa is a combined focal length of the first optical system, and fb is a combined focal length of the second optical system.

4. The wide-angle imaging optical system according to claim 1, satisfying the relationship expressed by $f2 \geq d$ where f2 is a focal length of the second reflection surface, and d is a distance on an axis between the first reflection surface and the second reflection surface.

5. The wide-angle imaging optical system according to claim 1, satisfying the relationship expressed by $|f12/fa|>5$ where fa is a combined focal length of the first optical system, and f12 is a combined focal length of the first reflection surface and the second reflection surface.

6. The wide-angle imaging optical system according to claim 1, satisfying the relationship expressed by $r2>0$ $0.3<r1/r2<0.7$ where r1 is a radius of curvature of the first reflection surface, and r2 is a radius of curvature of the second reflection surface.

7. The wide-angle imaging optical system according to claim 1, wherein the refractive optical system comprises a first lens group with negative power and a second lens group with positive power that are arranged in the indicated order as seen from the object side.

8. The wide-angle imaging optical system according to claim 1, wherein at least one of the first reflection surface and the second reflection surface is a rotationally symmetrical aspheric surface in shape.

9. The wide-angle imaging optical system according to claim 1, wherein a magnification for image formation of the first optical system and a magnification for image formation of the second optical system have the same sign.

10. The wide-angle imaging optical system according to claim 1, wherein a magnification for image formation of the first optical system and a magnification for image formation of the second optical system are both negative.

11. The wide-angle imaging optical system according to claim 1, wherein at least one focal point of the first reflection surface coincides with at least one focal point of the second reflection surface.

12. The wide-angle imaging optical system according to claim 1, wherein a lens stop is located inside the image-forming optical system or between the image-forming optical system and the second reflection surface.

13. The wide-angle imaging optical system according to claim 12, wherein a focal point of the second reflection surface coincide with a center of the lens stop.

14. The wide-angle imaging optical system according to claim 1, wherein a shielding member is formed near the periphery of the aperture.

15. The wide-angle imaging optical system according to claim 14, wherein the shielding member supports the image-forming optical system.

16. The wide-angle imaging optical system according to claim 1, wherein the image-forming optical system comprises a hood that limits rays of light entering the image-forming optical system.

17. The wide-angle imaging optical system according to claim 1, wherein lenses of the image-forming optical system are arranged in the following order as seen from the object side: a negative lens, a positive lens, and a positive lens.

18. The wide-angle imaging optical system according to claim 1, wherein lenses of the image-forming optical system are arranged in the following order as seen from the object side: a negative lens, a positive lens, a positive lens, and a positive lens.

19. The wide-angle imaging optical system according to claim 1, wherein the refractive optical system comprises a hood that limits rays of light entering the refractive optical system.

20. The wide-angle imaging optical system according to claim 1, wherein the first reflection surface is formed integrally with a lens of the image-forming optical system.

21. The wide-angle imaging optical system according to claim 20, wherein a shape of the first reflection surface is substantially the same as a shape of a portion of the lens of the image-forming optical system that corresponds to the aperture.

22. The side-angle imaging optical system according to claim 20, wherein a shape of the first reflection surface differs from a shape of a portion of the lens of the image-forming optical system that corresponds to the aperture.

23. The wide-angle imaging optical system according to claim 1, wherein the second reflection surface is formed integrally with a lens of the refractive optical system.

24. The wide-angle imaging optical system according to claim 23, wherein a shape of the second reflection surface is substantially the same as a shape of a portion of the lens of the refractive optical system that corresponds to the light-transmitting portion.

25. The wide-angle imaging optical system according to claim 23, wherein a shape of the second reflection surface differs from a shape of a portion of the lens of the refractive optical system that corresponds to the light-transmitting portion.

26. The wide-angle imaging optical system according to claim 1, wherein the image-forming optical system comprises a third reflection surface that reflects rays of light imaged.

27. The wide-angle imaging optical system according to claim 1, wherein the refractive optical system and the image-forming optical system are transparent to an infrared wavelength region including 1 to 10 µm.

28. A wide-angle imaging apparatus comprising:
the wide-angle imaging optical system according to claim 1; and
an imaging device for picking up an image formed by the image-forming optical system.

29. The wide-angle imaging apparatus according to claim 28, wherein a plurality of wide-angle imaging optical systems and the imaging devices that correspond to each of the plurality of wide-angle imaging optical systems are arranged so as to produce separate images of an object.

30. The wide-angle imaging apparatus according to claim 29, wherein two wide-angle imaging optical systems and the imaging devices that correspond to each of the two wide-angle imaging optical systems are arranged so as to produce separate images of an object, and
when an axis that joins centers of curvature of the first reflection surface and the second reflection surface is identified as a central axis, the two wide-angle imaging optical systems are arranged symmetrically with respect to an axis perpendicular to the central axis.

31. The wide-angle imaging apparatus according to claim 29, wherein the plurality of wide-angle imaging optical systems share a single imaging device.

32. The wide-angle imaging apparatus according to claim 28, wherein when an area in which rays of light enter the reflective optical system is identified as a first imaging area, and an area in which rays of light enter the refractive optical system is identified as a second imaging area, an image picked up by the imaging device includes a circular image that is obtained by taking the second imaging area and an annular image that is obtained by taking the first imaging area and formed outside the circular image,
the first imaging area and the second imaging area do not overlap with each other, and
the circular image and the annular image are arranged continuously.

33. The wide-angle imaging apparatus according to claim 28, wherein a protective member is arranged so as to surround the open portion.

34. The wide-angle imaging apparatus according to claim 33, wherein the protective member is provided with a film for preventing internal reflection.

35. The wide-angle imaging apparatus according to claim 33, wherein the protective member is in the form of a substantially frustoconical, and an inner diameter of the protective member at the first reflection surface differs from an inner diameter of the protective member at the second reflection surface.

36. The wide-angle imaging apparatus according to claim 28, wherein at least one of the refractive optical system and the image-forming optical system has a zoom function.

37. The wide-angle imaging apparatus according to claim 28, wherein the wide-angle imaging apparatus can be mounted on an object, and a mounting angle can be adjusted.

38. The wide-angle imaging apparatus according to claim 28, comprising a moving object sensing function.

39. A surveillance imaging apparatus comprising the wide-angle imaging optical system according to claim 1.

40. A vehicle-mounted imaging apparatus comprising the wide-angle imaging optical system according to claim 1.

41. A projection apparatus comprising the wide-angle imaging optical system according to claim 1.

42. A wide-angle imaging optical system comprising:
a refractive optical system;
a reflective optical system; and
an image-forming optical system,
wherein the reflective optical system and the image-forming optical system are arranged in the indicated order as seen from a longer conjugate distance side and constitute a first optical system, and the refractive optical system and the image-forming optical system are arranged in the indicated order as seen from the longer conjugate distance side and constitute a second optical system,
wherein the reflective optical system comprises a first reflection surface that directly reflects rays of light from an object, and a second reflection surface that reflects rays of light from the first reflection surface,
wherein an open portion is provided between the first reflection surface and the second reflection surface, and rays of light from the object enter the open portion,
wherein a light-transmitting portion is provided in the second reflection surface and transmits rays of light that have entered the refractive optical system,
wherein an aperture is provided in the first reflection surface and allows rays of light from the second reflection surface and the refractive optical system to enter the image-forming optical system, and
wherein the wide-angle imaging optical system satisfies the relationship expressed by $$||fb-fa|/|fa|<0.5$$

where fa is a combined focal length of the first optical system, and fb is a combined focal length of the second optical system.

43. A wide-angle imaging optical system comprising:
a refractive optical system;
a reflective optical system; and
an image-forming optical system,
wherein the reflective optical system and the image-forming optical system are arranged in the indicated order as seen from a longer conjugate distance side and constitute a first optical system, and the refractive optical system and the image-forming optical system are arranged in the indicated order as seen from the longer conjugate distance side and constitute a second optical system,
wherein the reflective optical system comprises a first reflection surface that directly reflects rays of light from an object, and a second reflection surface that reflects rays of light from the first reflection surface,
wherein an open portion is provided between the first reflection surface and the second reflection surface, and rays of light from the object enter the open portion,
wherein a light-transmitting portion is provided in the second reflection surface and transmits rays of light that have entered the refractive optical system,
wherein an aperture is provided in the first reflection surface and allows rays of light from the second reflection surface and the refractive optical system to enter the image-forming optical system, and
wherein the wide-angle imaging optical system satisfies the relationship expressed by $$1.2 < bf/fi < 1.8$$

where bf is a back focal length of the image-forming optical system measured in terms of air when rays of light from an object at infinity enter the image-forming optical system in parallel, and fi is a combined focal length of the image-forming optical system.

* * * * *